United States Patent [19]

Sasanuma et al.

[11] Patent Number: 5,557,416
[45] Date of Patent: Sep. 17, 1996

[54] IMAGE PROCESSING APPARATUS AND METHOD THEREOF FOR ADDING A PREDETERMINED PATTERN TO AN IMAGE

[75] Inventors: Nobuatsu Sasanuma; Masaaki Sakurai; Rie Saito, all of Yokohama, Japan

[73] Assignee: Canon Kabushiki Kaisha, Tokyo, Japan

[21] Appl. No.: 125,831

[22] Filed: Sep. 24, 1993

[30] Foreign Application Priority Data

Sep. 25, 1992  [JP]  Japan ................................. 4-256234
Sep. 25, 1992  [JP]  Japan ................................. 4-256235
Sep. 28, 1992  [JP]  Japan ................................. 4-282525

[51] Int. Cl.$^6$ .................... H04N 1/29; H04N 1/00; G03G 21/00; G01D 15/14
[52] U.S. Cl. .................... 358/300; 358/401; 355/201; 347/129
[58] Field of Search .................... 358/296, 300, 358/400–406, 434, 440, 501, 504, 505, 530; 355/201; 283/901, 902; 347/129, 131, 224, 225, 232; 382/100, 135, 137, 162, 165, 168, 170, 181, 190, 191, 209

[56] References Cited

U.S. PATENT DOCUMENTS

| | | | |
|---|---|---|---|
| 4,807,027 | 2/1989 | Muto | 358/108 |
| 5,050,224 | 9/1991 | Mori | 382/34 |
| 5,055,834 | 10/1991 | Chiba | 340/825 |
| 5,193,121 | 3/1993 | Elischer et al. | 382/7 |
| 5,227,871 | 7/1993 | Funada et al. | 358/296 X |
| 5,257,119 | 10/1993 | Funada et al. | 358/438 |
| 5,321,470 | 7/1994 | Hasuo et al. | 355/201 |
| 5,363,202 | 11/1994 | Udagawa et al. | 355/201 X |
| 5,363,454 | 11/1994 | Udagawa et al. | 358/501 X |
| 5,418,602 | 5/1995 | Nishikawa | 355/201 |
| 5,424,852 | 6/1995 | Funada | 358/448 |
| 5,430,525 | 7/1995 | Ohta et al. | 355/201 |
| 5,457,540 | 10/1995 | Kajita | 358/296 |

FOREIGN PATENT DOCUMENTS

| | | | |
|---|---|---|---|
| 0342060 | 11/1989 | European Pat. Off. | G03G 21/00 |
| 0463844 | 1/1992 | European Pat. Off. | H04N 1/46 |
| 0506479 | 9/1992 | European Pat. Off. | G03G 21/00 |
| 2360270 | 6/1974 | Germany | G03F 3/00 |
| 4-016707 | 1/1992 | Japan | G01B 15/00 |
| 1400806 | 9/1975 | United Kingdom | H04N 1/00 |

*Assistant Examiner*—Eric Frahm
*Attorney, Agent, or Firm*—Fitzpatrick, Cella, Harper & Scinto

[57] ABSTRACT

When a predetermined pattern (e.g. a pattern indicating the serial number of a copying machine) is added on an image formed on a recording paper, the image formation apparatus suppresses the appearance of fog by the addition of a predetermined pattern in the vicinity of the image. More particularly, a control circuit, which inputs and processes an image signal, estimates the leading and ending edge positions of the recording paper with respect to the transferring direction. The edge which is perpendicular to the transferring direction of the recording paper is determined based on a signal obtained from an ITOP generation circuit and a BD detector. Accordingly, an effective area for image formation on the recording paper is obtained and a modulation amount for adding the predetermined pattern is controlled in accordance with the position on the recording paper at which the predetermined pattern is added.

15 Claims, 49 Drawing Sheets

FIG. 16

| CNO SIGNAL | PRINT OUTPUT |
|---|---|
| 0 | MAGENTA (M) |
| 1 | CYAN (C) |
| 2 | YELLOW (Y) |
| 3 | BLACK (BK) |

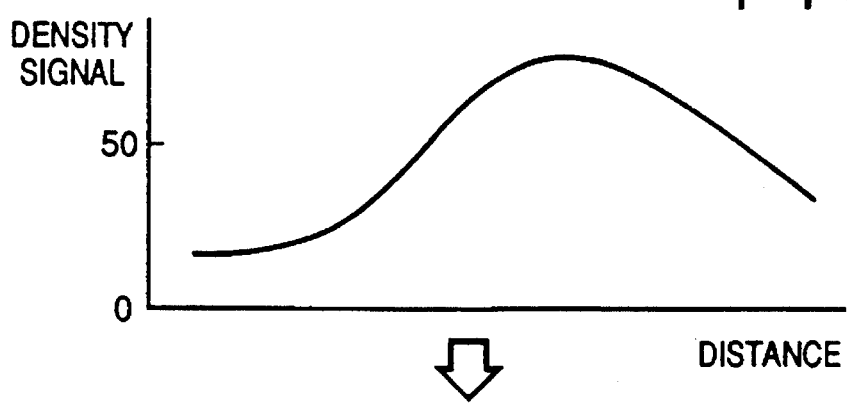
FIG. 19A
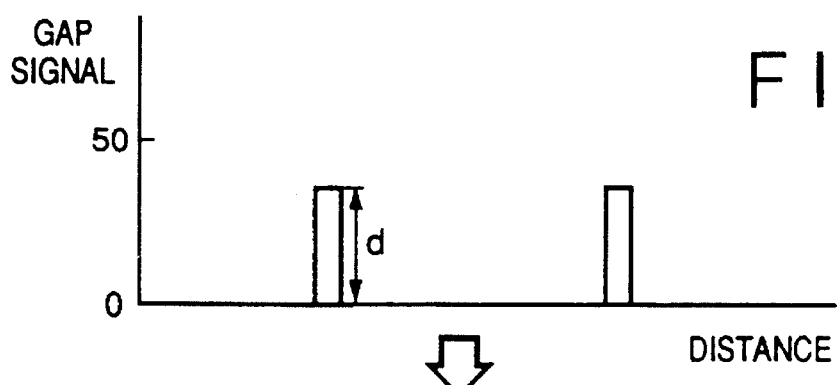
FIG. 19B
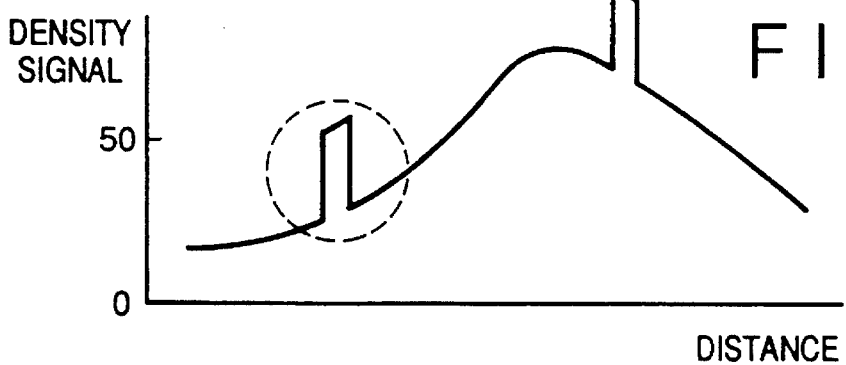
FIG. 19C
FIG. 20
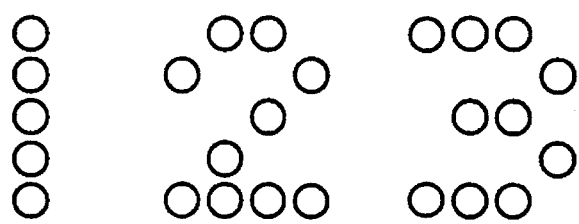

→ MAIN SCANNING DIRECTION 1302
1303
1301

→ MAIN SCANNING DIRECTION 1401a  1401b  1401c  1401d  1401e

|← d1 →|← d1 →|← d1 →|

1401

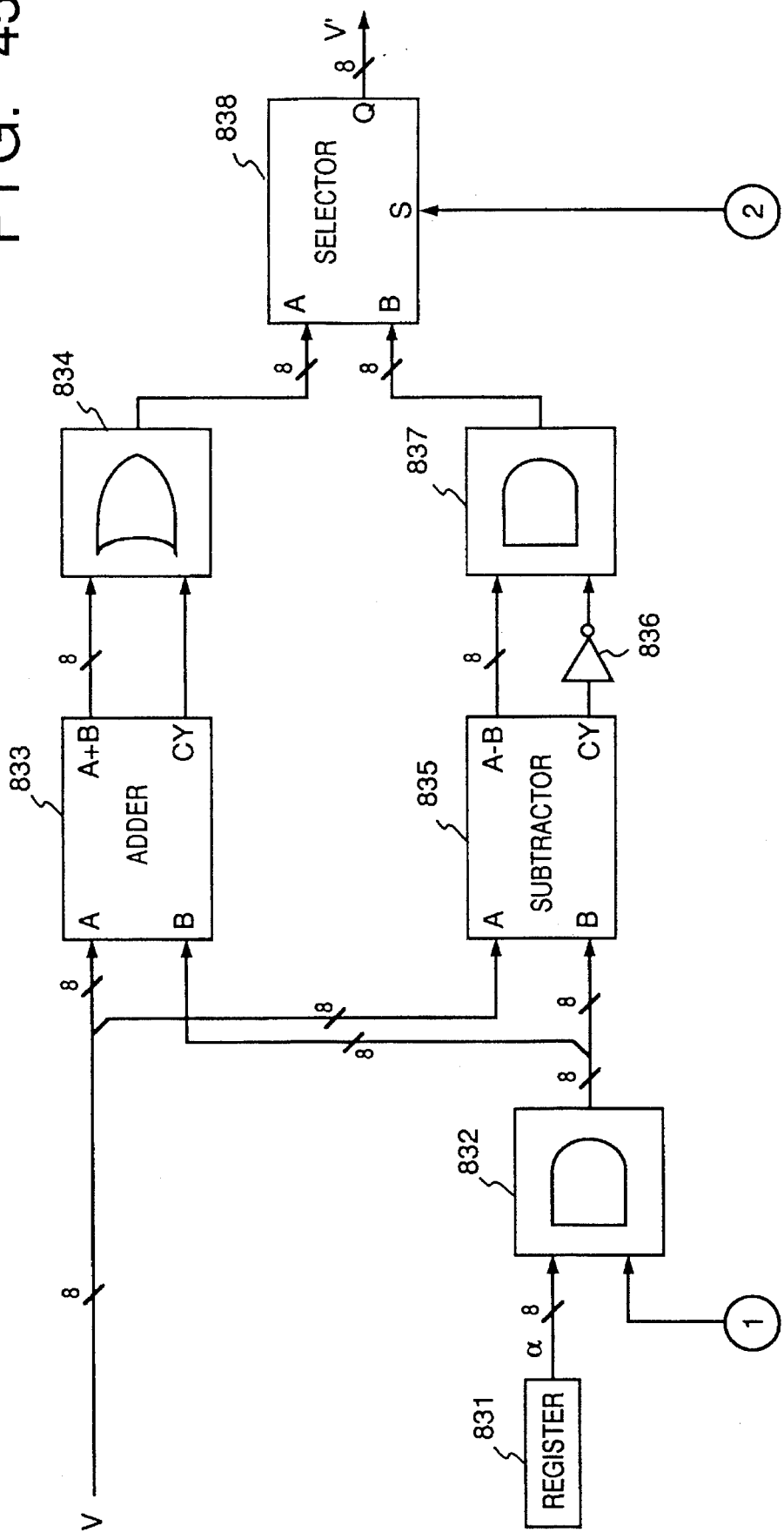

IMAGE PROCESSING APPARATUS AND METHOD THEREOF FOR ADDING A PREDETERMINED PATTERN TO AN IMAGE

BACKGROUND OF THE INVENTION

This invention relates to an image processing apparatus and method and, more particularly to a color image processing apparatus and method which is helpful in guarding against the production of counterfeiting of bank notes, securities, and the like.

Conventionally, various techniques are implemented in a color image processing apparatus, such as a full-color copying machine, in order to prevent the counterfeiting of bank notes and securities. One technique is such that a pattern, which is unique to each image formation apparatus but imperceptible to human eyes, is added on the image information at a predetermined modulation amount in order to identify the image processing apparatus used for counterfeiting. Such technique is disclosed in U.S. Ser. No. 07/856, 996, U.S. Pat. No. 5,257,119 U.S. Ser. No. 07/996,692, U.S. Pat. No. 5,457,540 and U.S. Ser. No. 08/009,735. In a case where bank notes or securities have been forged by such color image formation apparatus, if a unique pattern is read and identified by a reading apparatus capable of detecting a predetermined wavelength range represented by the color printed on a counterfeit, the image formation apparatus used for the counterfeiting can be identified effectively be traced, Thus a counterfeiter can.

In the conventional technique, a pattern is added in a neutral tint so that the pattern itself cannot be read; however, fog appears on an image because the pattern exists on the image boundary where an image begins on a printing paper. Particularly, the problem is evident, in a boundary between an image portion and a non-image portion, an add-on pattern stands out resulting in the deterioration of image quality.

Furthermore, when the image formation characteristic of the color image formation apparatus is changed, the add-on unique pattern cannot be read and/or the image may not be formed properly. That is, the added unique pattern may not be able to be read since the change of characteristics are not reflected in the image density at a highlight portion of the image (in a low density range). This is due to the dependency on the tone characteristic of the color image formation apparatus. In contrast, in the density range where the contrast is strong, the add-on unique pattern becomes visable.

More particularly, in an electrophotographic process copying machine, when an image density reproduction capability decreases by deterioration of a photoreceptor and the image density cannot be fully expressed, a drawback occurs in that an add-on unique pattern cannot be reproduced and read as a difference of the image densities.

When the image density reproduction capability increases and the image density is excessively expressed, the drawback is such that the add-on unique pattern becomes visable because the difference between the image density of the add-on unique pattern and that of the original image is significantly large; thus the image is not accurately reproduced.

Furthermore, when a recording density of the full-color copying machine is increased to duplicate specific originals such as bank notes, stamps, securities, and postage stamps, since the color reproduction is deteriorated and character lines are emphasized, the drawback occurs in that the unique pattern of the image formation apparatus-is difficult to reproduce. In the low density range in particular, the unique pattern is difficult to reproduce and read. In contrast, in the intermediate density range, the added unique pattern becomes visable.

SUMMARY OF THE INVENTION

Accordingly, it is an object of the present invention to provide an image formation method capable of suppressing the appearance of fog in a boundary portion of the area of an image formed on a recording medium when a unique pattern is added on the image.

According to the present invention, the foregoing object is attained by providing an image forming method of forming an image represented by an input image signal by adding a predetermined pattern on the image represented by the input image signal; and forming the image on which the predetermined pattern is added, wherein the addition is controlled in accordance with a position on the image at which the predetermined pattern is added.

It is another object of the present invention to provide an image formation apparatus capable of suppressing the generation of fog in a boundary portion of the area of an image formed on a recording medium when a unique pattern is added on the image.

According to the present invention, the forgoing object is attained by providing an image forming apparatus capable of adding a predetermined image signal on an input signal. A modulation means modulates a predetermined image signal in accordance with a distance from the boundary of an area on a recording medium where the image is formed, and an adding means adds the modulated predetermined image signal on the input image signal. An image formation means forms an image based on the input image signal on which the modulated predetermined image signal is added.

In accordance with the present invention as described above, a predetermined image signal is modulated in accordance with the distance from the boundary of the area on the recording medium where an image is formed, and the modulated signal is added to an input image signal.

It is another object of the present invention to provide an image processing method capable of modifying a modulation amount of a signal representing a predetermined pattern to be added to an image in accordance with the density of an input image density signal.

According to the present invention, the foregoing object is attained by providing an image processing method capable of adding a predetermined pattern on an input image by inputting density signals representing an image; generating signals representing a predetermined pattern; modulating the signals representing the predetermined pattern based on the input density signals; and adding the modulated signals on the input density signals in such a manner that the added amount is constant over any value of the density signal.

It is another object of the present invention to provide an image processing apparatus capable of modifying a modulation amount of a signal representing a predetermined pattern to be added in accordance with the density of an input image density signal.

According to the present invention, the foregoing object is attained by an image processing apparatus capable of adding a predetermined pattern on an input image. An input means inputs density signals representing an image, and a signal generation means generates signals representing a predetermined pattern. A modulation means modulates the signals representing the predetermined pattern based on the input density signals. An adding means adds the modulated signals on the input density signals, and a control means controls in a manner that the added amount is constant over any value of the density signals.

In accordance with the present invention as described above, a signal representing a predetermined pattern is modulated based on the input density signal and the modulated signal is added on the input density signal. In this case, the modulation is controlled so that an adding amount of the signal representing the predetermined pattern is constant regardless of the density value of the density signal.

The invention is particularly advantageous since the predetermined pattern is added by modifying the modulation amount of the predetermined image signal in accordance with the distance from the boundary of the area on a recording medium where an image is formed, the fog caused by presence of an add-on pattern becomes imperceptible. Further, the modulation of the signal representing the predetermined pattern is controlled by considering the density value of the input density signal, and the predetermined pattern is added by the constant density value regardless of the image density value on an output image, therefore, a stable predetermined pattern can be obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 16 is a diagram illustrating the relationship between a signal CNO and a print output; FIG. 19 is a diagram illustrating a state where a serial-number pattern is added to the density signal of an output image; FIG. 20 is a diagram illustrating an example of the serial-number pattern.

FIGS. 45, 46, and 47 are block diagrams illustrating the construction of a pattern addition circuit 410;

DESCRIPTION OF THE PREFERRED EMBODIMENTS

Preferred embodiments of the present invention will now be described in detail in accordance with the accompanying drawings.

In the embodiment, an electrophotographic process type of full-color copying machine is used as a typical image processing apparatus. However, the present invention is applicable to a silver-halide process, a thermal transfer process, and a sublimation type process of the image processing apparatus.

<First Embodiment>
[General Description of Apparatus (FIG. 1)]

Figure 1:
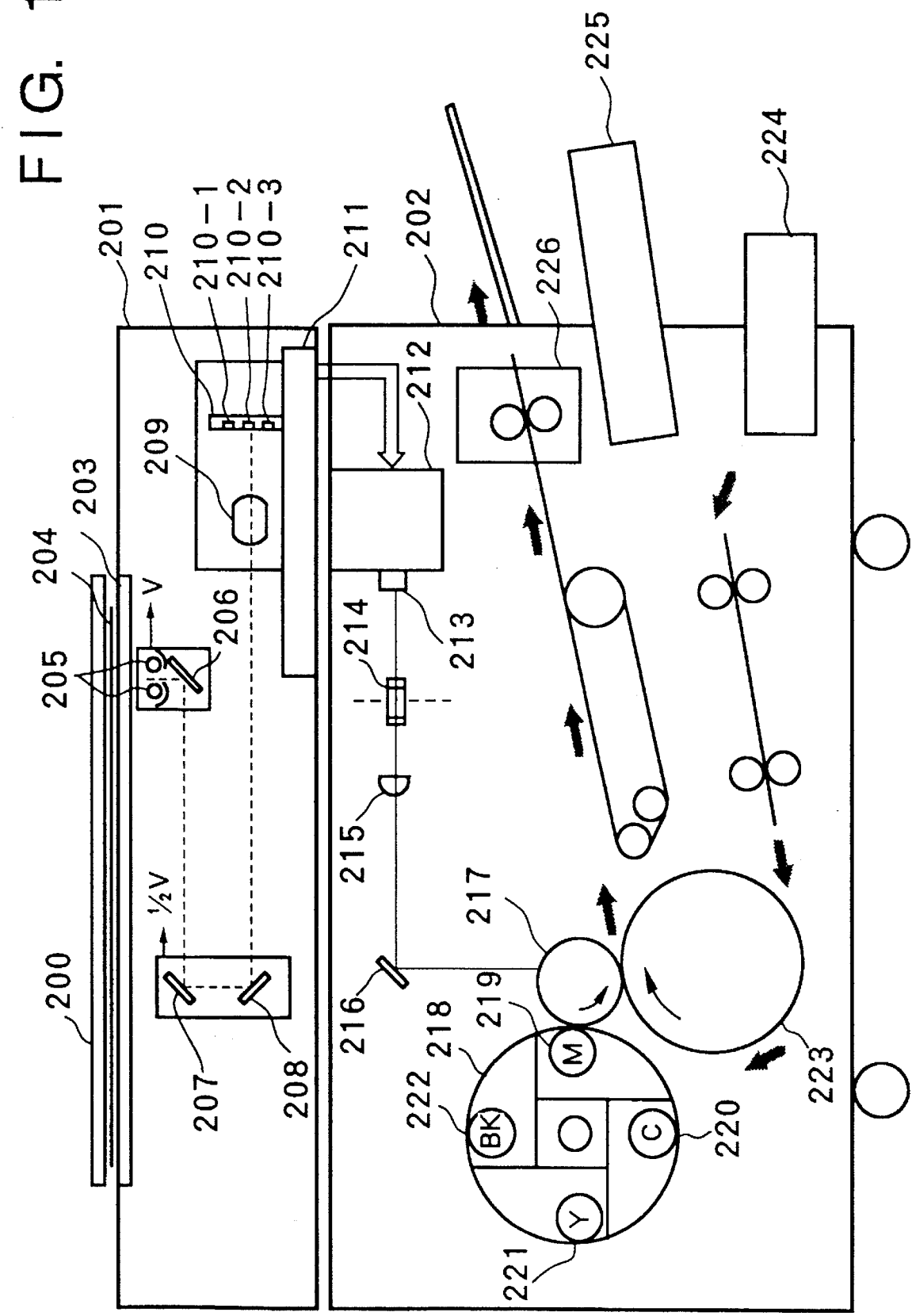
FIG. 1 is a side view illustrating the construction of a full-color copying machine which is a typical embodiment of the present invention.

FIG. 1 is a sectional view showing the internal construction of a copying machine according to a first embodiment of the present invention. In FIG. 1, numeral 201 denotes an image scanner for reading an original image at a resolution of 400 dpi (dot/inch) and performing digital signal processing. Numeral 202 designates a printer for printing an image, which corresponds to the original image read by the scanner 201, on paper in full color at the resolution of 400 dpi.

The image scanner 201 includes a pressure plate 200 having a mirror surface. An original image 204 on an original glass table (platen) 203 is irradiated by means of lamps 205. An image is formed on a three-line sensor (hereinafter referred to as a "CCD") 210 of the colors red (R), green (G) and blue (B) via mirrors 206, 207, 208 and a lens 209, and the image is sent to a signal processor 211 as red (R), green (G) and blue (B) components of full-color information. The entire surface of the original image is scanned (subordinate scanning) by mechanically moving the lamps 205 and mirror 206 at a velocity v as well as the mirrors 207, 208 at a velocity ½ v in a direction perpendicular to the electrical scanning direction (main-scanning direction) of the CCD 210.

The signal processor 211 electrically processes the read image signal, separates the signal into magenta (M), cyan (C), yellow (Y) and black (BK) components and sends these components to the printing unit 202. At least one component among the M, C, Y, BK components is sent to the printer 202 per scan of the original image in the image scanner 201, and a single print-out is completed by a total of four scans of the original image.

The M, C, Y, BK image signals received from the image scanner 201 are sent to a laser driver 212. The laser driver 212 modulates and drives a semiconductor laser 213 in dependence upon the particular image signal sent. The laser beam is made to scan across a photosensitive drum 217 via a polygon mirror 214, an f-θ lens 215 and a mirror 216. Numeral 218 denotes a revolving developer comprising a magenta developing unit 219, a cyan developing unit 220, a yellow developing unit 221 and a black developing unit 222. These four developers come into alternate contact with the photosensitive drum 217 so that an electrostatic latent image formed on the photosensitive drum 217 is developed by means of toners. Numeral 223 denotes a transfer drum upon which paper fed from a paper cassette 224 or 225 is wound so that the image developed on the photosensitive drum 217 may be transferred to the paper.

After the four colors M, C, Y, BK have been thus transferred successively, the paper is passed through a fixing unit 226 to fix the toners on the paper, after which the paper is ejected.

[Image Scanner (FIG. 2)]

Figure 2:
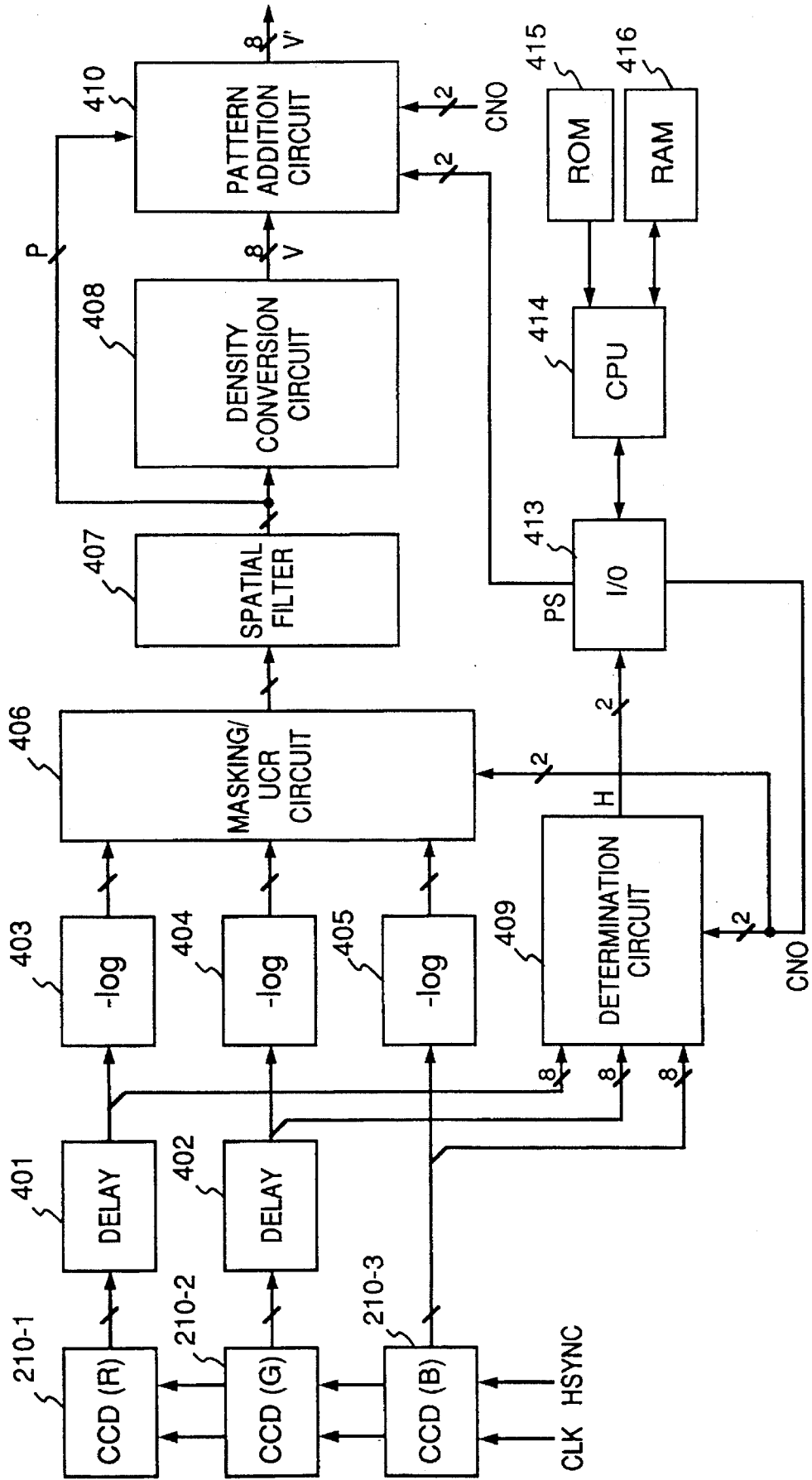
FIG. 2 is a block diagram illustrating the construction of an image scanner 201 of the full-color copying machine shown in FIG. 1 according to a first embodiment.

FIG. 2 is a block diagram showing the construction of an image scanner 201. Numerals 210-1, 210-2, 210-3 in FIG. 2 denote CCD (Charge Coupled Device) line sensors having spectral sensitivity characteristics for red (R), green (G) and blue (B), respectively. The output signal of each line sensor is subjected to an A/D conversion, after which it is output as an 8-bit signal. Accordingly, each of the R, G, B components is represented by 0–255 levels in accordance with the brightness.

The CCD line sensors 210-1, 210-2, 210-3 used in the present embodiment are arranged so as to be spaced apart at a predetermined distance, and therefore a space displacement is corrected using delay elements 401 and 402.

Numerals 403, 404, 405 are log converters constituted by a look-up table ROM or RAM for converting a brightness signal into a density signal. Numeral 406 denotes a well-known masking-UCR (Under Color Removal) circuit. In the masking-UCR circuit 406, each of the magenta (M), cyan (C), yellow (Y) and black (BK) signals for image formation are generated at a prescribed bit length (e.g., eight bits) in frame-sequential fashion, based upon the RGB signals input thereto, whenever there is a reading operation.

Numeral 407 denotes a well-known space filter circuit which corrects the space-frequency characteristic of the output signal from the circuit 406. Numeral 408 denotes a density conversion circuit for correcting the output signal in conformity with the density characteristic processed by the printer 202. Like the log converters 403–405, this circuit is constituted by a ROM or RAM.

Numeral 414 denotes a microcomputer (hereinafter referred to as a "CPU") for supervising control of the apparatus. Numeral 415 denotes a ROM which stores a program for operating the CPU 414, and numeral 416 denotes a RAM used as a work area which executes various programs. Numeral 413 denotes an input/output port (hereinafter referred to as an "I/O port") connected to the CPU 414 and numeral 409 denotes a determination circuit which determines a specific original.

The determination circuit 409 determines a possibility that the original placed on the original glass table 203 is at least one of a plurality of specific originals (documents that should not be copied). The determination signal H is output in two bits. If there is a strong possibility that the original is one of the specific originals, H="3" is output. On the other hand, if the possibility is rare, H="0" is output. The determination circuit 409 further comprises a thinning-out circuit 301 which performs a thinning-out processing of the input signals R, G, B and a frequency dividing circuit 310, which are described later with reference to FIG. 3.

A signal CNO is a two-bit control signal which indicates each color of the image, which is formed by the four reading operations (scanning operations) with respect to four output colors M, C, Y, and BK for each color image. FIG. 16 shows the relationship between the signal CNO and the print output. The signal CNO is generated by the CPU 414 through the I/O port 413 to change conditions for the operation of the masking/UCR circuit 406. The signal CNO is also input to the determination circuit 409 to change the criteria with respect to the four reading operations and thus determination on a different specific original can be performed.

Numeral 410 denotes a pattern addition circuit at which a pattern which cannot be visually discriminated is added to a duplicate image corresponding to a 2-bit pattern level selection signal PS designed by the CPU 414. The pattern to be added is generated from the image signal P read by the image scanner 201.

[Determination Circuit (FIGS. 3–5) ]

Figure 3:
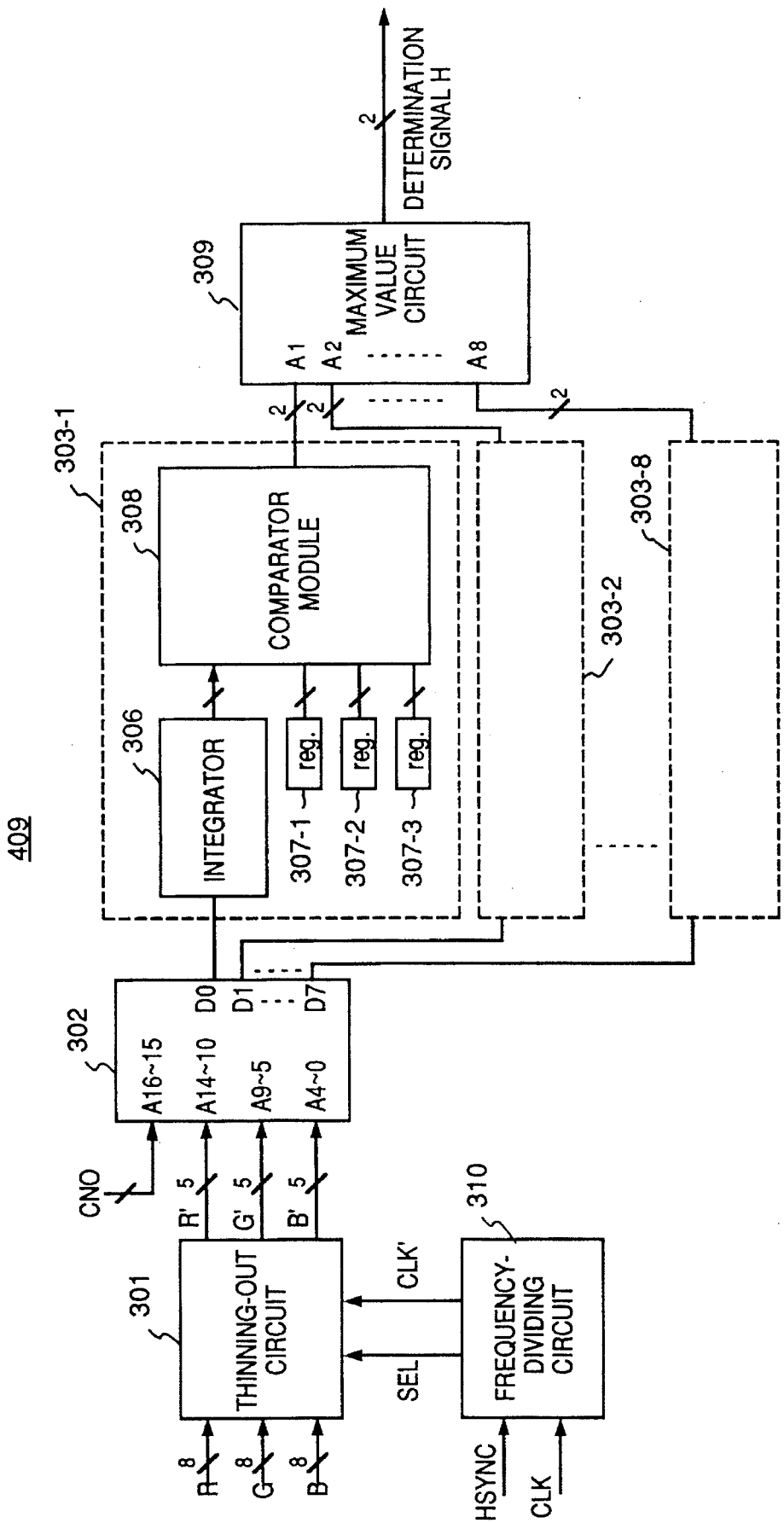
FIG. 3 is a block diagram illustrating the construction of a determination circuit 409.

FIG. 3 is a block diagram of the construction of the determination circuit 409. The thinning-out circuit 301 shown in FIG. 3 thins out data to reduce the processing load of the determination circuit 409. Numeral 302 denotes a color-matching look-up table ROM (hereinafter referred to as a "LUT") which performs the color matching on a plurality of specific originals (securities, bank notes, etc.) and input data. The LUT 302 investigates color distribution with regard to 32 specific originals in advance and holds the results of judgment such as the bit information when the color of a pertinent pixel coincides with a color of the specific original and when the color does not coincide with the color of the specific original. The 32 specific originals are the total in the case where the judgment of eight types of specific originals are respectively assigned to four scanning operations for M, C, Y, and BK.

In the LUT 302, the signal CNO is input to the two higher address bits (A16, A15), and five higher bits of the thinned-out image signal of each of the colors R, G, B are input to the 15 lower address bits (A14–A0) which are thinned out by the thinning-out circuit 301. The operation of the thinning-out circuit 301 will be described later. In each of the signal CNO values 0 to 3, whether the color tone of the pertinent pixel coincides with the color tone of the 8 specific originals is simultaneously output in correspondence with the 8-bit data. That is, if all of the color tones coincide, all bit values of D7–D0 become "1". On the other hand, if none of the color tones coincide, all bit values become "0". Furthermore, if one of the color tones is coincided with the input image signal, the bit value corresponding to that particular signal (one of D7–D0) becomes "1". Accordingly, a determination is made with respect to the 32 specific originals by four cycles of read scanning.

Numerals 303-1, 303-2, . . . , 303-8 (See FIG. 3) denote a color tone determination circuit constituted of the same hardware. Each circuit comprises an integrator 306, registers 307-1, 307-2, 307-3 and a comparator module 308 determines a possibility of the existence of a specific original in the read originals, and outputs a 2-bit determination signal. Numeral 309 denotes a maximum value circuit which outputs a maximum value among the determination results output from the color tone determination circuits 303-1, 303-2, . . . , 303-8 as a 2-bit determination signal. That is, the determination result corresponding to one of the 8 specific originals which is the most probable to exist is output.

The detail of the construction of the thinning-out circuit 301 and frequency dividing circuit 310 shown in FIG. 3 is described below.

Figure 4:
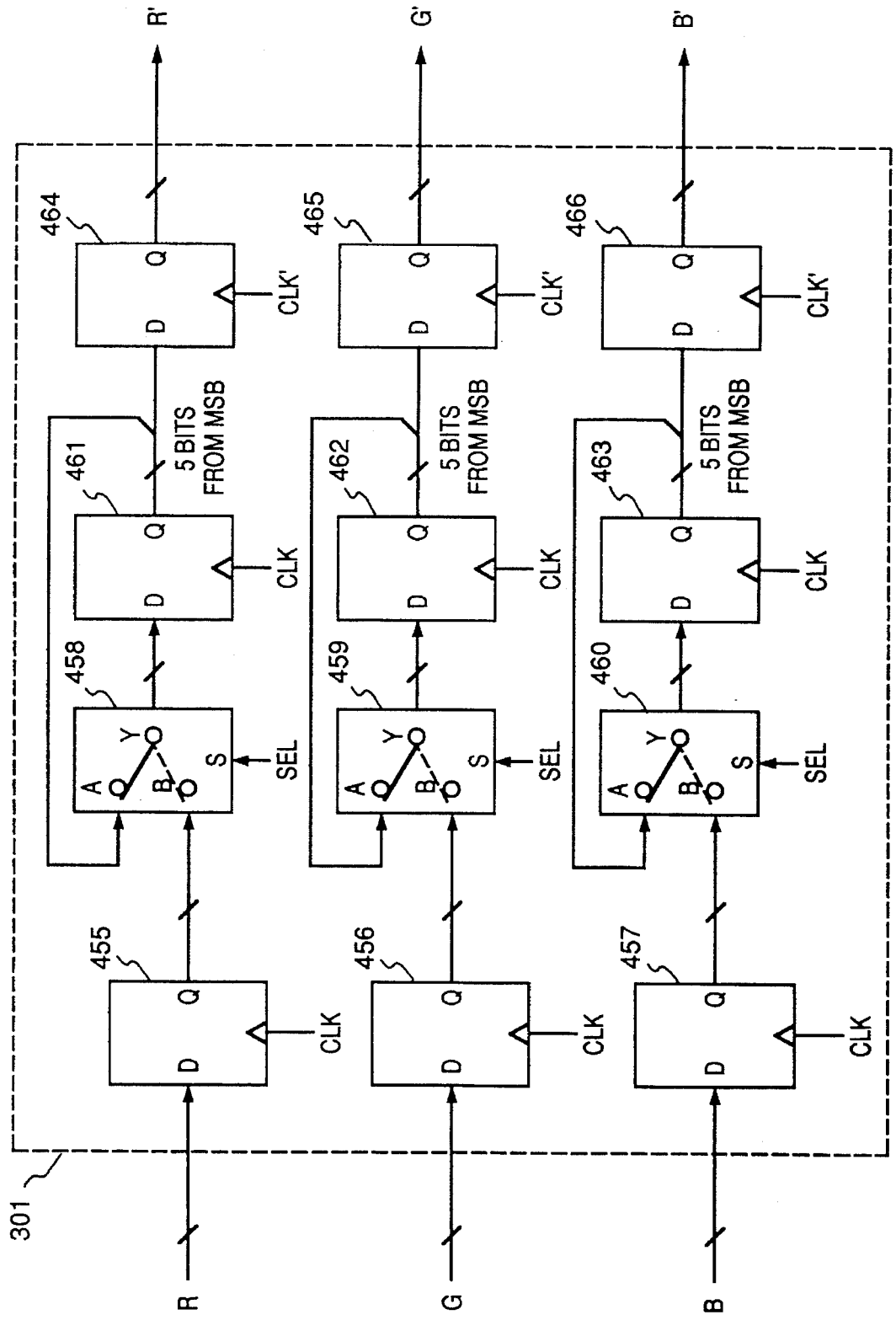
FIG. 4 is a circuit diagram illustrating the construction of a thinning-out circuit 301.
Figure 5:
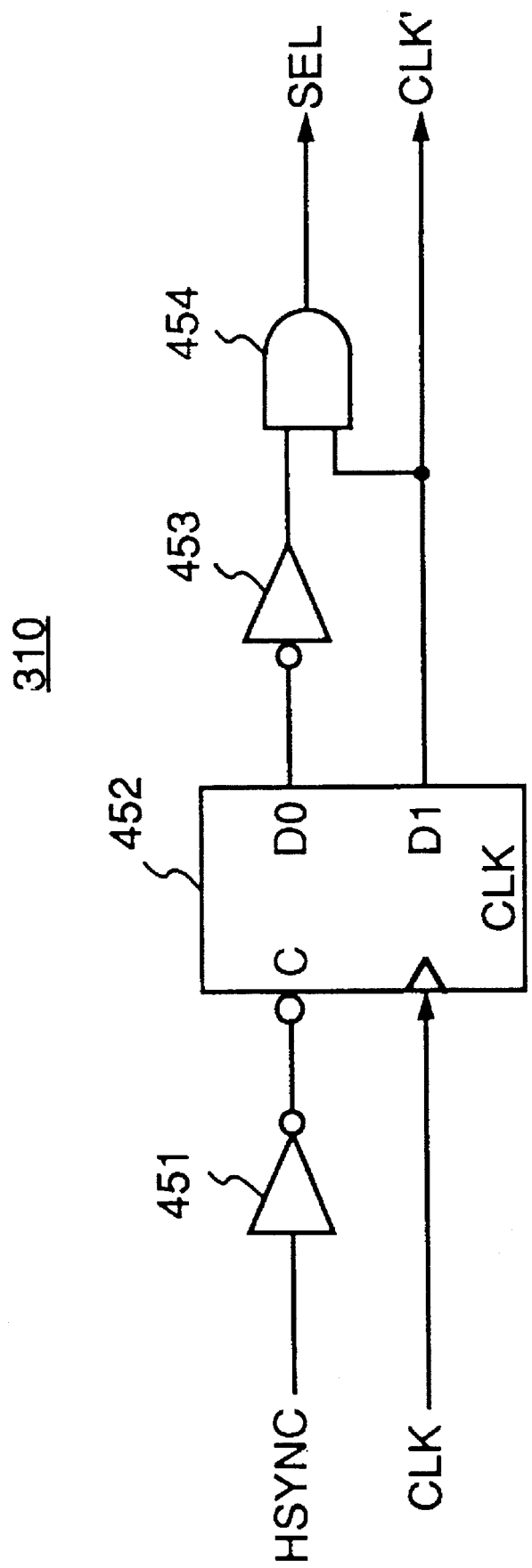
FIG. 5 is a circuit diagram illustrating the construction of a dividing circuit 310.

FIG. 4 is a block diagram of the construction of the thinning-out circuit 310, and FIG. 5 is a block diagram of the construction of the frequency dividing circuit 310. In FIG. 4, numerals 455–457 and 461–466 are flip flops, and numerals 4581–460 are selectors. In FIG. 5, numerals 451 and 453 are inverters, numeral 452 is a 2-bit counter, and numeral 454 is an AND gate.

The flip flops 455, 456, 457, 461, 462, 463 and the selectors 458, 459 460 hold data at the timing of the clock CLK while the flip flops 464, 465, and 466 hold data at the timing of the clock CLK.

In FIG. 4, the 5 higher address bits of the output of the flip flop 462 are input to the flip flop 464 and output as an R' signal. Similarly, the 5 higher address bits of the output of the flip flop 462 are input to the flip flop 465 and output as a G' signal. Similarly, the 5 higher address bits of the output of the flip flop 466 are input to the flip flop 463 and output as a B' signal.

In the frequency dividing circuit 310, the two-bit counter 452 is cleared (initialized) by the signal HSYNC which is the main scanning synchronizing signal, counts the CLK thereafter, and outputs the count value in 2 bits (D0, D1). The upper bit D1 of these count values is output as CLK', and a logical product of an inverted signal of the lower bit D0 and the upper bit D1 is output as an SEL signal.

[Timing Chart (FIG. 6)]

Figure 6:
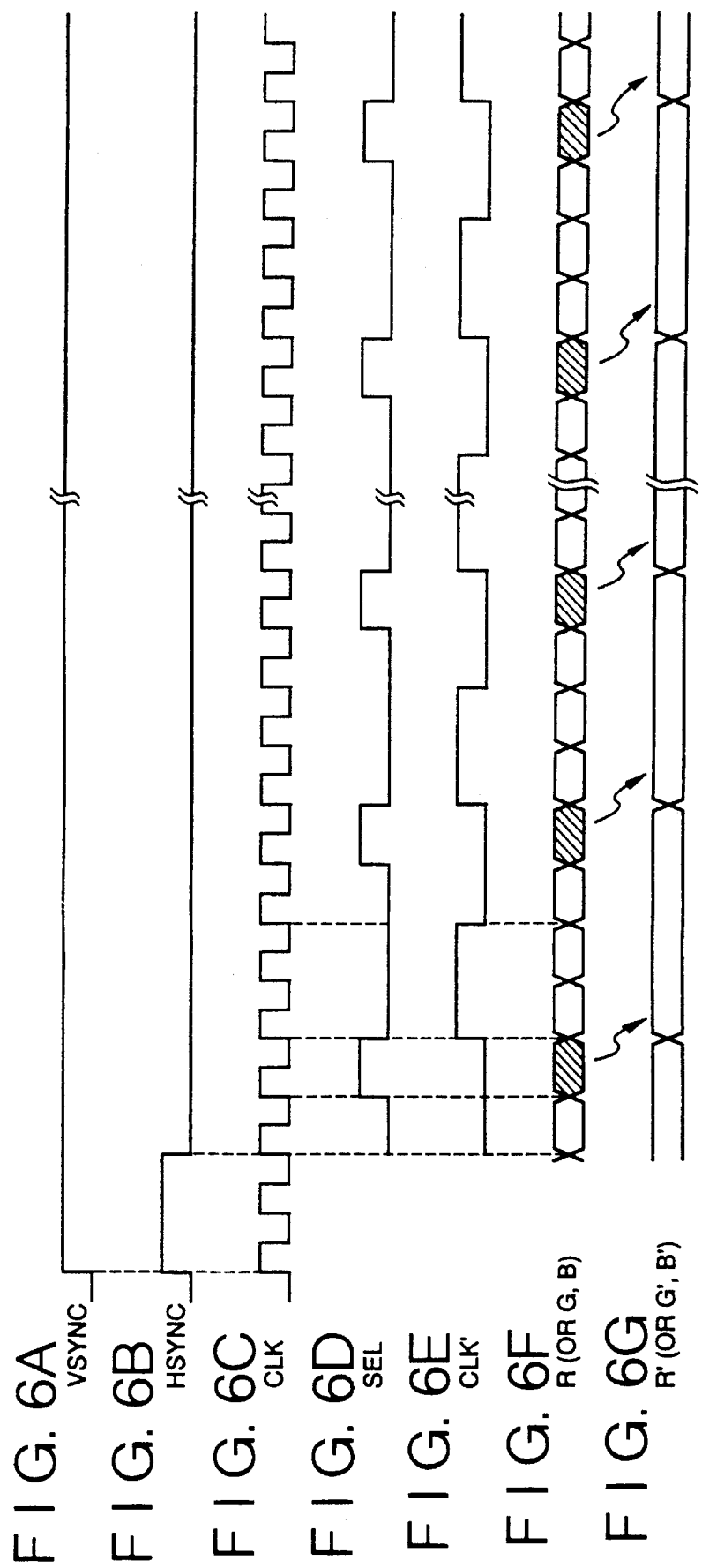
FIG. 6 is a timing chart of a control signal in a main scanning direction.

FIG. 6 is a timing chart of control signals with respect to the main scanning direction in accordance with the embodiment.

A VSYNC signal is a sub-scanning interval signal which indicates an image output interval in the sub-scanning direction. A HSYNC signal is a main scanning synchronizing signal for synchronizing the start of the main scanning. CLK represents an image transfer clock which is a master clock for various image processings in the first embodiment.

On the other hand, CLK' represents a clock which is obtained by dividing the frequency of the CLK by 4 to be used as a master clock for the determination circuit 409. A SEL signal is a timing signal for use in the thinning-out circuit 301. The CLK' clock and SEL signal are generated by the frequency dividing circuit 310 shown in FIG. 5.

As a consequence, in the thinning-out circuit 301, the signal R (G, or B) transferred at CLK is thinned out at a rate of ¼ and is synchronized with CLK' to obtain a signal R' (G', or B') as shown in FIG. 6. As described above, since the information amount is reduced to the 5 higher bits of each of the signals RGB, each of the signals RGB becomes 5-bit signal.

[Integrator (FIGS. 7–9)]

Figure 7:
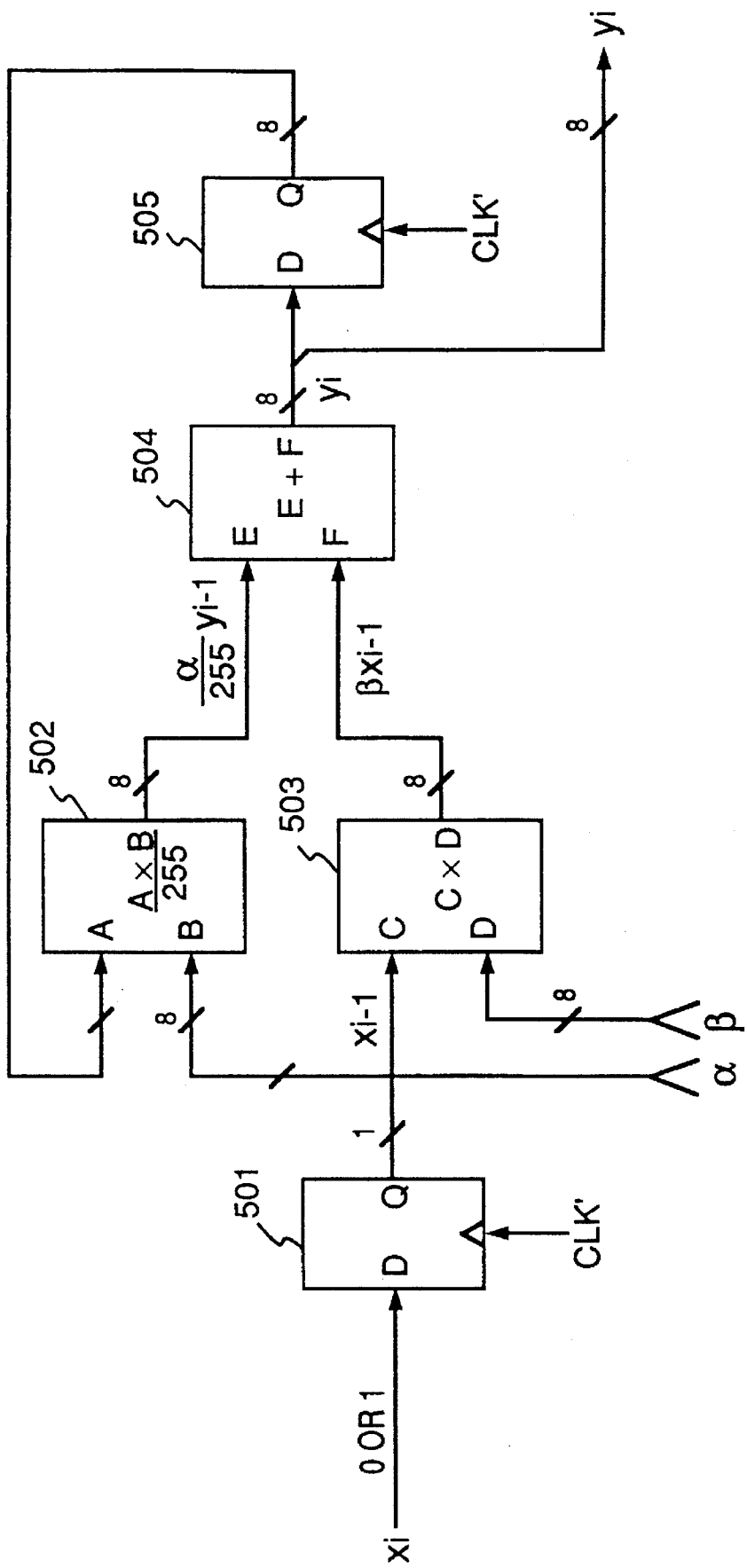
FIG. 7 is a block diagram illustrating the construction of an integrator 306.
Figure 8:
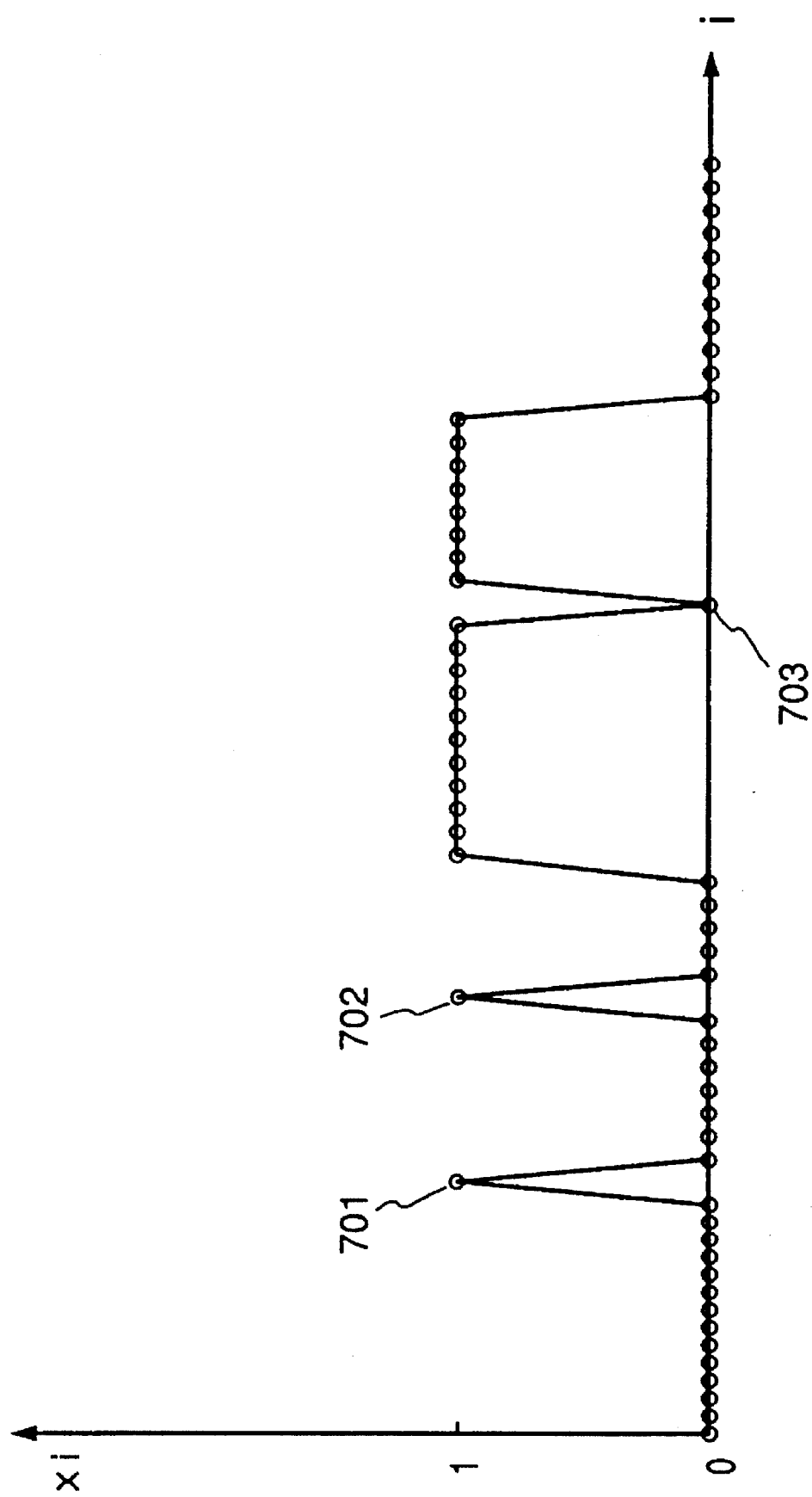
FIG. 8 ms a diagram illustrating an input signal of the integrator 306.
Figure 9:
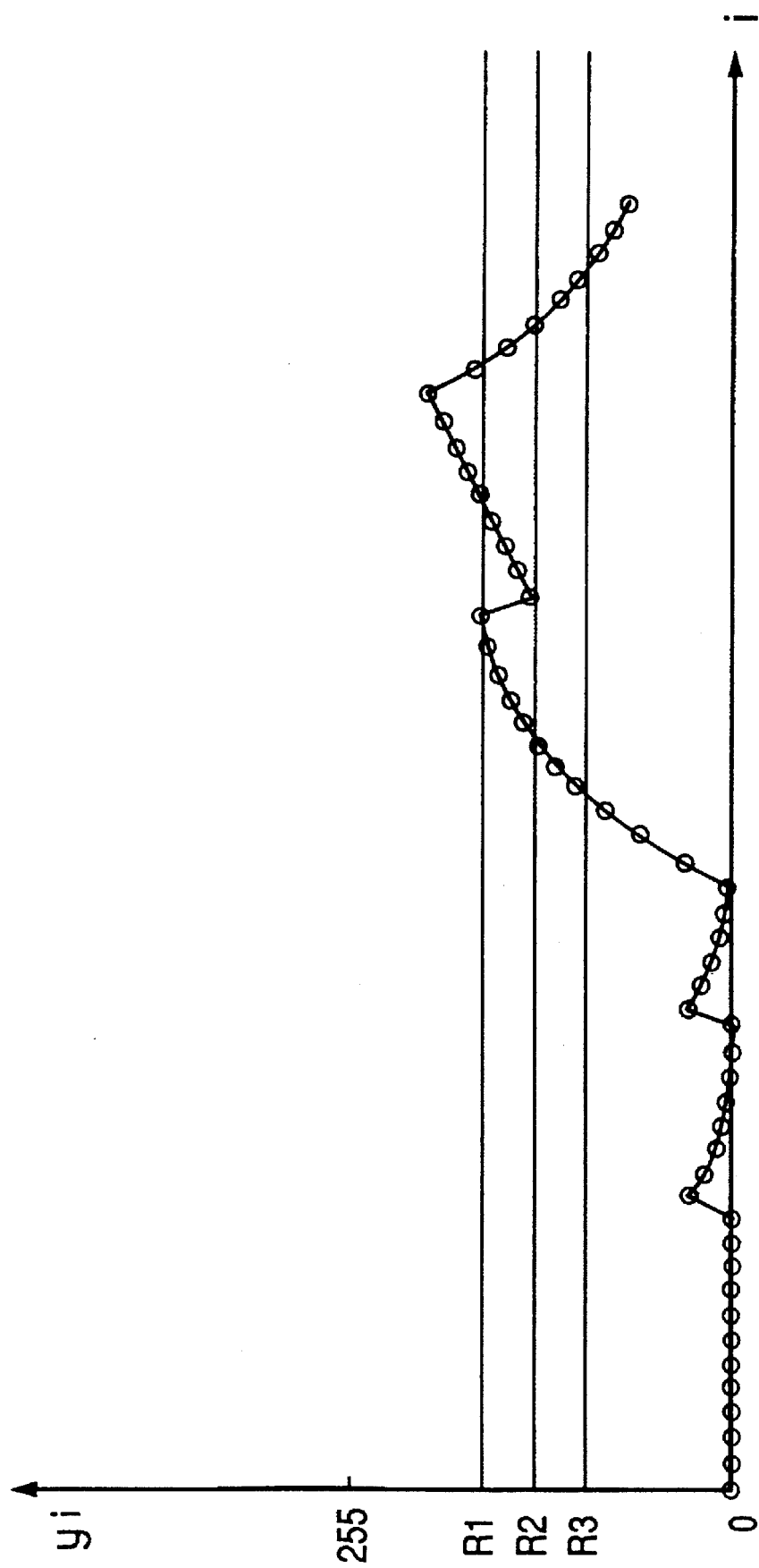
FIG. 9 is a diagram illustrating an output signal of the integrator 306.

FIG. 7 is a block diagram showing the construction of the integrator 306 according to the embodiment, and FIGS. 8 and 9 are diagrams showing the input and output of the integrator 306 according to the embodiment.

In FIG. 7, numerals 501, 505 denote flip-flops which hold data at the timing of the leading edge of the CLK' signal.

Numeral 502 denotes a multiplier to which two 8-bit signals (A, B) are input. The multiplier 502 multiplies these signals together and outputs an 8-bit signal (A×B/255) as the result. Numeral 503 denotes a multiplier to which a 1-bit input signal (C) and an 8-bit input signal (D) are input. The multiplier 503 multiplies these signals together and outputs an 8-bit signal (C×D) as the result. Numeral 504 denotes an adder to which two 8-bit signals (E=A×B/255, F=C×D) are input. The adder 504 adds these signals together and outputs an 8-bit signal $y_i$ (=E+F) as the result.

Accordingly, in the integrator of this embodiment, an 8-bit output signal $Y_i$ is expressed by the following equation when a binary input signal $x_i$ is applied thereto:

$$yi=(\alpha/255)\cdot yi\text{-}1+\beta \cdot x_{i\text{-}1} \tag{1}$$

where $\alpha$ and $\beta$ represent constants that have been preset. The various characteristics of the integrator are decided by the size of these values.

For example, in a case where $\alpha=247$, $\beta=8$ holds, an output $y_i$ of the kind shown in FIG. 9 is produced in response to an input $x_{i-1}$ of the kind shown in FIG. 8.

An input "1" regardless of the fact that values on either side thereof are almost "0", as at points 701, 702, and an input "0" regardless of the fact that values on either side thereof are almost "1" as at point 703, may be considered to be noise. This is processed by the integrator. Specifically, appropriate threshold values such as R1, R2, R3 are set respectively in the registers 307-1~307-3 of FIG. 3, and the output $y_i$ of the integrator is binarized based upon these threshold values, whereby the noise is removed.

[Comparator Module (FIG. 10)]

Figure 10:
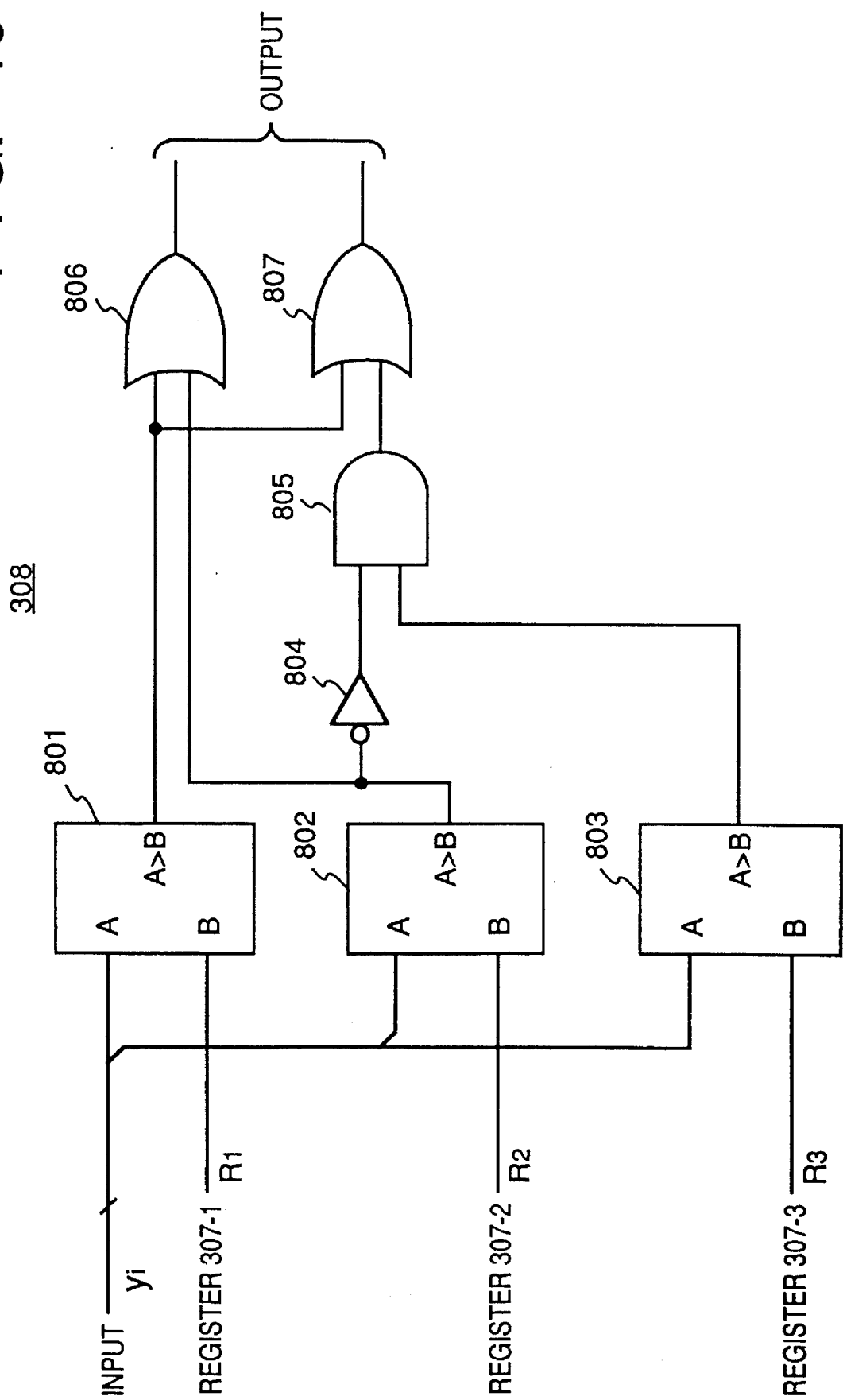
FIG. 10 is a block diagram illustrating the construction of a comparator module 310.

FIG. 10 is a block diagram of the construction of the comparator module 308 according to the first embodiment. In FIG. 10, numerals 801, 802, and 803 denote comparators, numeral 804 denotes an inverter, numeral 805 denotes an AND gate, and numerals 806 and 807 denote OR gates.

As described earlier for the explanation of the integrator 306, threshold values R1, R2, and R3 mentioned above with reference to FIG. 9 are previously set in the registers 307-1, 307-2, and 307-3, respectively. The relation such as R1>R2>R3 is established. Accordingly, the determination result is then quantized into 2 bits and output. That is:

OUTPUT=11 (binary) is output if R1<(input; $y_i$),

OUTPUT=10 (binary) is output if R2<(input; $y_i$)≦R1,

OUTPUT=01 (binary) is output if R3<(input; $y_i$)≦R2; and

OUTPUT=00 (binary) is output if (input; $y_i$)≦R3.

[Pattern Addition Circuit (FIGS. 11–13)]

Figure 11:
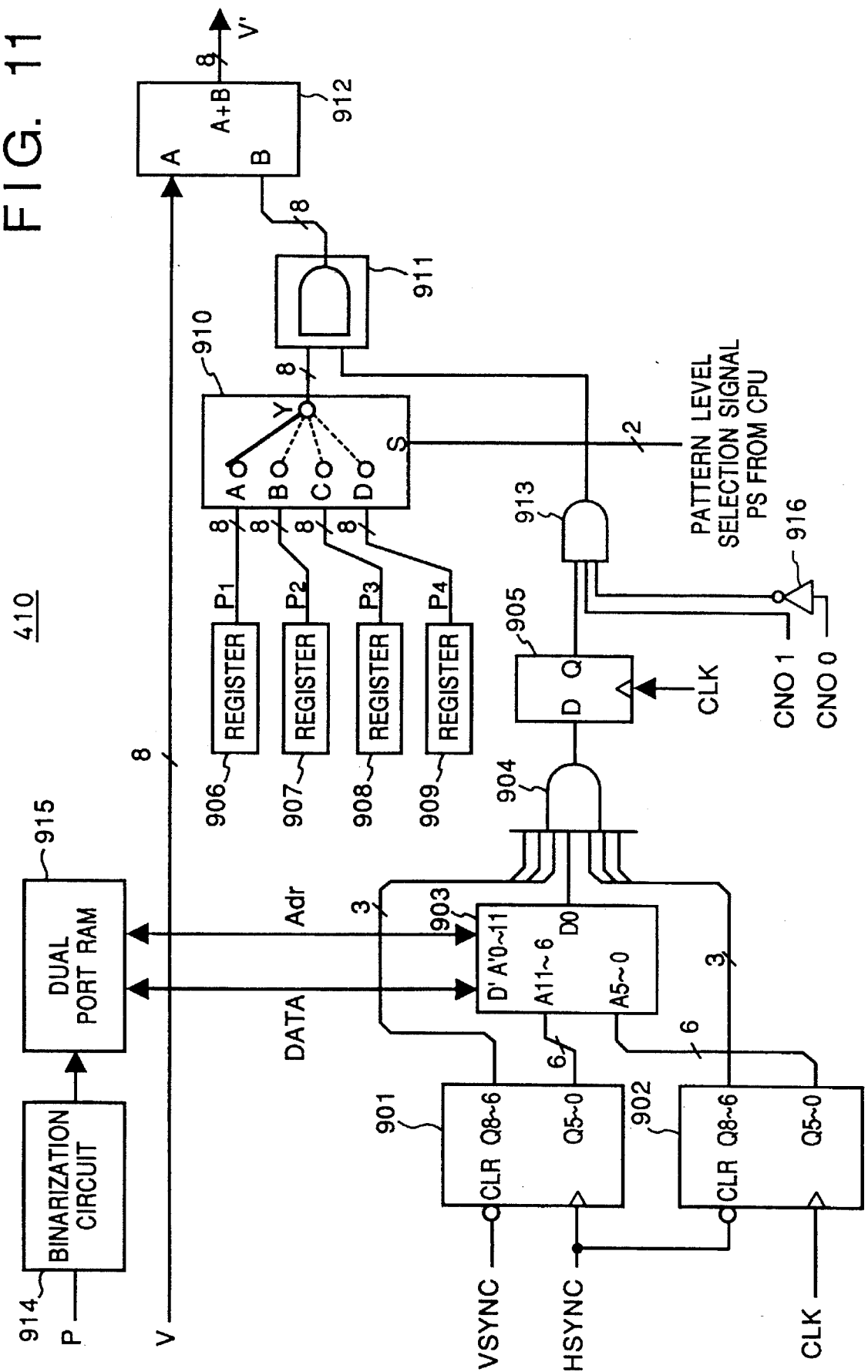
FIG. 11 is a block diagram illustrating the construction of a pattern addition circuit 410.
Figure 12:
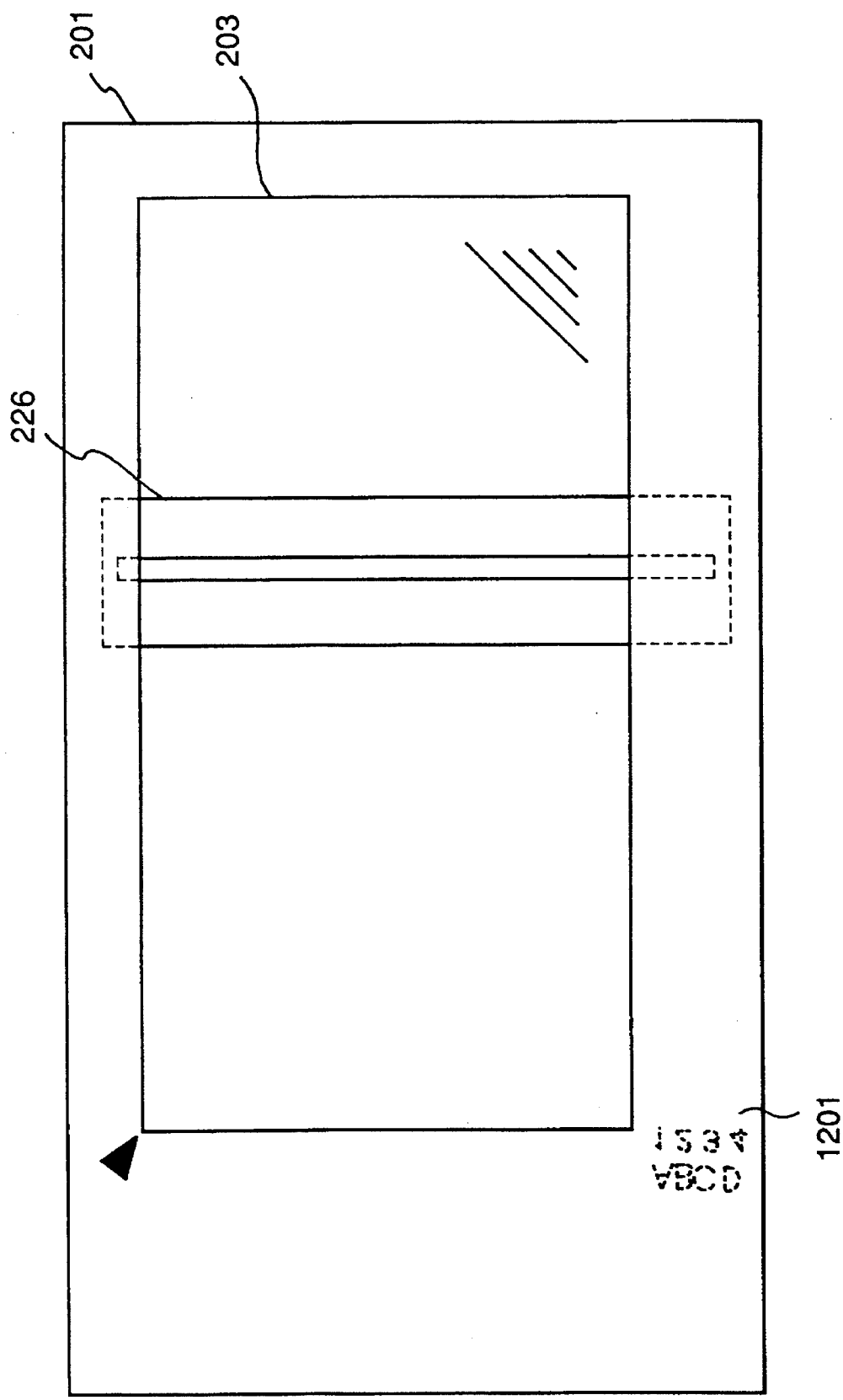
FIG. 12 is a top view of an original glass table (platen) 203.

FIG. 11 is a block diagram of the construction of the pattern addition circuit 410 according to the embodiment. FIG. 12 is a top view of the original glass table (platen) 203.

In FIG. 11, numeral 901 denotes a sub-scanning counter, numeral 902 represents a main scanning counter, numeral 903 denotes a look-up table RAM (hereinafter referred to as a "LUT"), numeral 904 denotes an AND gate, numeral 905 denotes a flip flop, numerals 906, 907, 908, and 909 denote registers, numeral 910 denotes a 4 to 1 selector, numerals 911 and 913 denote AND gates, numeral 912 denotes an adder, and numeral 914 denotes a binarization circuit which binarizes an image signal P which has been filtered by a spatial filter. The binarization circuit 914 outputs "1" when a value of the image signal is greater than the predetermined threshold, while the circuit 914 outputs "0" when the value is smaller than the predetermined threshold. The binary data which is output from the circuit 914 is written in a dual port RAM 915.

The image to be written in the dual port RAM 915 is an image which has been written in a particular place in the image scanner 201 such as 1201 in FIG. 12. The image is placed on a component in the reader which cannot easily be exchanged, i.e. at the outer side of the original glass table (platen) 203 (a frame part supporting the glass plate) and the under surface of the supporting frame within the area where the image sensors of the Carriage 226 can read that image.

When an image is written in the dual port RAM 915, the signal CNO is set to "0" (magenta recording scanning). It is controlled so that the image signal P is a signal derived from the green (G) signal of the CCD 210. This is because the green signal is the closest to the brightness signal of the image among the signals which can be easily produced.

The data stored in the dual port RAM 915 is read via a data bus Data and an address bus Adr by CPU 414. Since the LUT 903 is also a dual port RAM, the CPU 414 writes the same data as the one read out from the RAM 915 into the LUT 903.

Figure 13:
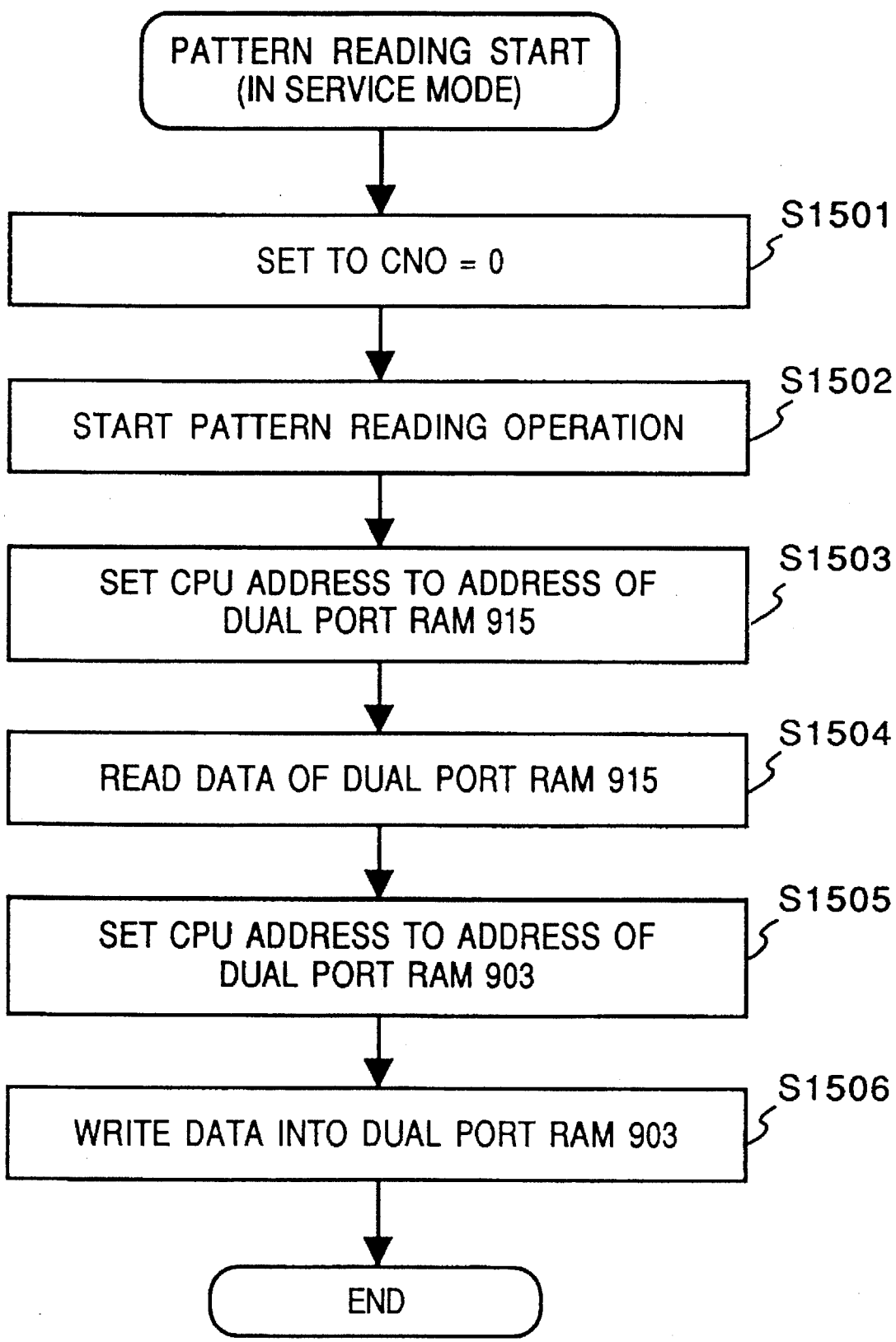
FIG. 13 is a flowchart for explaining a service mode.

The writing operation of the pattern to the LUT 903 (hereinafter, this is referred to as a "service mode") is described with reference to the flowchart of FIG. 13. This is a mode which is only executed by a copy maintenance engineer once at the installation of the color copying machine. A reading operation of the pattern to be added to a specific original (writing operation of the pattern to the LUT 903) is performed when the service mode is on.

In the service mode, the CPU 414 sets the signal CNO to "0" (step S1501) and starts a pattern reading operation (step S1502). The CPU 414 sets a CPU address to the address of the dual port RAM 915 (step S1503) and reads the data out of the dual port RAM 915 (step S1504).

The CPU 414 then sets the CPU address to the address (A'11-A'0) of the LUT 903 (step S1505) and writes the data read out from the dual port RAM 915 with respect to the LUT 903 (step S1506). The data is written via the I/O terminal D of the LUT 903.

The sub-scanning counter 901 counts the main scanning synchronizing signal HSYNC while the main scanning counter 902 counts the signal CLK. Each counter repeatedly counts the signal in a cycle of a 9-bit width, that is, 512 cycles. As described above, the LUT 903 stores the patterns to be added and is supplied with the lower 6 bit (Q5–Q0) of each count value from the sub-scanning counter 901 and the main scanning counter 902.

The AND gate 904 carries out the logical product (AND) between the output of the RAM 903 and each bit of an higher three bits (Q8–Q6) of the main scanning counter 901 and the sub-scanning counter 902 with reference to the 1 bit (D0). This logical product is synchronized with the CLK signal by the flip flop 905. After the AND gate 913 carries out the logical product between the 2-bit CNO0 signal (LSB side) and the 2-bit CNO1 signal (MSB side), the result of the AND operation is output to the AND gate 911. The value of the CNO0 signal is then inverted by the inverter 916. This signal is effective only when CNO=2, that is, only when printing is being performed in yellow.

Values P1, P2, P3, and P4 are stored in advance in the registers 906, 907, 908, and 909, respectively. One of the values P1–P4 is selected according to the pattern level selection signal PS designated by the CPU 414 and the value is supplied through the AND gate 911 to the adder 912 where a pattern signal is added to an input signal V. The signal obtained by the adder 912 is output as a signal V'. Accordingly, in the case of CNO=2, that is, printing in yellow is being performed, the pattern stored in the RAM 903 is repeatedly read out and added to the signal to be output.

It should be noted that a relationship P1<P2<P3 <P4 is established in P1, P2, P3 and P4. In the selector 910, the following relation is set:

Y=A is set when PS=00 (binary),
Y=B is set when PS=01 (binary),
Y=C is set when PS=10 (binary),
Y=D is set when PS=11 (binary).

Therefore, a pattern is added so that:

V'=V+P1 when PS=00 (binary),
V'=V+P2 when PS=01 (binary),
V'=V+P3 when PS=10 (binary),
V'=V+P4 when PS=11 (binary)

The adding pattern is formed only with a yellow toner so as to be difficult to visually discriminate. This method is intended to utilize the fact that the visual discriminating ability is weak with respect to a pattern formed with yellow toner. Furthermore, it is arranged is such that the level of the pattern to be added can be varied according to the possibility of the existence of a specific original in the input original. It is thereby possible to make the pattern very difficult to visually discriminate in ordinary copies. On the other hand, the pattern is added more distinctly as the possibility of the existence of a specific original increases.

[Result of the Duplications (FIG. 14)]

Figure 14:
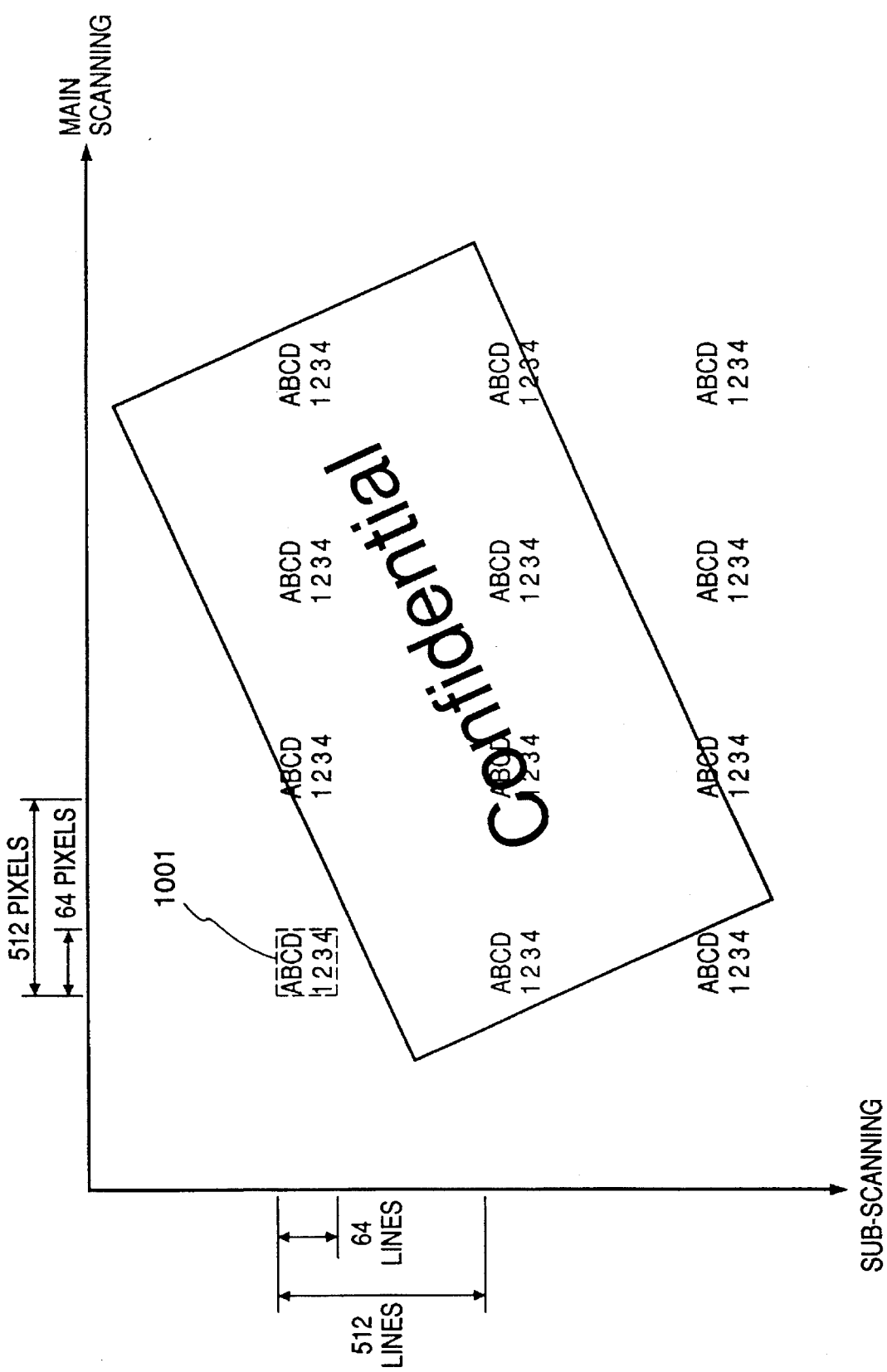
FIG. 14 is a diagram illustrating an example of the result of duplication.

FIG. 14 is a diagram showing an example of the result of duplications according to the first embodiment. In FIG. 14, an adding pattern is indicated by numeral 1001. The content stored in the LUT 903 is added. In the example shown in FIG. 14, the adding pattern which is "ABCD" and "1234" in the two rows is formed in 64×64 pixels such as to be difficult to visually discriminate. This pattern is repeatedly formed at intervals of 512 pixels in the main scanning direction and at intervals of 512 lines in the sub-scanning direction. If this adding pattern represents a manufacturer's serial number exclusively assigned to the copying machine or encoded pattern of this number, the machine used for copying can be identified by examining the duplicates.

If there is a high possibility that a specific original which is prohibited from copying exists in the read image, a more distinguishable pattern can be added on the image in black toner.

In the first embodiment, the pattern adding pitch is predetermined as 512 pixels in the main scanning direction and 512 lines in the sub-scanning direction. The patterns are therefore added at intervals of approximately 32.5 mm since the copying machine according to the first embodiment has a resolution of 400 dpi (dots/inch). A bank note of the Bank of Japan has a height of approximately 76 mm in the direction along its short side. The short side of the paper money of major countries in the world ranges from approximately 60 mm to 120 mm. The pattern can therefore always be added when duplicating any bank note. Accordingly, if a part of the bank note forgery is cut out and used, the information on the serial number of the copying machine used can be determined by examining the part of the duplicate and reading the add-on pattern.

[Procedure of Setting the Pattern Level Selection Signal PS (FIG. 15)]

The procedure of setting the pattern level selection signal PS executed by the CPU 414 is described with reference to the flowchart of FIG. 15.

Immediately after the start of copying, at step S1102, "0" is set in the pattern level selection signal PS. At step S1103, the present determination level H and the value of PS are compared. If H is greater, the value of H is set in PS at step S1104. If H is not greater, the process returns to step S1103.

That is, the maximum value among the values from the copying start to the present time is set according to the recording history of the determination signal H.

As described above, in the embodiment, a particular pattern which is difficult to visually recognize is added in accordance with the degree of the possibility of existence of a specific pattern, so that the pattern can be used as a key to identifying the copying machine in a case where a specific original (e.g. bank notes) which' should not be copied is duplicated. The particular pattern is repeatedly added at a pitch shorter than the height of the bank note in the direction along the short side thereof, so that the added particular pattern can always be included in a part of the copy of the bank note which may be cut out to use. It is possible to ascertain the copying machine used or it helps investigate the person who might have operated the copying machine or, at least, to reduce the number of suspected machines or persons by examining the add-on pattern.

<Second Embodiment>

In the embodiment, as for addition of a predetermined pattern described in the first embodiment, the case where it is controlled so that a density of the predetermined pattern is changed in accordance with the position of an original image to be duplicated, is described below.

Figure 17:
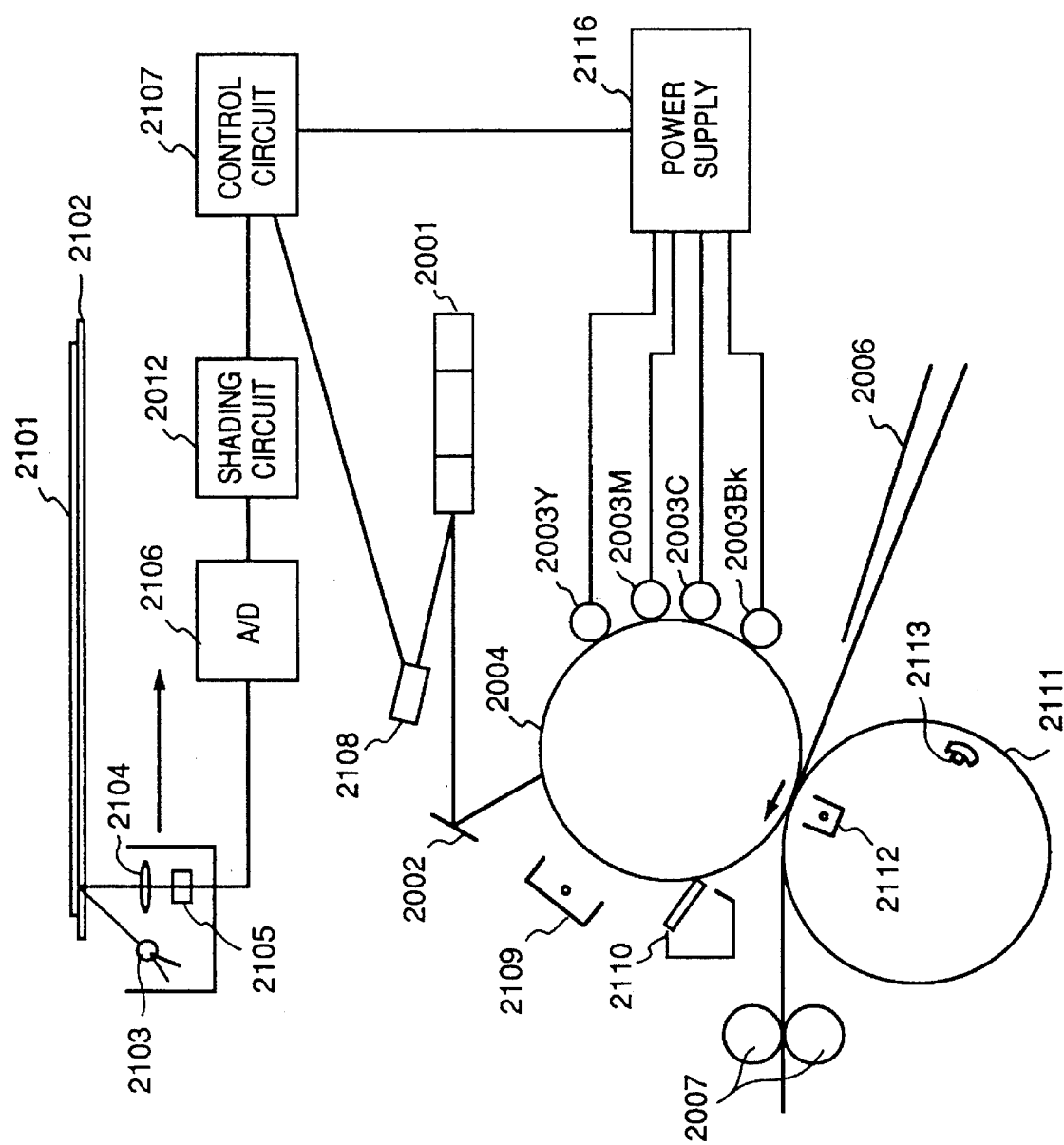
FIG. 17 is a side view illustrating the construction of main portions of the full-color copying machine in accordance with a second embodiment.

FIG. 17 is a sectional view illustrating the construction of the main portions of the full-color copying machine according to the embodiment. In FIG. 17, numeral 2001 is a polygon mirror, numeral 2002 is a mirror, numeral 2003Y is a yellow developing unit, numeral 2003M is a magenta developing unit, numeral 2003C is a cyan developing unit, numeral 2003BK is a black developing unit, numeral 2004 is a photosensitive drum, numeral 2006 is a recording paper, numeral 2007 is a fixing roller, numeral 2101 is an original image, numeral 2102 is an original glass table (platen), numeral 2103 is a light source, numeral 2104 is an optical lens, numeral 2105 is a CCD, and numeral 2106 is an A/D converter. Numeral 2012 is a shading circuit for performing a shading correction of a digital signal obtained from the A/D converter 2106, numeral 2107 is a control circuit internally storing the CPU identification number, numeral 2108 is a semiconductor laser, and numeral 2116 is a power supply. Furthermore, numeral 2109 is an electrostatic charger, numeral 2110 is a cleaning blade, numeral 2111 is a transfer drum, numeral 2112 is a transfer electrostatic charger, and numeral 2113 is an ITOP generating circuit.

The color image formation sequence by the full-color copying machine with the above arrangement is described below.

First, an image original 2101 placed on the platen 2102 reflects a light irradiated from a light source 2103, the reflected light is collected by the optical lens 2104, and an image is formed on a CCD 2105. The formed image is then converted to an image signal corresponding to the amount of received light.

The image signal is converted to a digital value by the A/D converter 2106 and the converted digital value is subject to the image processing in a control circuit 2107. Subsequently, the laser diode 2108 is driven in accordance with the processed image signal (density signal).

A laser beam radiated by the semiconductor laser 2108 is reflected by the polygon mirror 2001 and mirror 2002, and irradiated onto the photosensitive drum 2004.

The surface of the photosensitive drum 2004 is cleaned by the cleaning blade 2110 so that toners will not contact in advance. Then, the surface of the photosensitive drum 2004 is equally electrified by the electrostatic charger 2109 so as to be equipotential.

The photosensitive drum 2004 where a latent image is formed by scanning of the laser beam in accordance with the image signal Y (yellow) is rotated to the arrow's direction shown in FIG. 17, and an image is developed by the developing unit 2003Y.

The photosensitive drum 2004 is further rotated and the recording paper 2006 is drawn in and wound by the transfer drum 2111, and then a toner image formed on the photosensitive drum 2004 by the transfer electrostatic charger 2112 is transferred to the recording paper 2006.

Subsequently, a similar latent image formation is performed by using the image signal of M, and the M image is multi-transferred onto the recording paper 2006, at the registration of the image, where the Y image has already been transferred.

Similarly, the image formation and multi-transfer are performed in accordance with the image signals of C and BK. Subsequently, the recording paper 2006 is removed from the transfer drum 2111 and carried to the fixing roller 2007, and the image is fixed, thus a color image printing is completed.

Figure 18:
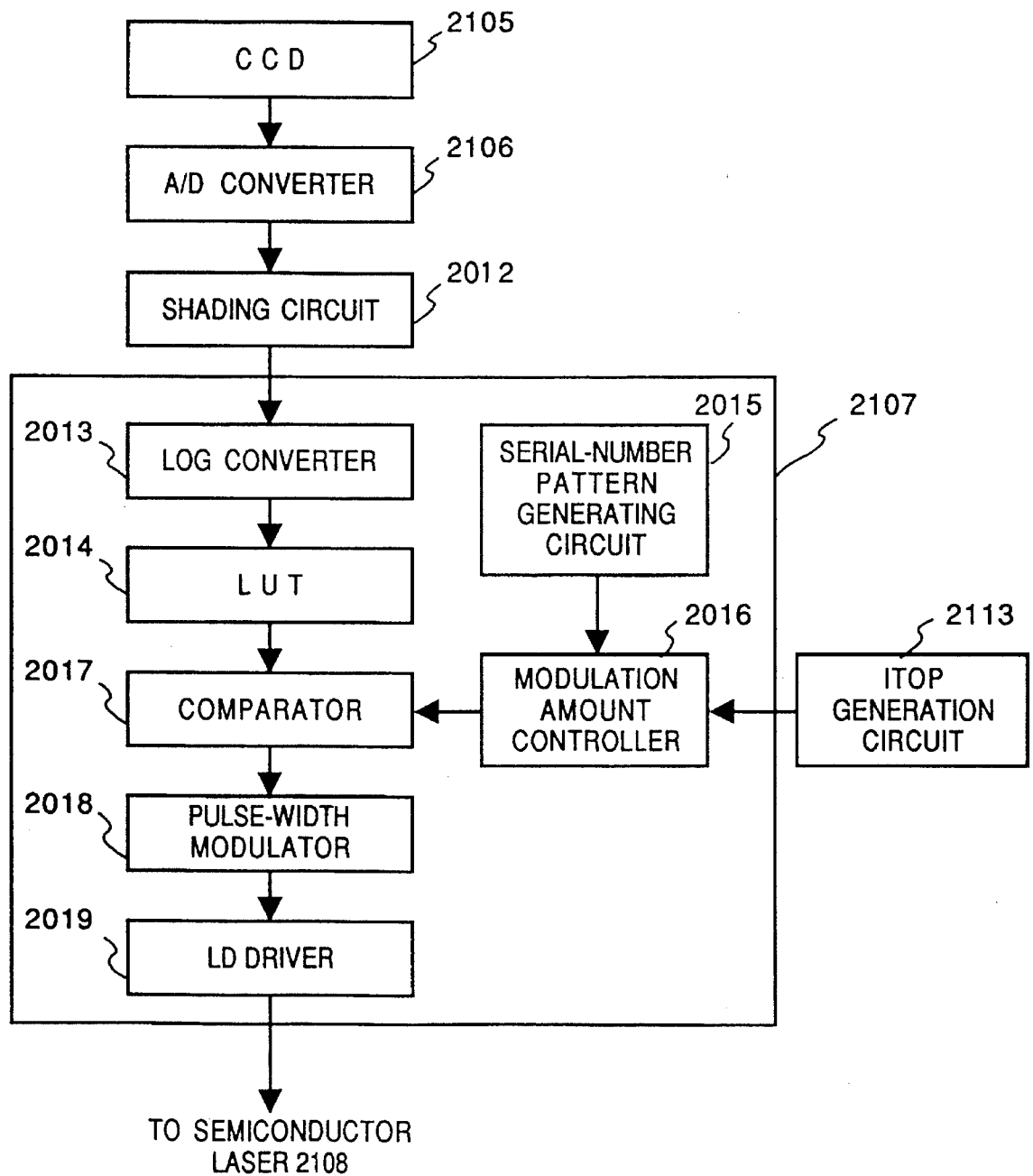
FIG. 18 is a block diagram illustrating the construction of a control Circuit 2107 shown in FIG. 17 which controls a modulation amount of a serial-number pattern added using an ITOP signal as an input.

FIG. 18 is a block diagram illustrating the construction of the control circuit 2107 of the full-color copying machine in accordance with the embodiment. In FIG. 18, numeral 2013 is a LOG converter, numeral 2014 is a LUT (look up table), numeral 2015 is a serial-number-pattern generation circuit, numeral 2016 is a modulation amount controller, numeral 2017 is a comparator, numeral 2018 is a pulse-width modulator, and numeral 2019 is a LD driver.

The image processing of the image signal (brightness signal) obtained by the CCD 2105 executed by the controller 2107 is described below.

First, an image signal (a brightness signal) obtained by the CCD 2105 is converted to a digital brightness signal by the A/D converter 2106. The digital brightness signal is subject to the shading correction in the shading circuit 2012 and the sensitivity fluctuation of each CCD is corrected. The corrected brightness signal is then input to the control circuit 2107.

In the control circuit 2107, the LOG converter 2013 converts the corrected brightness signal to a density signal. The density signal is further converted by the LUT 2014 so that the γ characteristic of the printer at the initial setting coincides with the original image density and the output image.

On the other hand, the serial-number-pattern generating circuit 2015 generates a pattern which is unique to each copying machine. Similar to the first embodiment, in this embodiment, a gap signal representing the unique pattern shown in FIG. 19 is added to the image density signal of Y (yellow) which serves as a least visually sensitive color. In the embodiment, as a unique pattern, a serial-number pattern (numerical pattern) as shown in FIG. 20 is used. Furthermore, in FIG. 19, a lateral axis represents a distance from the edge of a recording paper.

This serial-number pattern is read, after the full-color image is formed, by observing via a 350 nm narrow band filter, which separates the yellow signal. Accordingly, if counterfeits are made, the copying machine used for forgery can be identified. In the embodiment, the serial-number pattern corresponds to a numerical pattern as shown in FIG. 20. It is preferable to use an imperceptible pattern composed of numbers or characters.

Furthermore, in order to add this serial-number pattern, a modulation amount (which corresponds to "d" in FIG. 19) is determined by the modulation amount controller 2016 with reference to a reference signal indicating an image start position supplied from the ITOP generation circuit 2113. The modulation amount is output to the comparator 2017 where it is added to the read image signal.

The image signal including the serial-number pattern is modulated by a pulse-width modulator 2018 so as to be a laser luminance period in proportion to the density signal and the modulated image signal is transmitted to the laser driver 2019. In this way, a tone image is formed by expressing a density as a variation of an area where toner is contacted in accordance with the modulated image signal.

Figure 21:
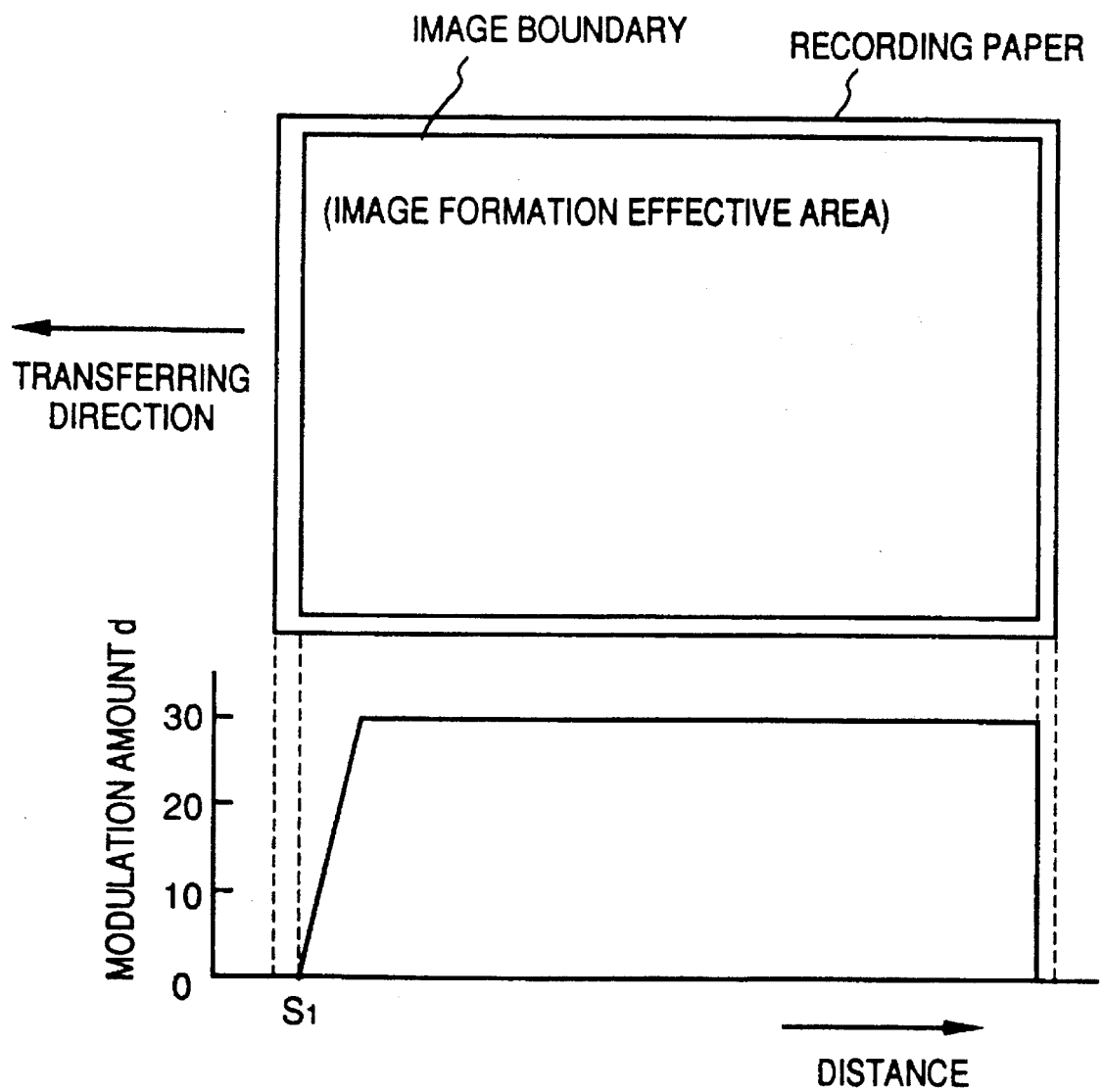
FIG. 21 is a diagram illustrating the relationship between an image signal for adding the serial-number pattern and a position where the serial-number pattern is added on a recording paper.

The modulation amount (d) of the image signal for adding the serial-number pattern is set by the modulation amount controller 2016 as shown in FIG. 21 depending on the add-on position of the recording paper 2006.

The area where an image is formed (image formation effective area) is set so as to be within the recording paper as shown in FIG. 21. This is because the transfer drum 2004 becomes dirty and the inside of the copying machine is eventually likewise dirtied, if the image formation effective area is larger than the recording paper. Moreover, it is meaningless to form an image which is larger than the recording paper. Hereinafter, the edge of the image formation effective area shown in FIG. 21 is referred to as an "image boundary".

When the relationship between the size of the recording paper and the image formation effective area is considered, in a case where the serial-number pattern is added over the entire recording paper and the portion in which the value of image density signal is substantially 0 exists on the boundary, fog appears in the image formation effective area because of the density gap between the serial-number pattern and the margin of the recording paper. For example, if the density gap indicated by a dotted circle shown in FIG. 19 exists in the vicinity of the image boundary, fog appears outstanding.

Therefore, as shown in FIG. 21, the modulation amount controller 2016 takes a timing based on the ITOP signal generated by the ITOP generation circuit 2113, and sets the modulation amount (d) to 0 in the start position ($S_1$) for writing an image. The modulation amount controller 2016 performs control in a manner such that the further the writing position is from the image boundary, the greater the modulation amount becomes until the writing position reaches a predetermined distance from the image boundary.

According to the embodiment, since a full-color image is formed by printing over the images formed by a plurality of color toners and an addition of information which is unique to the full-color copying machine onto the image of a predetermined color is performed by changing the modulation amount of the add-on pattern in accordance with the distance from an image boundary, fog due to the pattern generated in the image boundary area can be made imperceptible.

Figure 22:
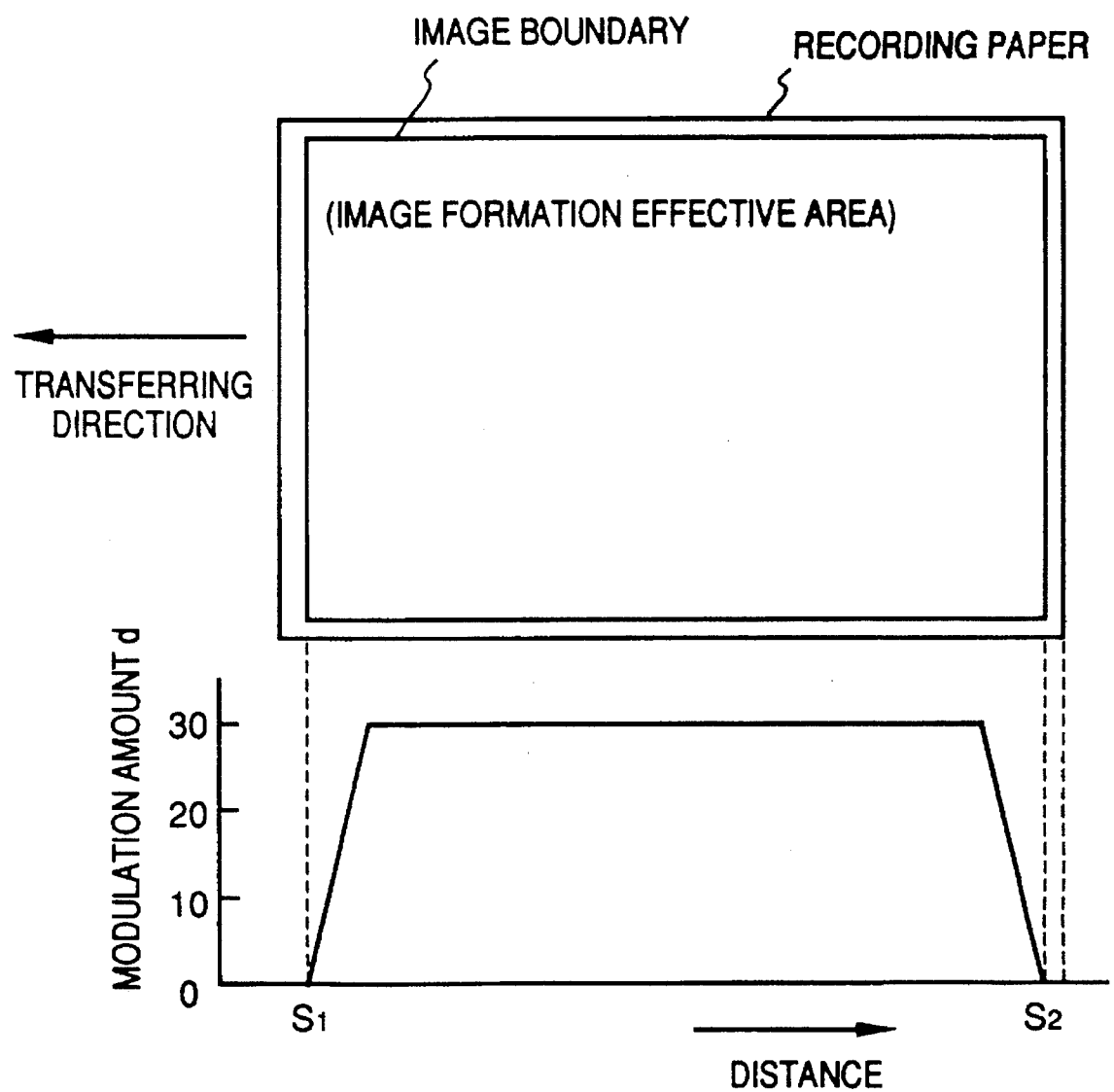
FIG. 22 is a diagram illustrating another example of the relationship between an image signal for adding the serial-number pattern and a position where the serial-number pattern is added on a recording paper.

Furthermore, in the embodiment, the modulation amount of the add-on pattern is controlled only in the leading edge side in the transforming direction of the recording paper. However, as shown in FIG. 22, the control in the ending edge side can also be performed. According to FIG. 22, the modulation amount goes toward "0" as approaching the leading edge (S1) and the ending edge (S2) of the image formation effective area of the recording paper. Accordingly, fog appeared by addition of the serial-number pattern can be made imperceptible in both edges of the image formation effective area.

In addition, it can be arranged such that the modulation amount Of the add-on pattern in the right edge and left edge of the recording paper (both edges of the image formation effective area which are perpendicular to the transferring direction) is controlled.

Figure 23:
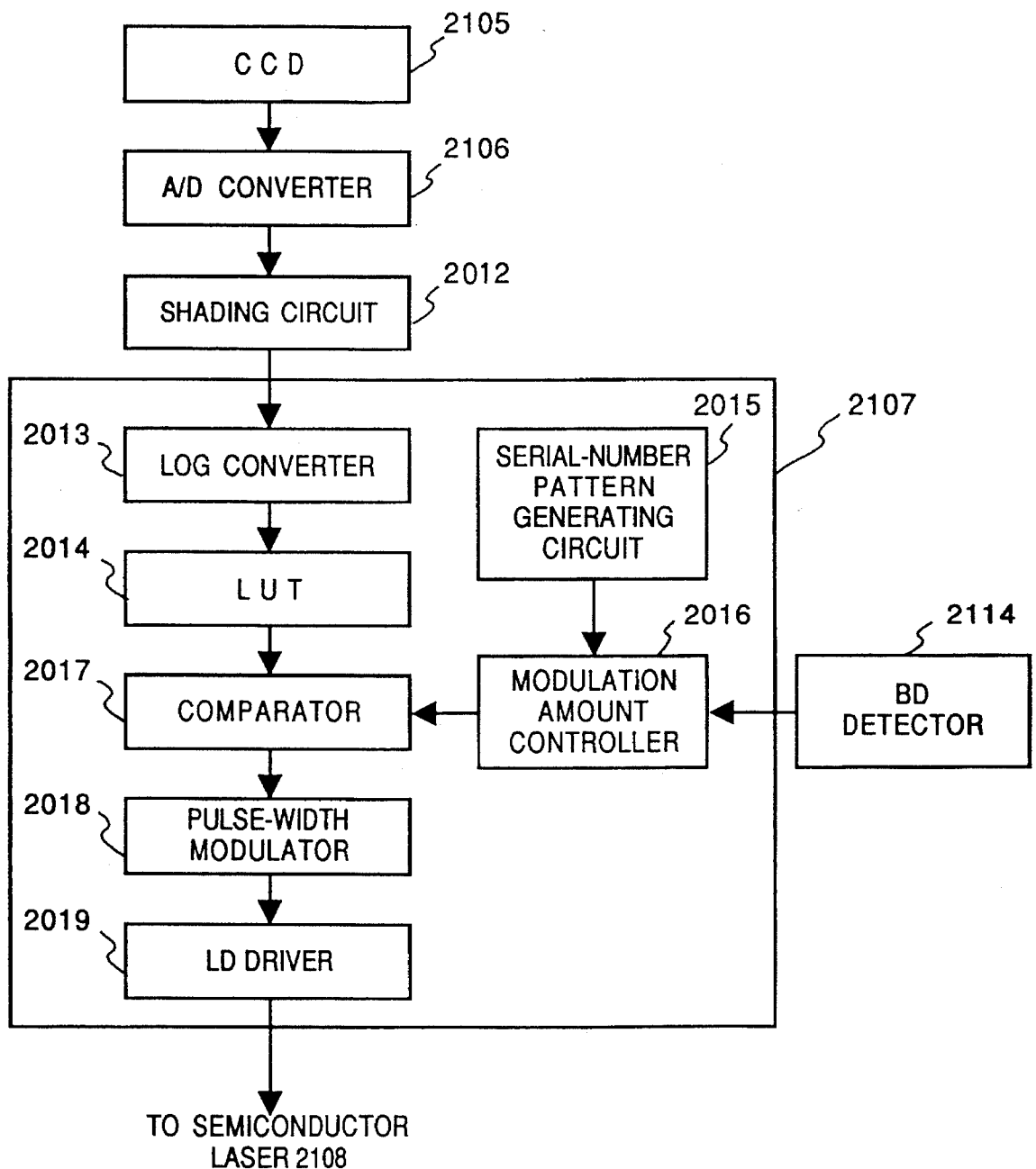
FIG. 23 is a block diagram illustrating the construction of a circuit which controls a modulation amount of the serial-number pattern which is added using a BD signal as an input.
Figure 24:
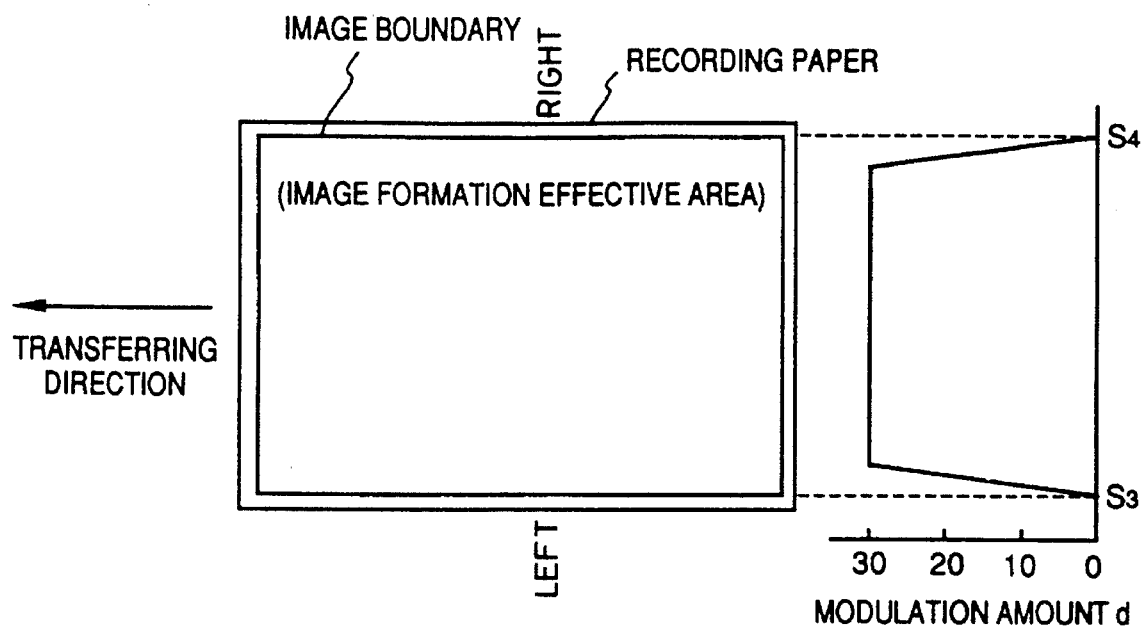
FIG. 24 is a diagram illustrating an example where the right and left edges of the recording paper are detected in accordance with the BD signal, and then the modulation amount is set.

For example, as shown in FIG. 23, instead of a detecting signal of the leading portion of a recording paper supplied from the ITOP generator 2113, a BD signal supplied from the BD detector 2114 is input to the control circuit 2107 and a latent image formation start position in the main scanning direction is detected by a laser beam, and the positions of the right and left edges of the recording paper are predicted from the detected position. Subsequently, as shown in FIG. 24, the modulation amount on the right and left edges of the image is controlled. According to FIG. 24, as approaching the left edge ($S_3$) and the right edge ($S_4$) of the image formation effective area of the recording paper, the modulation amount goes toward "0" thus the modulation amount at the left edge and right edges ($S_3$, $S_4$) becomes "0". Accordingly, fog appearing due to addition of the serial-number pattern can be made indistinctive in both edges ($S_3$, $S_4$) of the image formation effective area.

Figure 25:
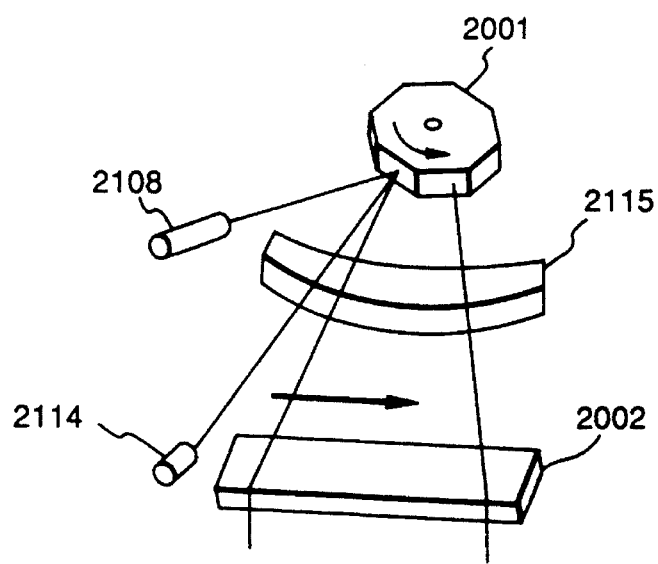
FIG. 25 is a diagram illustrating the arrangement of the BD detector 2114.

As shown in FIG. 25, the BD detector 2114 is placed in the vicinity of the mirror 2002 so that the laser beam radiated by the semiconductor laser 2108 and reflected by the polygon mirror 2001 is reflected into the BD detector 2114 before it scans the photosensitive drum 2004 via a f-θ lens 2115.

Figure 26:
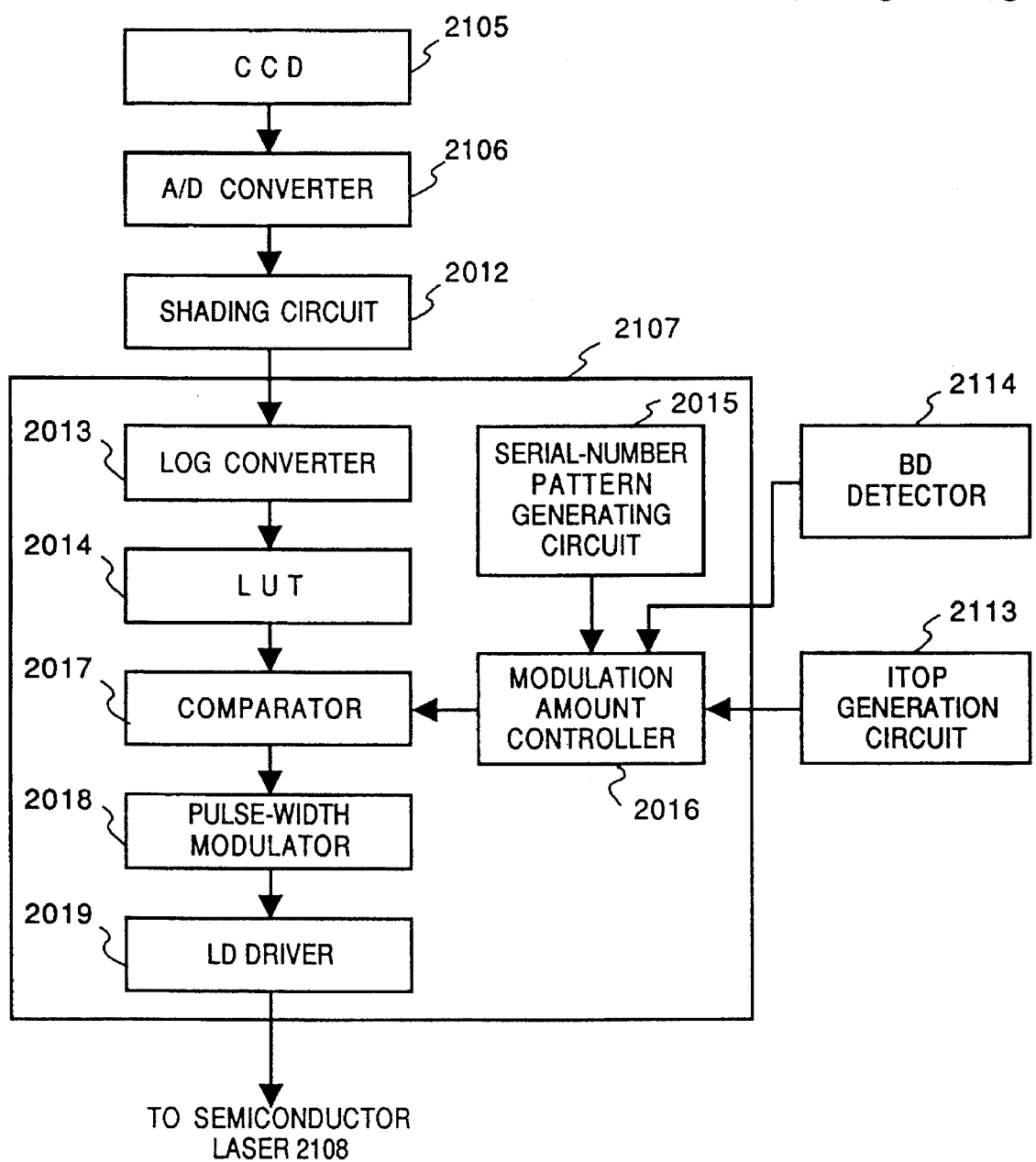
FIG. 26 is a block diagram illustrating the construction of the circuit which controls the modulation amount of the serial-number pattern added using the ITOP signal and BD signal as inputs.

Furthermore, the modulation amount of the add-on pattern can be controlled in the leading edge ($S_1$), ending edge ($S_2$), left edge ($S_3$), and right edge ($S_4$) in the image formation effective area of a recording paper by combining all of the controls described above. In this case, as shown in FIG. 26, the control circuit 2107 controls the modulation amount of the four edges by inputting the signals respectively supplied from the ITOP generation circuit 2113 and BD detector 2114. Accordingly, fog appeared by addition of the serial-number pattern can be made indistinctive in the four edges ($S_1$, $S_2$, $S_3$, $S_4$) of the image formation effective area.

In each of the foregoing embodiments, the electrophotographic process full-color copying machine is used as a typical image processing apparatus. However, this does not impose a limitation upon the invention, for the invention is applicable to an ink-jet printer, a thermal printer, or a bubble-jet printer employing a head of the type which jets droplets by utilizing film-boiling that relies upon thermal energy.

In each of the foregoing embodiments, the patterns are added in yellow. However, this does not impose a limitation upon the invention, as the color can be replaced by a neutral tint such as yellow green and gray or a brighter color such as light purple and light green.

Furthermore, in each of the foregoing embodiments, the image of an original is input by the scanning section. However, this does not impose a limitation upon the invention, for it is permissible to input an image entered by a still-video camera or an ordinary video camera, as well as an image produced by computer graphics.

<Third Embodiment>

In the first embodiment and second embodiment, the resolution of each color component is the same in the full-color image formation processing. However, in the third embodiment, the following case is described: The resolution of the color component of the serial-number pattern (which is yellow in the embodiment) is changed and the tone conversion characteristic of the color component of the serial-number pattern to be added is made different from those of the other color components.

Figure 27:
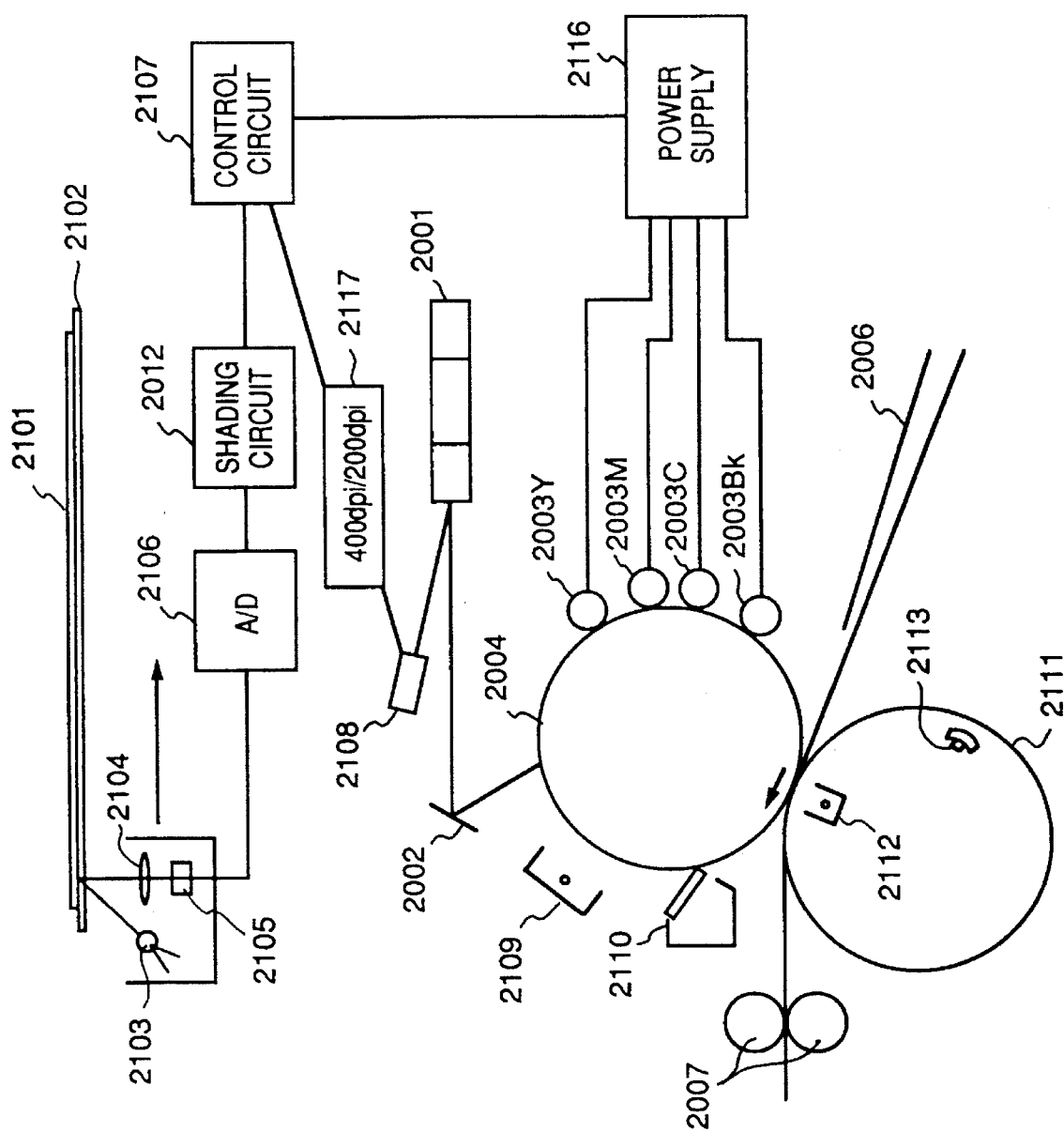
FIG. 27 is a sectional view illustrating the construction of main portions of the-full-color copying machine in accordance with a-third embodiment.

FIG. 27 is a general side view illustrating the internal construction of a full-color copying machine in accordance with the embodiment. The portions which are identical to those of FIG. 17 have the same reference numerals and a redescription is not needed. Here, the portions having unique characteristics of this embodiment are described. In the full-color copying machine of the embodiment, a copy mode of the operational panel (not shown) is switched between the character mode used when characters and line images are dominant in an image original and the photo mode used when a tone image such as a photograph is reproduced.

In FIG. 27, numeral 2117 is a resolution switcher which switches a recording density depending on a color component. In the embodiment, in the photo mode, it is set to 200 dpi of the recording density. In the character mode, it is set to 200 dpi on Y (yellow) and 400 dpi on M (magenta), C (cyan), and BK (black).

Figure 28:
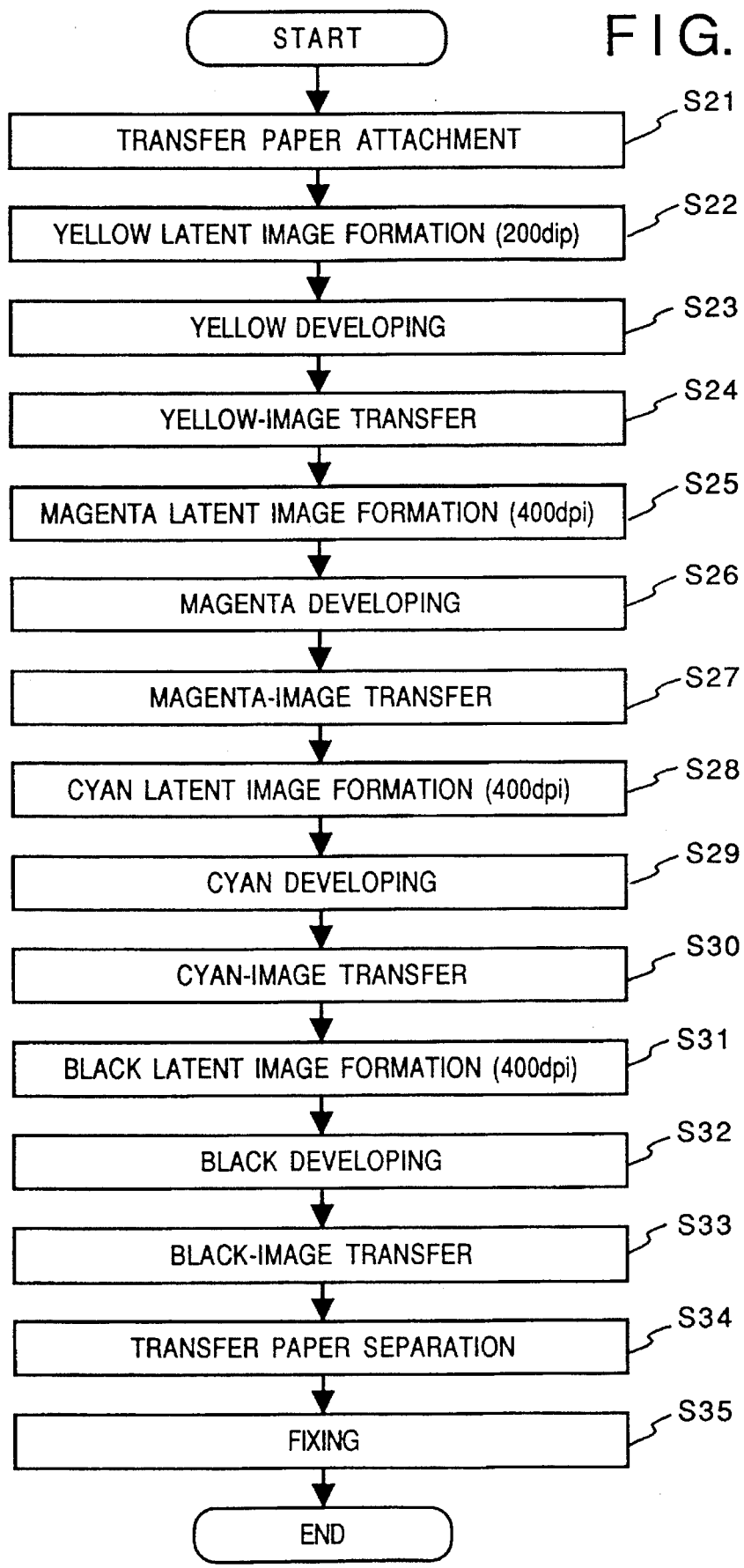
FIG. 28 is a flowchart for explaining the recording operation in accordance with the third embodiment.

The character mode where characters and line images are reproduced is described with reference to the flowchart of FIG. 28.

When the copy start button (not shown) on the operation panel (not shown) is pressed, a recording paper 2006 is fed from a cassette (not shown) and wound by the transfer drum 2111 (step S21).

In the image formation process in each color component, first, a latent image is formed on the Y component at the resolution of 200 dpi and the latent image is visualized by the yellow developing unit 2003Y (steps S22 and S23). Then, the formed yellow-toner image is transferred to the recording paper 2006 (step S24). Subsequently, an image formation is performed on the M component at the resolution of 400 dpi, and then, the magenta-toner image is multi-transferred to the recording paper 2006 where the yellow-toner image has been transferred in register (steps S25–S27).

Similarly, the image formation and multi-transfer is performed on the C component and BK component. Subsequently, the recording paper 2006 is removed from the transfer drum 2111 (step S34) and transferred to the fixing roller 2007 and the transfer image is fixed (step S35), thus a duplication of the full-color image is completed.

Figure 29:
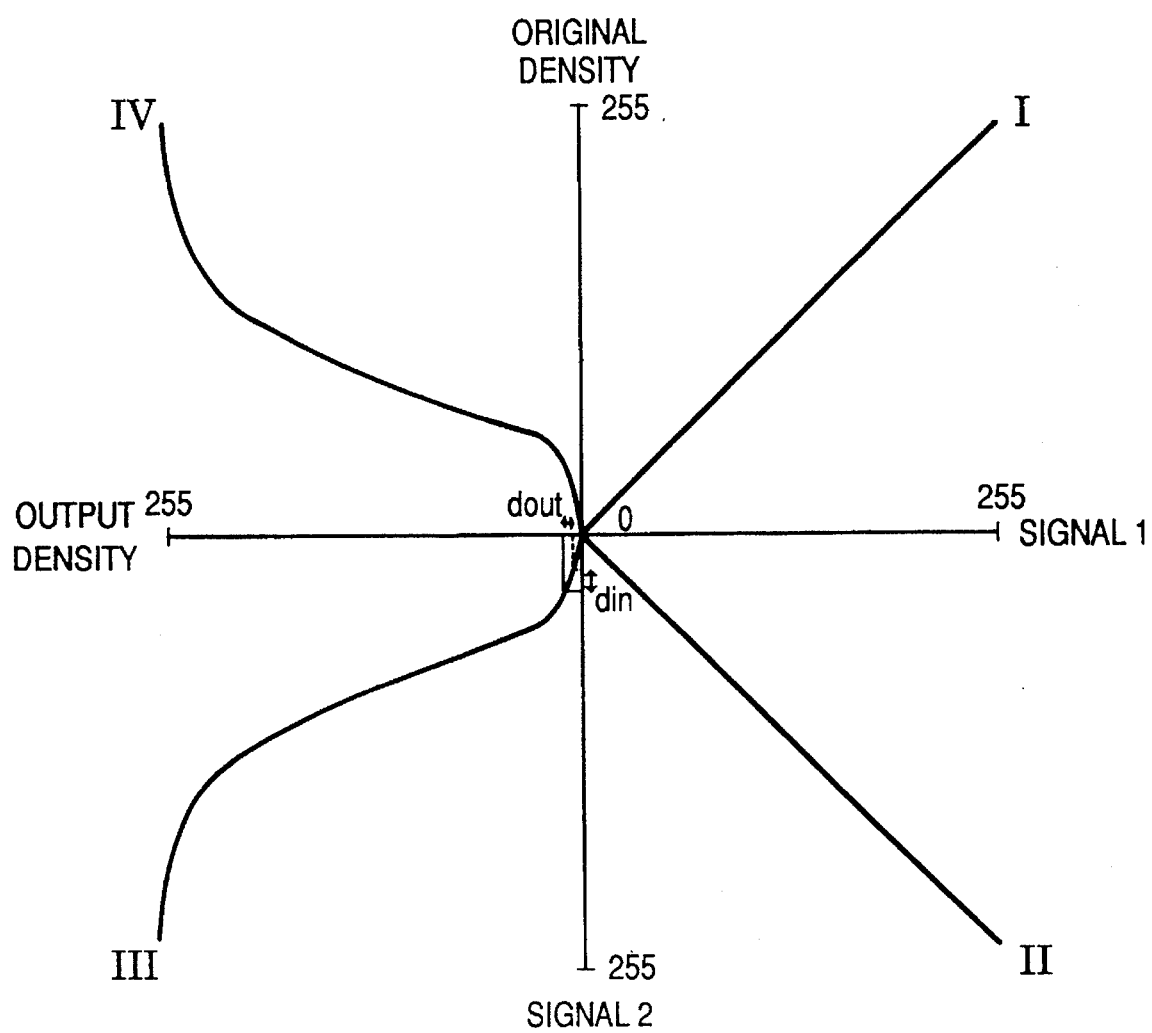
FIG. 29 is a four-quadrant chart illustrating the state where the tone in a character mode is reproduced.

FIG. 29 is a four-quadrant chart showing how the density of an image input at the character mode is reproduced. Note that the tone is expressed by an 8-bit digital signal, and therefore, there are 256 (0–255) tones.

In FIG. 29, the quadrant I shows the characteristic of the image scanner for converting an original density to a density signal (Signal 1) and the quadrant II shows a LUT for converting the density signal (Signal 1) to a laser output signal (Signal 2). The quadrant III represents a conversion table from the laser output signal (Signal 2) to an output density. It is set so that the output density ($d_{out}$) will not change much in an area where the signal value of the laser output signal is small with respect to the change ($d_{in}$) of the laser output signal, while the output density is greatly changed in an area where the signal value of the laser output signal is large and the change of the laser output signal is small. This is set, considering the characteristics of the printer in the image output at the resolution of 400 dpi where the character reproducibility is high. Accordingly, it is controlled so that toner will not be discharged in the highlight portion of the output image, while the toner will be sufficiently discharged in the intermediate to the high density portion.

Furthermore, in the LUT of quadrant II, the input/output relationship is set to be linear so that the characteristic of tone conversion of the density of an input image and the density of output image shown in the quadrant IV becomes S-shaped. Thus, a sharp and clear image in which characters and line images are emphasized can be output.

The full-color image is formed via the above process. However, when a tone image such as a photograph is duplicated, the copy mode is switched to the photo mode.

Figure 30:
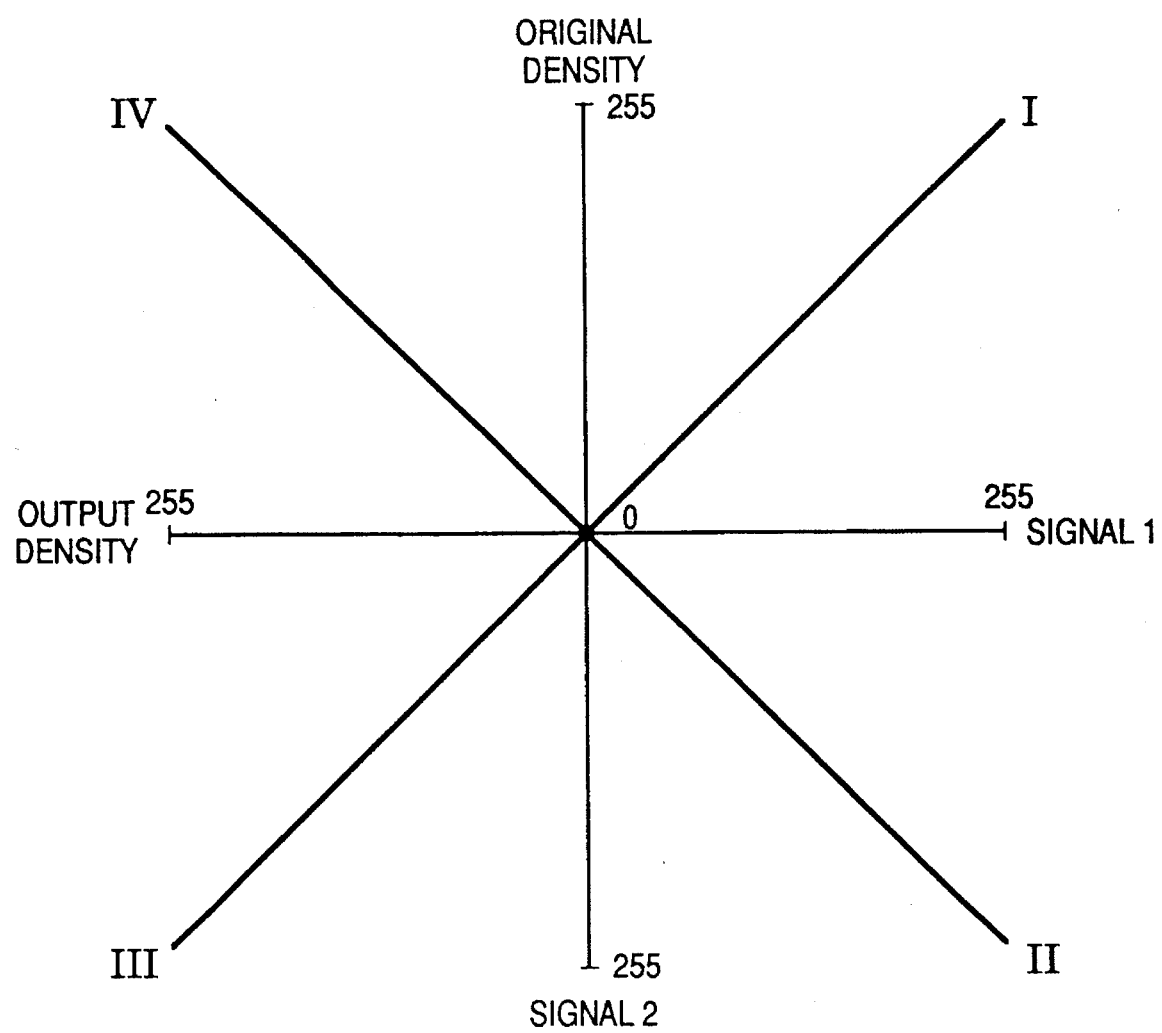
FIG. 30 is a four-quadrant chart illustrating the state where the tone in a photo mode is reproduced.

FIG. 30 is a four-quadrant chart indicating the tone reproduction of the input image in the photo mode. The number of the tones to be expressed is 256 (0–255).

In FIG. 30, the conversion relationship in each of the quadrants I–IV is similar to that of FIG. 29. However, the conversion relationship from the laser output signal (Signal 2) to the output density in the quadrant III is almost linear, and thus, the tone image is accurately reproduced. Furthermore, in the photo mode, the resolution of the full-color copying machine is 200 dpi.

In this embodiment, the serial-number pattern (See FIG. 20) which is the same as that used in the second embodiment is also added on the duplication image. However, it goes without saying that, in addition to the serial-number pattern of FIG. 20, the add-on image pattern can be a pattern obtained by encoding dots which, at a glance, appears to be meaningless.

In the embodiment, when a yellow image is formed, a small density value ($d_{in}$) representing a serial-number pattern is added to the density signal. This serial-number pattern can be read by observation via a blue filter after the full-color image has been formed.

Figure 31:
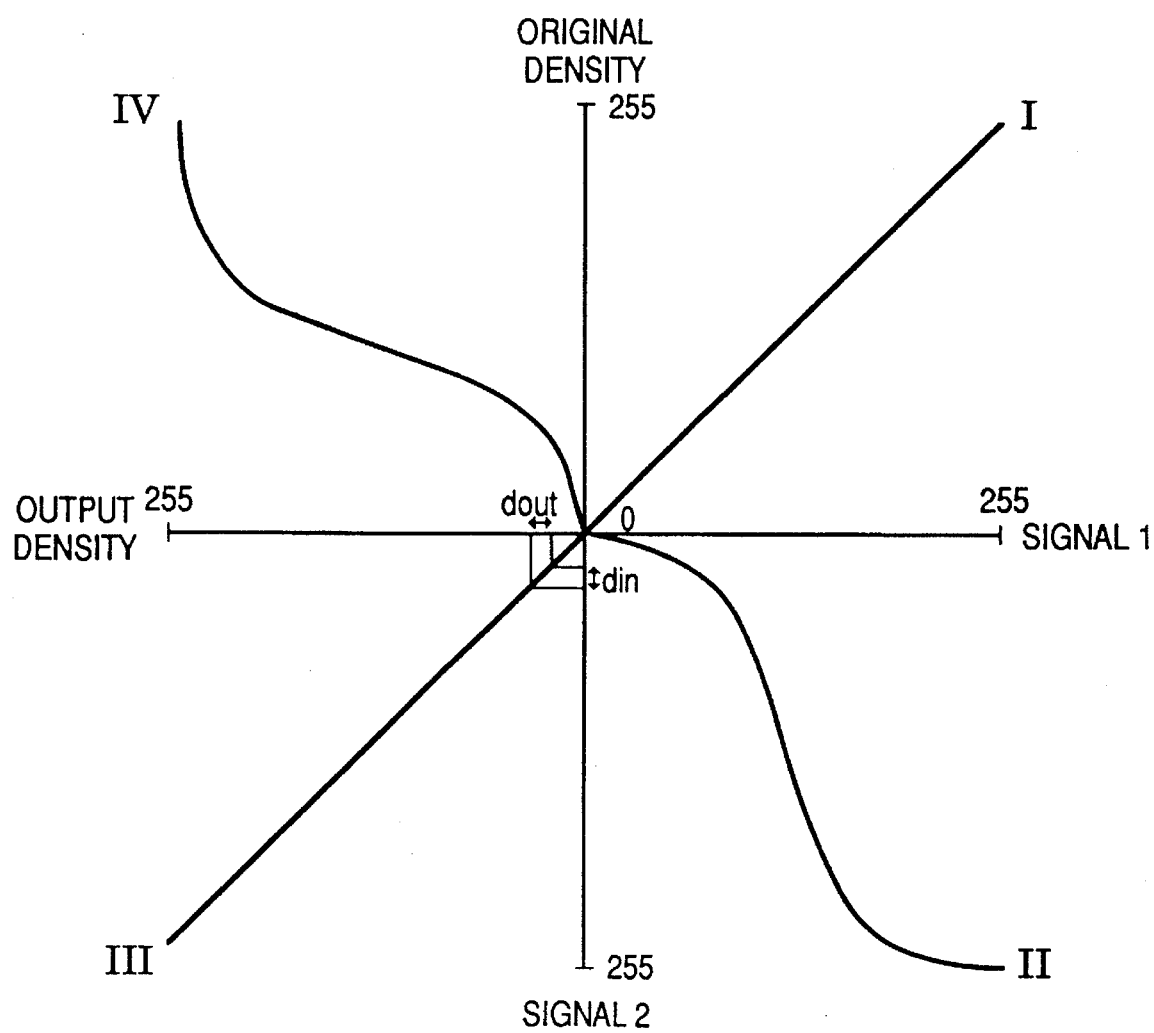
FIG. 31 is a four-quadrant chart illustrating the tone reproduction characteristic of yellow in the character mode.

FIG. 31 is a four-quadrant chart showing the tone reproduction of yellow which is a color of the serial-number pattern added at the resolution of 200 dpi. Since the serial-number pattern is added at the resolution of 200 dpi, the image density change is small with respect to the environmental change and toner density change in comparison with the resolution of 400 dpi, thus, resulting in a stable output.

When a small density value ($d_{in}$) is added to the laser output signal (Signal 2) based on the density of an input image, in a case with the tone conversion characteristic shown in FIG. 29, the density value ($d_{in}$) is not significantly reflected to the output image. Accordingly, an image having a yellow dominant background is output in a manner such that the density value ($d_{in}$) of an output image is maintained in the output of the Y component, even if the value is small, and the conversion characteristic from a density signal (Signal 1) to a laser output signal (Signal 2) in the quadrant II is set to be non-linear shown in FIG. 31. Thus, the conversion result in the quadrant IV becomes the same as the output characteristic of the other color components when the small density value is added to the laser output signal (Signal 2). Accordingly, the density representing a serial-number pattern can be fully expressed an output image by modifying the LUT representing the conversion characteristic from the density signal (Signal 1) to the laser output signal (Signal 2).

Furthermore, a desirable conversion characteristic from the laser output signal to the density of an output image can be obtained by changing the developing bias by using a generally well-known cause and effect relationship between the developing bias applied to the developing unit and the conversion relationship between the laser output signal (Signal 2) and the density of an output image.

Figure 32:
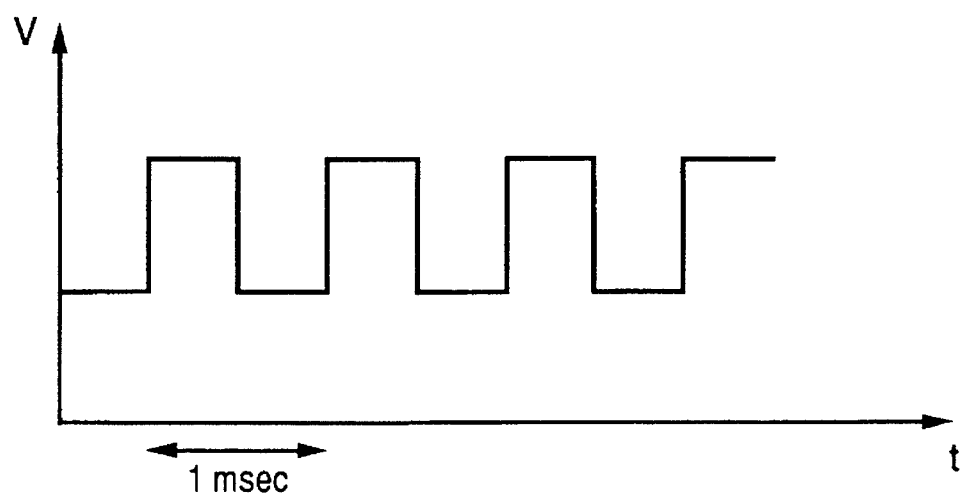
FIG. 32 is a diagram illustrating an example of developing a bias waveform.
Figure 33:
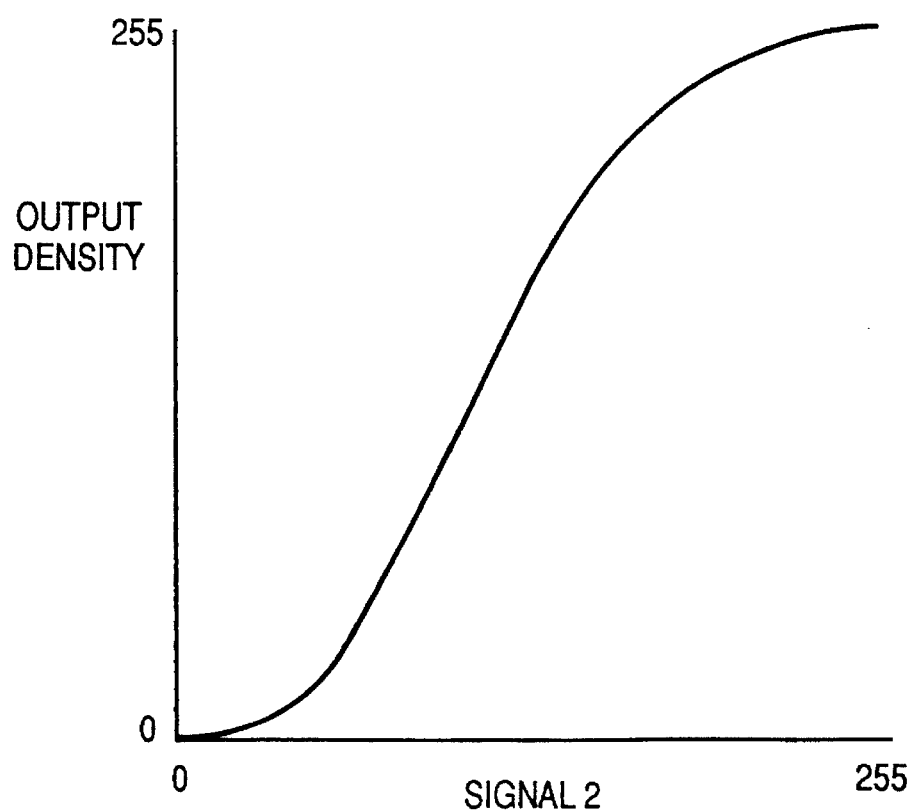
FIG. 33 is a diagram illustrating the tone characteristics of the output image when the developing bias shown in FIG. 32 is applied.

FIG. 32 is a diagram illustrating an example of a developing bias of a regular rectangular wave. FIG. 33 is a diagram illustrating the conversion characteristic of the laser output signal (Signal 2) corresponding to the developing bias shown in FIG. 32 and the density of the output image. However, in the conversion characteristic shown in FIG. 33, in the highlight portion (where the intensity of the laser output signal is small) and the high density portion (where the intensity of the laser output signal is large), even if the small density value ($d_{in}$) representing the serial-number pattern is added, the serial-number pattern will not be outstanding on the output image and will not be read by the image reader. On the other hand, in the intermediate density portion (where the intensity of the laser output signal is intermediate), if the small density value ($d_{in}$) representing the serial-number pattern is added, the serial-number pattern will be outstanding on the output image because it appears as a large density change in the output image.

Figure 34:
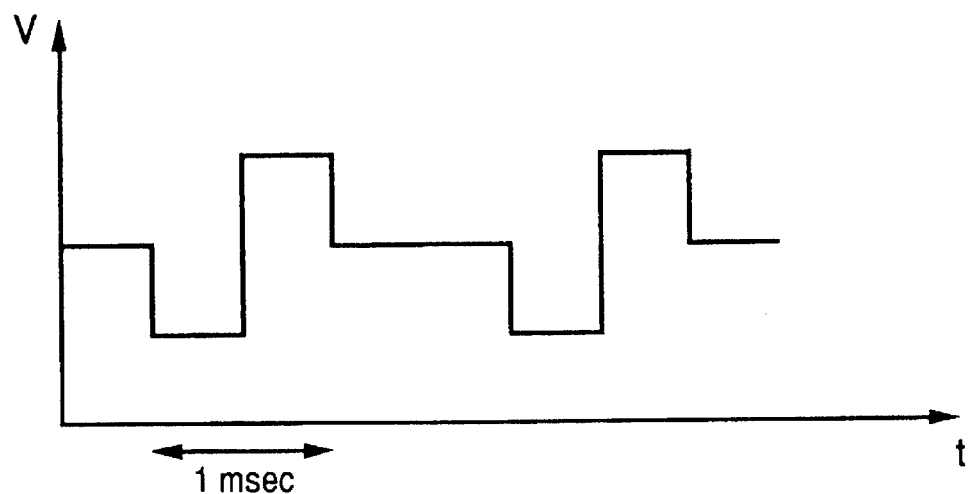
FIG. 34 is a diagram illustrating another example of the developing bias waveform.

Accordingly, the developing bias waveform is changed as shown in FIG. 34 and the conversion characteristic between the laser output signal (Signal 2) and the density of the output image becomes substantially linear so that the addition of the small density value ($d_{in}$) representing the serial-number pattern appears equally in all density values of the output image and the pattern is made indistinctive.

Figure 35:
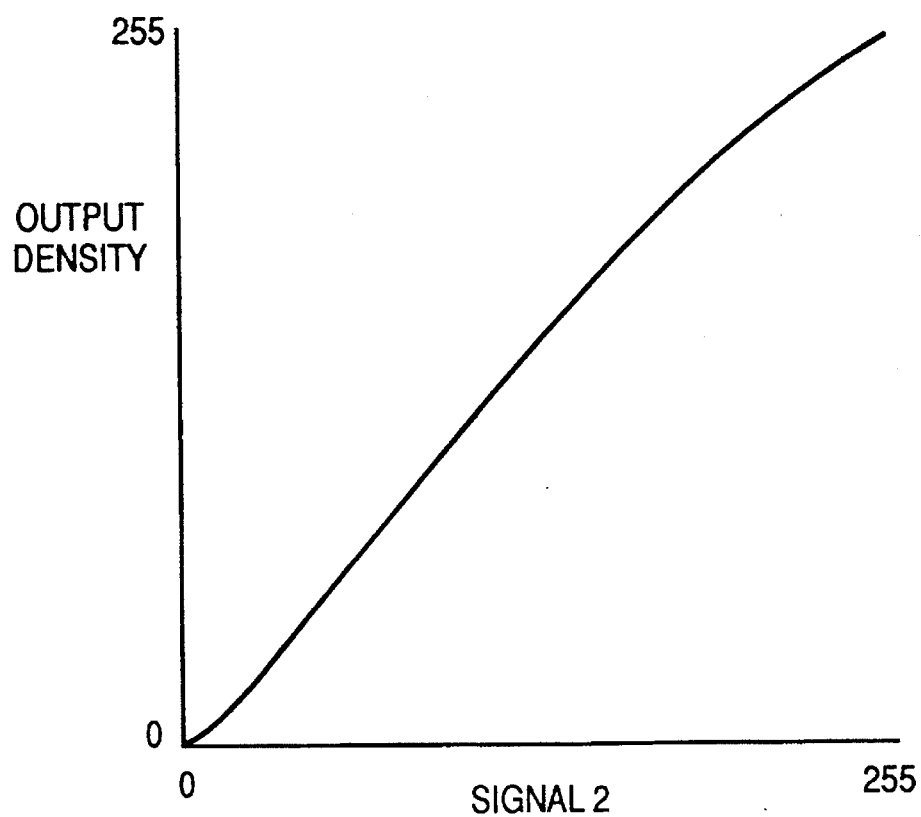
FIG. 35 is a diagram illustrating the tone characteristics of the output image when the developing bias shown in FIG. 34 is applied.

In the character mode, on the M, C, BK components, an image formation using the conversion characteristic shown in FIG. 33 is performed. On the Y component, an image formation using the conversion characteristic shown in FIG. 35 is performed.

Alternatively, the conversion characteristic of the laser output signal (Signal 2) and the density of an output image is controlled so as to be substantially linear by not changing the developing bias applied to the developing unit, but by adjusting the surface electric-potential of the photosensitive drum 2004.

Figure 36:
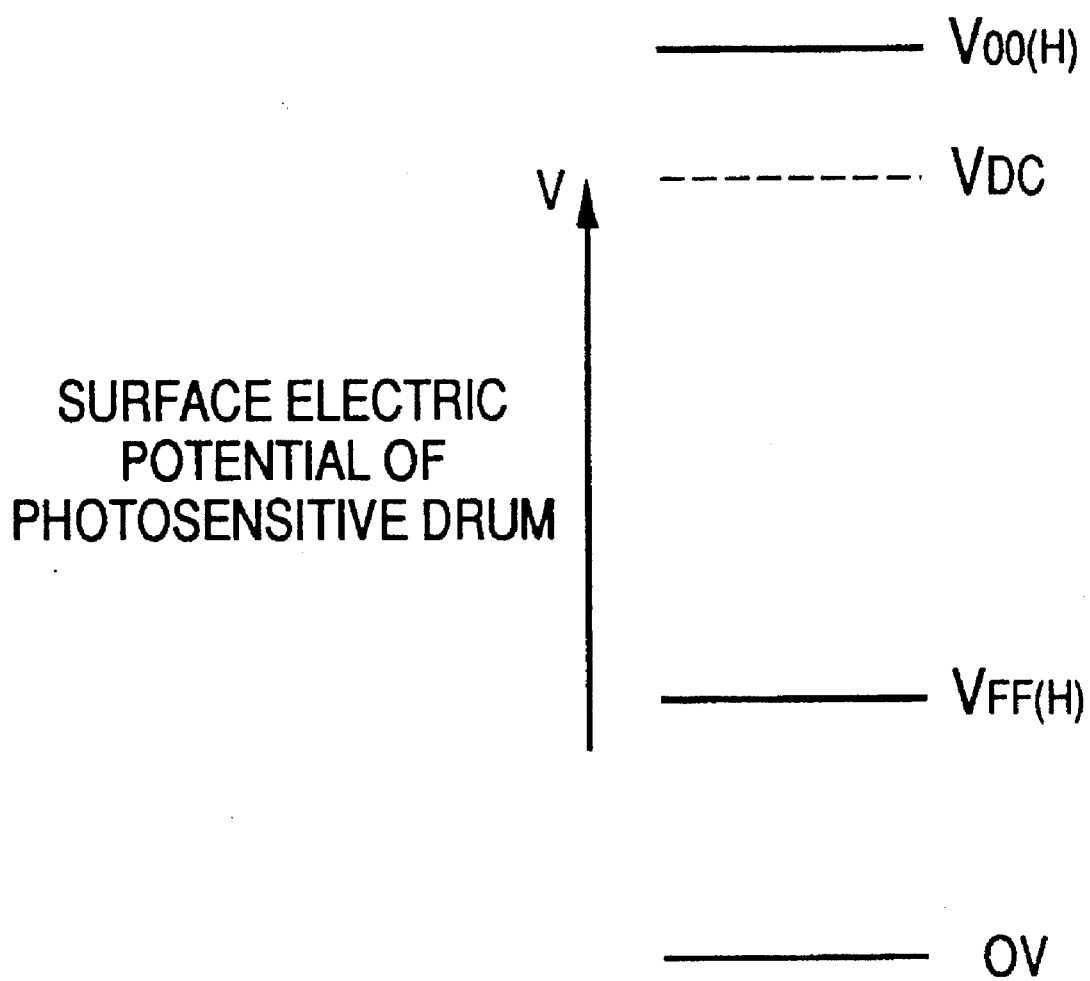
FIG. 36 is a diagram illustrating a surface electric potential of a photosensitive drum 2004.

FIG. 36 is a diagram illustrating the surface electric-potential of the photosensitive drum 2004 in accordance with the intensity of the laser beam depending on the laser output signal (Signal 2). In FIG. 36, $V_{FF}$ refers to a surface electric-potential when the density value is "255", $V_{00}$ refers to a surface electric-potential when the density value is "0", and $V_{DC}$ refers to a developing electric-potential.

Figure 37:
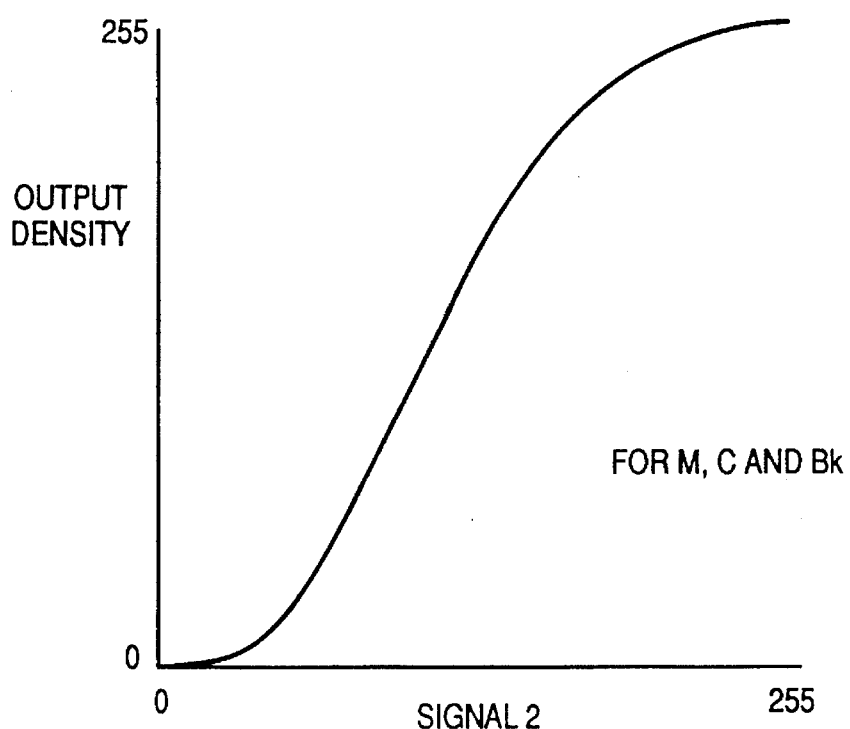
FIG. 37 is a diagram illustrating the tone characteristics of the output image of M, C, BK components.
Figure 38:
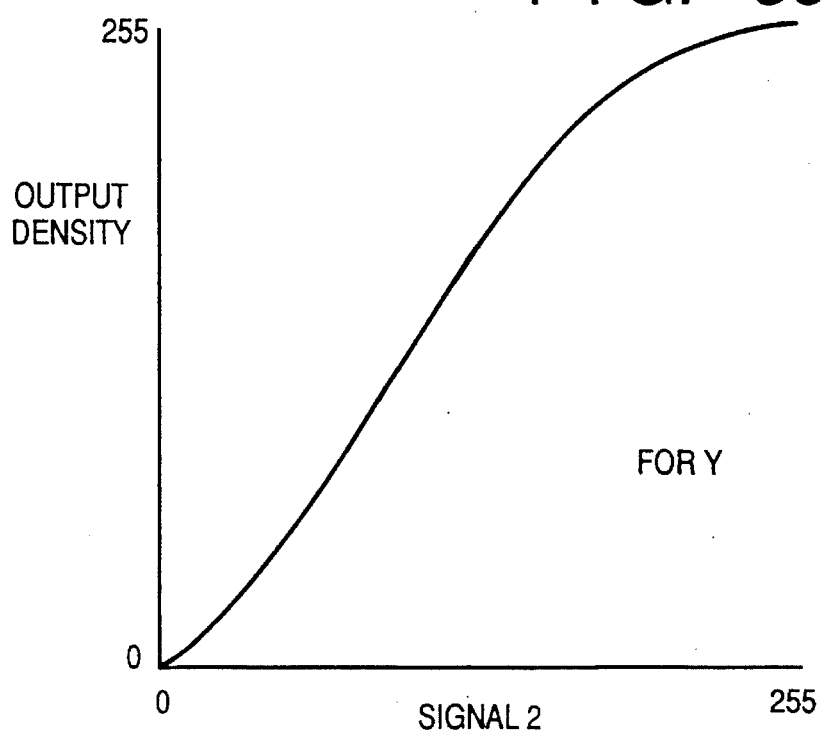
FIG. 38 is a diagram illustrating the tone characteristics of the output image of Y component.

In general, as the value of $|V_{00}-V_{DC}|$ gets larger, the toners have difficulty staying in contact with the photosensitive drum. The conversion characteristic of the laser output signal (Signal 2) to the density of the output image is a characteristic shown in FIG. 37. In addition to the characteristic such that the toner is difficult to contact in the area where the density value is small (at a highlight portion), the density value of an output image is not changed significantly with respect to the laser output signal (Signal 2). Accordingly, when the density value representing the serial-number pattern is added, the pattern will not be distinctive on the output image and cannot be read by the image reader. On the other hand, there is a tendency such that toners readily adhere to the photosensitive drum as the value of $|V_{00}-V_{DC}|$ becomes small. The conversion characteristic of the laser output signal (Signal 2) to the density of the output image is substantially linear as shown in FIG. 38. Accordingly, the change of the laser output signal (Signal 2) accurately reflects on the density value of the output image over all the density values. Therefore, if the small density ($d_{in}$) representing the serial-number pattern is added, it can be expressed on the output image over all the density values.

According to the embodiment, the Y component of the serial-number pattern to be added is set so as to be $|V_{00}-V_{DC}|=80$ V, and the conversion characteristic of the laser output signal (signal 2) and the density of the output image shown in FIG. 38 is provided. On the other hand, on the M, C, BK components, it is set so as to be $|V_{00}-V_{DC}|+150$ V and the conversion characteristic shown in FIG. 37 is provided. Accordingly, a serial-number pattern can be properly added in the highlight portion.

According to the embodiment, information which is unique to each apparatus, that is, a serial-number pattern, is stably formed on a duplicated copy in a manner such that the tone characteristic of the particular color (Y) which is used to form the serial-number pattern is made different from those of the other colors and the density value representing the serial-number pattern is constantly preserved regardless of the density value of the output image.

In the foregoing embodiment, in the character mode in particular, the image output of Y is performed at the resolution of 200 dpi, however, this does not impose a limitation upon the invention. For example, the image output resolution of Y can be set to the same resolution of the other color components in order to improve the character reproduction.

<Fourth Embodiment>

In this embodiment, the following case is described: Particular information is expressed by combining a plurality of predetermined patterns which are added to the Y component by using the full-color copying machine with the arrangement indicated by FIG. 1 and the plurality of patterns in the main scanning direction and sub-scanning direction of the output image are output periodically.

[Image Scanner (FIG. 39)]

Figure 39:
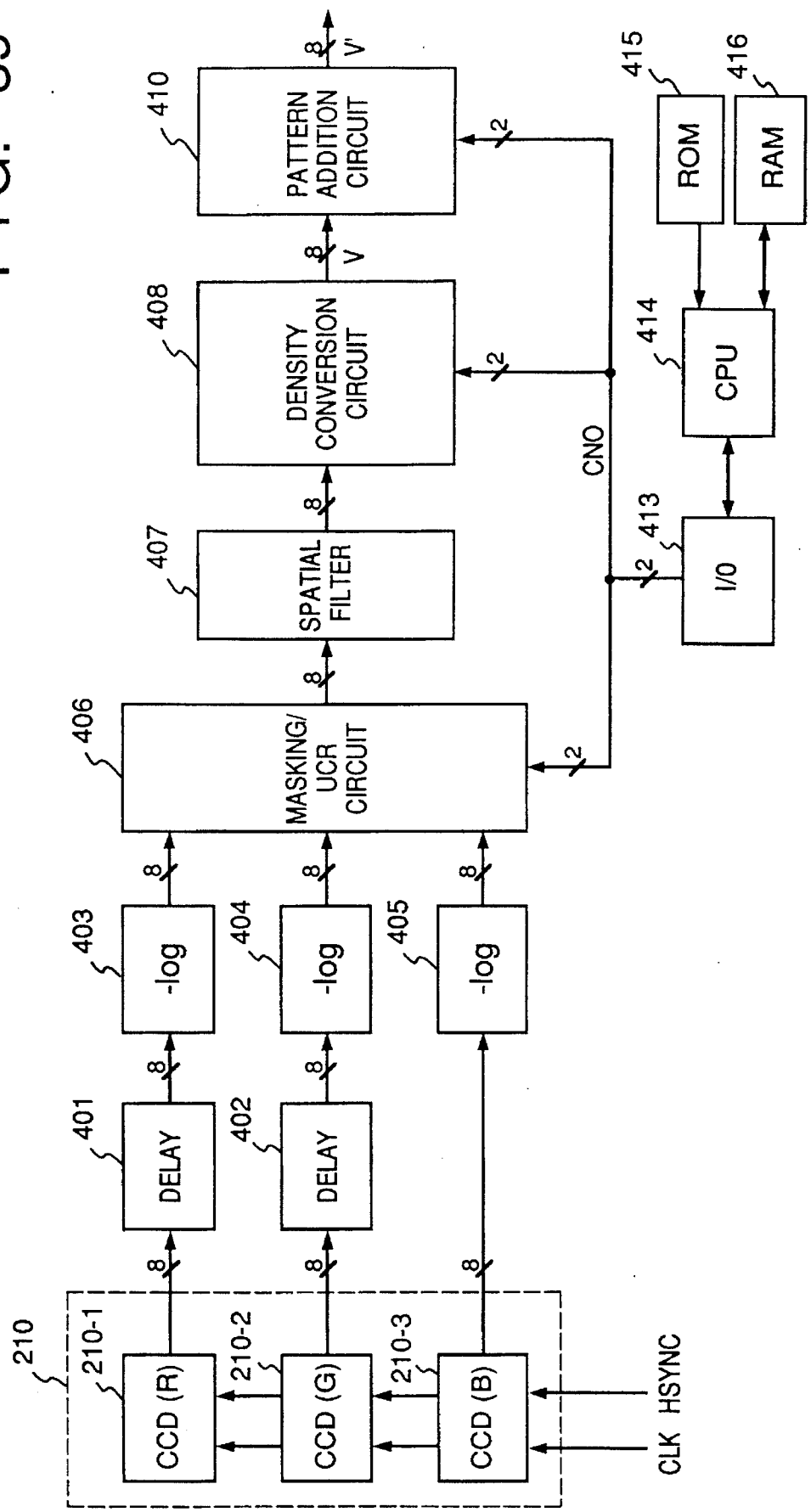
FIG. 39 iS a block diagram illustrating the construction of the image scanner 201 in accordance with a fourth embodiment.

FIG. 39 is a block diagram illustrating the construction of the image scanner 201. In FIG. 39, the portions which are identical to those in FIG. 2 have the same reference numerals and a redescription is not needed.

In the embodiment, the density conversion circuit 408 may be controlled so as to select one of the ROMs storing a plurality of tone characteristics in accordance with the frame-sequential signal, the signal CNO (refer to FIG. 16) which is described in the first embodiment. Furthermore, it can be controlled so that the tone characteristic of density conversion data which is stored into the RAM is modified by the CPU 414.

The signal CNO which is respectively input to the masking/UCR circuit 406 and pattern addition circuit 410 is generated via the CPU 414 and I/O port 413, and the operational condition of the masking/UCR circuit 406 and pattern addition circuit 410 is switched in accordance with the value of the signal CNO.

[Pattern Addition Method]

Figure 40:
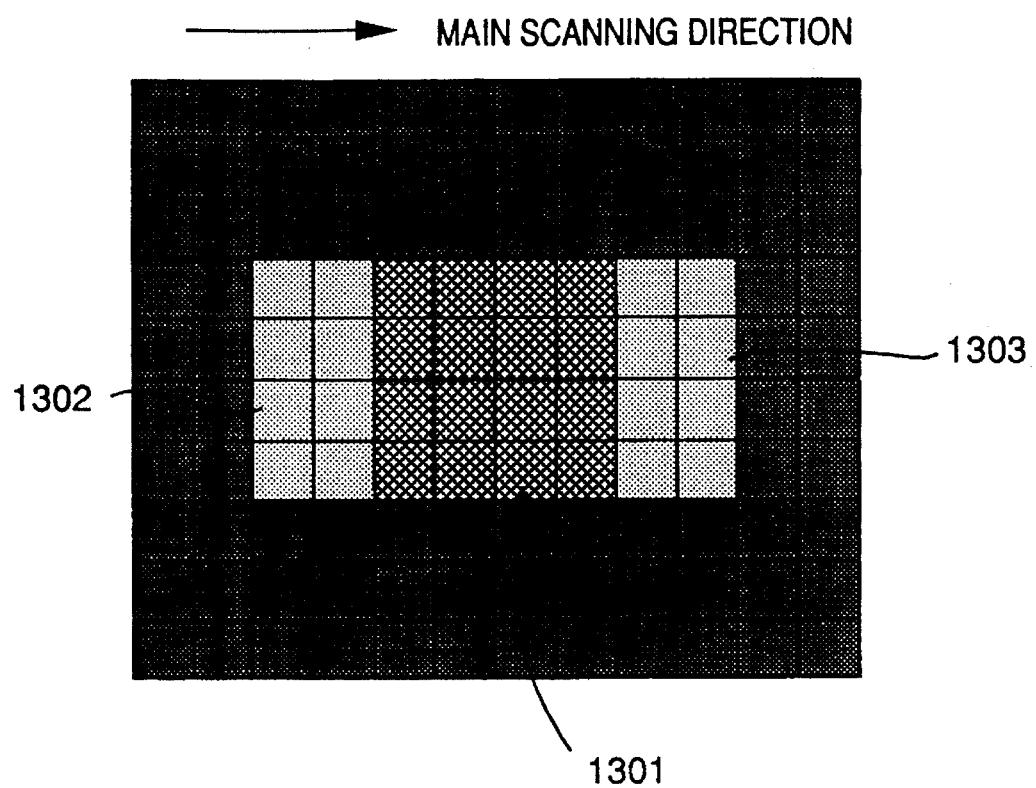
FIG. 40 is a diagram for describing an adding pattern.

FIG. 40 is a diagram for describing an example of the add-on pattern in accordance with the embodiment.

In FIG. 40, 4×4 pixels included in the area 1301 is modulated so that the tone of the image signal is to be +α and the 2×4 pixels included in the areas 1302 and 1303, respectively, are modulated so that the tone of each image signal is to be −α. The pixels outside of the areas 1301–1303 are not modulated. The 8×4 pixels included in the areas 1301–1303 are referred to as a "unit dot of an add-on pattern" (hereinafter, referred to as a "unit dot"). The reason why 8×4 pixels are used for a unit of the add-on pattern is because there may a case where the add-on pattern is difficult to be read, if a unit of the adding pattern is set to one pixel.

Figure 41:
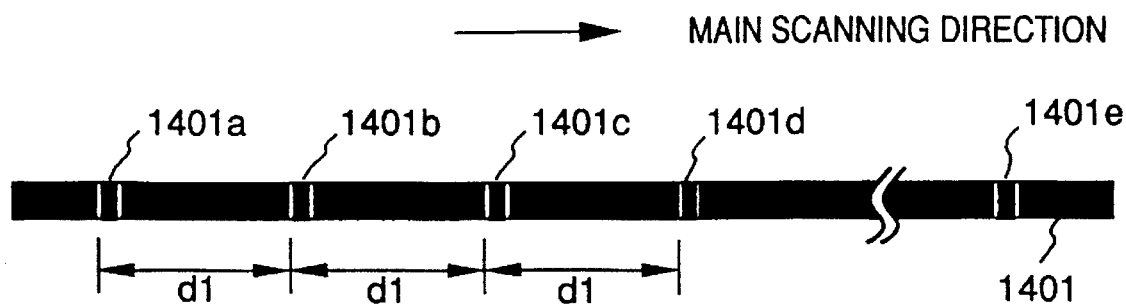
FIG. 41 is a diagram illustrating the construction relating to the main scanning direction of an add-on line.
Figure 42:
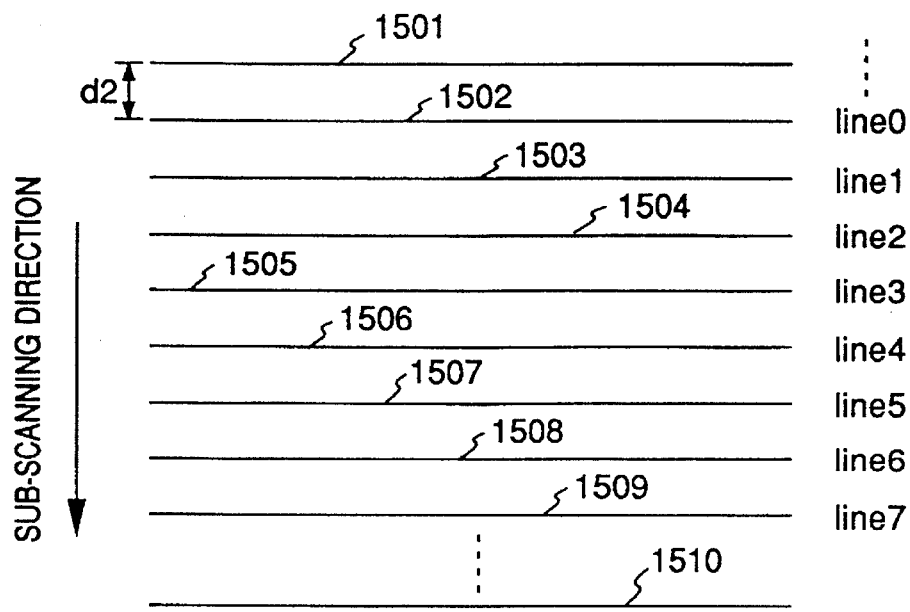
FIG. 42 is a diagram illustrating the construction relating to the sub-scanning direction of an add-on line.

FIGS. 41 and 42 are diagrams illustrating the construction of a line where the pattern is added (hereinafter, referred to as an "add-on line").

In FIG. 41, numeral 1401 is an add-on line having a width of 4 pixels, numerals 1401a–1401e are unit dots, each of which consists of 8×4 pixels. These unit dots are arranged in a predetermined interval (i.e. 128 pixels) in the main scanning direction.

In FIG. 42, numerals 1501–1510 are add-on lines having a width of 4 pixels and arranged in a predetermined cycle d2 (i.e. 16 lines) in the sub-scanning direction. For example, a single add-on line represents 4-bit information and eight add-on lines 1502–1509 can represent 32-bit additional information. The add-on lines are repeatedly formed in the sub-scanning direction, for example, the information of the add-on line 1501 is identical to that of the add-on line 1509. The details will be described later.

Figure 43:
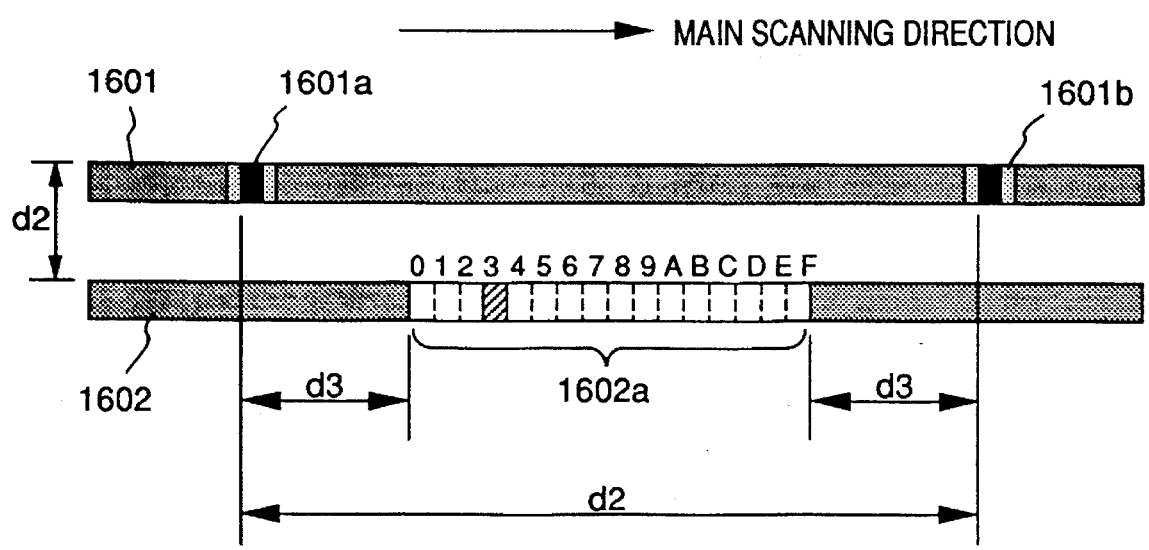
FIGS. 43, 44A, and 44B are diagrams illustrating the information representation by the add-on line.
Figure 44A:
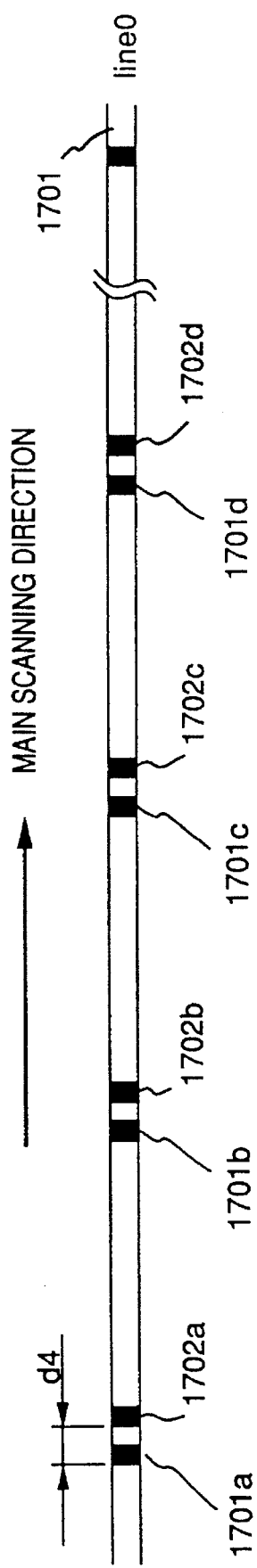
Figure 44B:
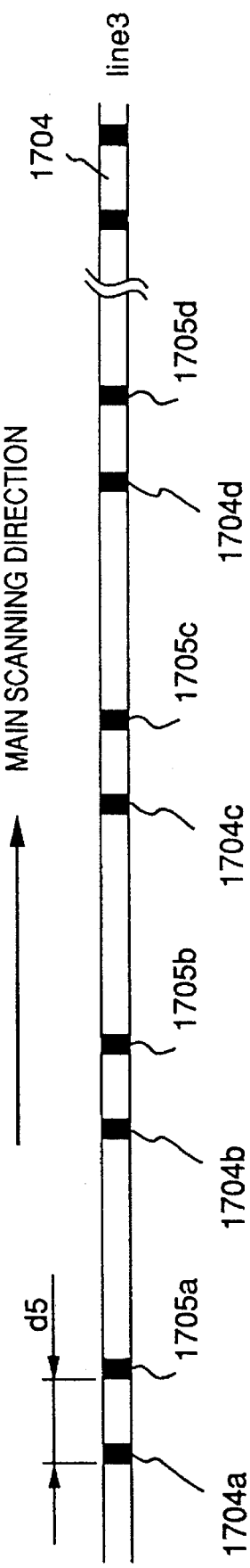

FIGS. 43, 44A, and 44B are diagrams illustrating the information representation method by the add-on lines.

FIG. 43, numerals 1601 and 1602 are add-on lines which are next to each other in the sub-scanning direction in the interval of d2. Numerals 1601a, 1601b, and 1602a are unit dots. In order to prevent the unit dots which are next to each other from being outstanding, each of these unit dots is located in an interval d3 (i.e. 32 pixels) in the main scanning direction.

The data represented by the unit dot is determined by the phase difference between the unit dot 1602a and unit dot 1601a. FIG. 43 shows an example representing 4-bit information (information in which the data value is one of 0–F (in terms of hexadecimal representation)). In FIG. 43, the unit dot 1602a represents data value "2". For example, if the unit dot 1602a is located at the left end, the data value is "0", while it is at the right end, the data value is "F".

FIGS. 44A and 44B illustrate a set of add-on lines representing all additional information (32 bits). FIG. 44A shows a first add-on line "line 0" and FIG. 44B shows a fourth add-on line "line 3".

As shown in FIGS. 44A and 44B, in Line 0, the dots 1702a–1702d are respectively added to the right side of the unit dots 1701a–1701d with an interval d4 (e.g. 16 pixels) In "line 3" the dots 1705a–1705d are respectively added to the right side of the unit dots 1704a–1704d with an interval d5 (e.g. 32 pixels). These additional dots 1702a–1702d and 1705a–1705d are markers for clarifying each add-on line's location. Hereinafter, this additional dot marker is referred to as a "marker". The reason why the marker is added to two add-on lines is to define the top and bottom in the sub-scanning direction from the output image.

Furthermore, the add-on pattern is added only in yellow toner by utilizing the fact that the human eye is visually insensitive to a pattern printed in yellow.

Still further, a dot interval in the main scanning direction of the add-on pattern in an objective specific original and a repeating interval of all additional information in the sub-scanning direction needs to be determined so that the dots comprising the add-on pattern can be identified and all the information can accurately be added. As a standard, the information can be added at a pitch equal to/less than half the width or the height of the objective specific original.

[Pattern addition Circuit]

Figure 46:
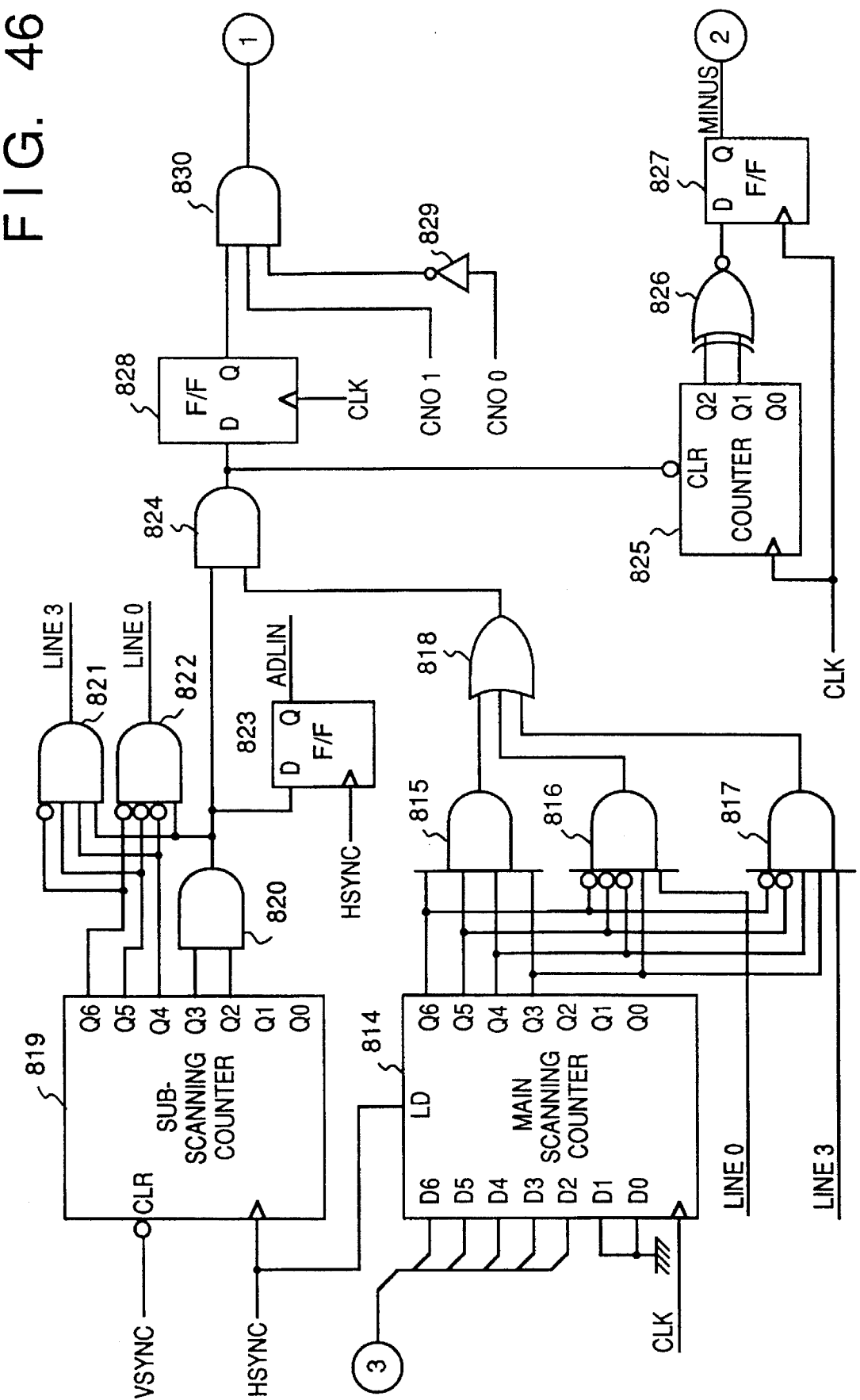
Figure 47:
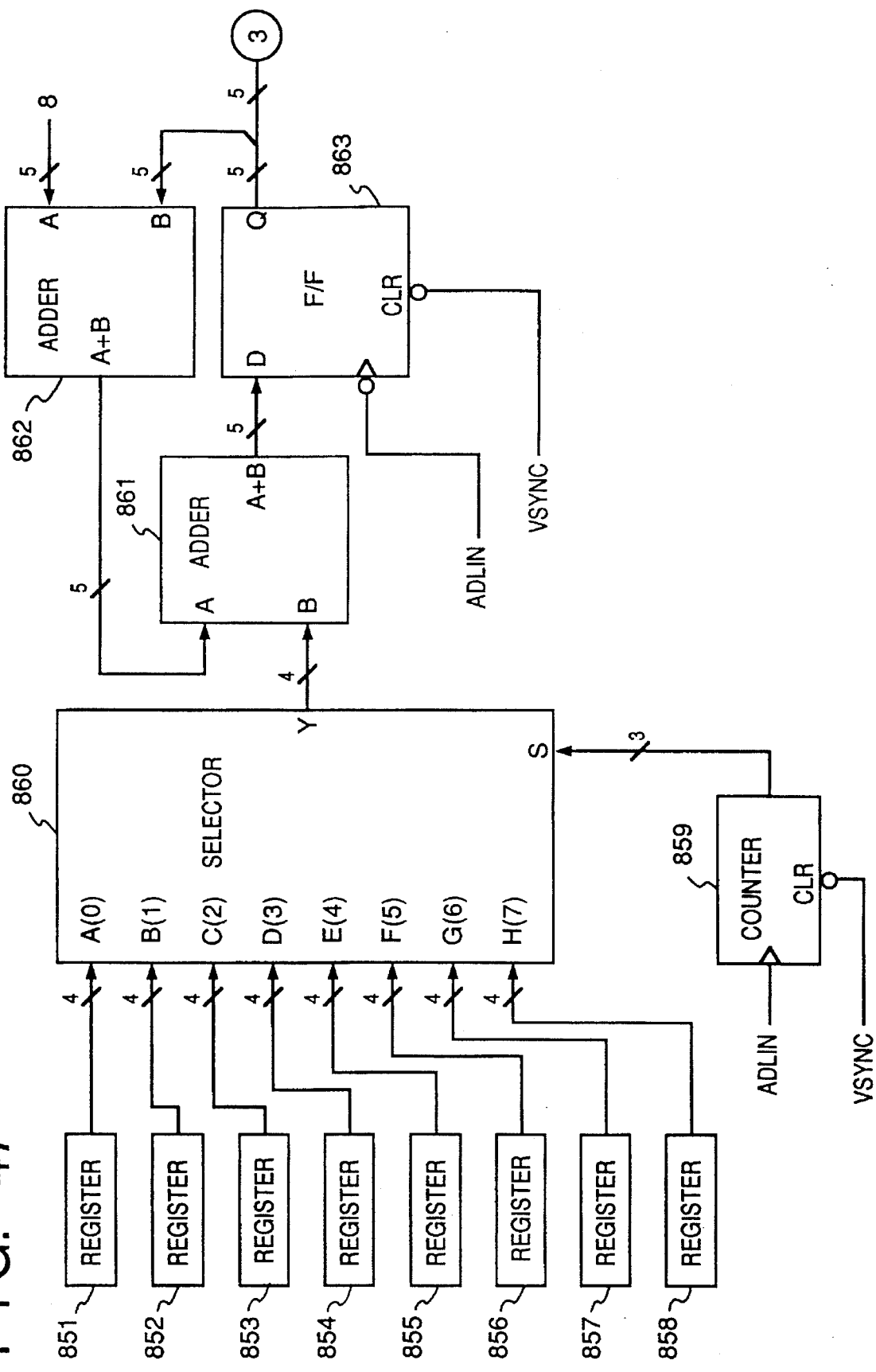

FIGS. 45–47 are block diagrams illustrating the construction of the pattern addition circuit 410. In FIGS. 45–47, a sub-scanning counter 819 and main scanning counter 814 respectively count main scanning synchronizing signal HSYNC and the signal CLK repeatedly in 7-bit width (each of the bits is referred to as Q6, Q5, . . . , Q0), that is, in a cycle of 128 signal pulses. An AND gate 820 connected to bit Q2 and bit Q3 of the sub-scanning counter 819 outputs "H" when each of the bit Q2 and bit Q3 is "H". That is, the output of the AND gate 820 is "H" for four lines in every 16 lines in the sub-scanning direction and this is used as an enable signal of the add-on line.

A gate 822 generates an enable signal "line 0" of the add-on line "line 0" with the inputs of the three higher order address bits (Q4–Q6) of the output of the AND gate 820 and that of the sub-scanning counter 819. Similarly, a gate 821 generates an enable signal LINE 3 of the add-on "line 3".

On the other hand, an initial value is loaded to the main scanning counter 814 by the HSYNC and the gates 815–817 input four higher order address bits (Q3–Q6) of the main scanning counter 814. The output of the AND gate 815 becomes an 8-bit interval "H" in every 128 pixels in the main scanning direction, and this is used as an enable signal of a unit dot. Furthermore, the gates 816 and 817 respectively input the line signals "line 0" and "line 3" in addition to the four higher address bits of the main scanning counter 814, and generate enable signals as markers of Line 0 and Line 3. The unit dots and enable signals of the markers are integrated into one in an OR gate 818. An AND gate 824 carries out a logical AND between the output of the OR gate 818 and the output of the OR gate 820. It is an enable signal of the unit dot and marker, each of which is "H" on the add-on line.

The output of the AND gate 824 is synchronized with the signal CLK in a flip flop F/F 828 and an AND gate 830 carries out a logical AND between the output of the AND gate 824 and a 2-bit output color selection signal (frame-sequential signal) CNO. The bit 0 of the output color selection signal CNO is inverted by the inverter 829 and the inverted value is input to an AND gate 830. Since the bit 1 of the output color selection signal CNO (CNO 1) is input to the AND gate 830 as is, the enable signal becomes effective when the output color selection signal CNO is "2" that is when the image of the-Y component is formed.

The output of the AND gate 824 is also supplied to a clear terminal CLR of a counter 825. The counter 825 counts the signal CLK only when the output of the AND gate 824 is "H", that is, the output of the unit dot of the add-on line is enabled. The bit 1 (Q1) and bit 2 (Q2) of the output of the counter 825 are input to an EXNOR gate 826 and the output of the EXNOR gate 826 becomes "L" for four pulses of the signal CLK which corresponds to a half of the dots of the add-on line (for 8 pulses of the signal CLK). The output of the EXNOR gate 826 is synchronized with the signal CLK by the flip flop F/F 827 and output as a signal MINUS. When the MINUS signal is "L", the unit dot of the add-on line is modulated to $+\alpha$. The flip flop F/F serves as a phase adjuster so that the phase of the signal MINUS coincides with that of the output of the enable signal of the unit dot. The signal MINUS is input to a selection terminal S of a selector 838.

The AND circuit 832 is supplied with an 8-bit modulation amount $\alpha$ from the resister 831 and the output of the AND gate 830. When the timing when a unit dot of the add-on line is output, the output of the AND gate 830 is "H". Thus, the modulation amount $\alpha$ is output from the AND circuit 832 at the timing when the unit dot of the add-on line is output. Accordingly, in a pixel other than the unit dots of the add-on line, the output of the AND circuit 832 is "0", therefore, the modulation will not work.

In FIG. 45, numeral 833 is an adder, numeral 835 is a subtracter. The terminal A in each of the adder 833 and subtracter 835 is supplied with an 8-bit image signal V from the density conversion circuit 408. The terminal B in each of the adder 833 and subtractor 835 is supplied with a modulation amount $\alpha$ which is output from the AND circuit 832. The addition result (V+$\alpha$) output from the output terminal (A+B) of the adder 833 is input to an OR circuit 834, while the subtraction result (V−$\alpha$) output from the output terminal (A−B) of the subtractor 835 is input to the AND circuit 837.

In the OR circuit 834, when the addition result (V+$\alpha$) has an overflow and a carry signal CY is output, the value of the operational result is automatically set to "255". On the other hand, in the AND circuit 837, when the subtraction result (V−$\alpha$) has an underflow and a carry signal CY is output, the value of the operational result is automatically set to "0" by the inverted carry signal CY by the inverter 836. Both operational results (V+$\alpha$) and (V−$\alpha$) are input into the selector 838 and a signal V' is output from the selector 838 in accordance with the signal MINUS.

Accordingly, the dot modulation is performed on the 8-bit image signal V which is input from the density conversion circuit 408.

The value which is loaded to the main scanning counter 814 is generated as described below.

Since the flip flop F/F 863 and main scanning counter 809 are reset by the sub-scanning synchronizing signal VSYNC, the initial value of the main scanning counter 814 is set to "0" in a first add-on line.

The selector 860 selects one of registers 851–858 where a 4-bit value of the 8 add-on lines is set in accordance with a 3-bit signal (select signal) input to the select terminal S and the value corresponding to the selected register is output.

The select signal of the selector 860 is generated by the counter 859 which counts signal ADLIN. Since the counter 859 is cleared by the sub-scanning synchronizing signal VSYNC at the first add-on line timing, the selection signal is "0". Accordingly, the selector 860 selects the register 851. When the signal ADLIN is provided, the count value of the counter 859 is increased by one and the selector 860 selects the register 852. Subsequently, the selector 860 is synchronized with the signal ADLIN and selection of the registers 853–858 is sequentially repeated.

The output of the selector 860 is input to the adder 861 and added to the output of the adder 862. The addition result is input to a flip flop F/F 863 and latched at the fall of the signal ADLIN (the timing when the signal value is changed from "H" to "L"). The result is input to the main scanning counter 814.

The output of the flip flop F/F 863 is also supplied to the input terminal B of the adder 862 and is added to a predetermined value, e.g. 8, which is input to the input terminal A of the adder 862. This predetermined value is an off-set value to have an interval between the unit dot position of the add-on line and the dot position of the add-on line of the preceding line in the sub-scanning direction.

[The Result of Duplication]

Figure 48:
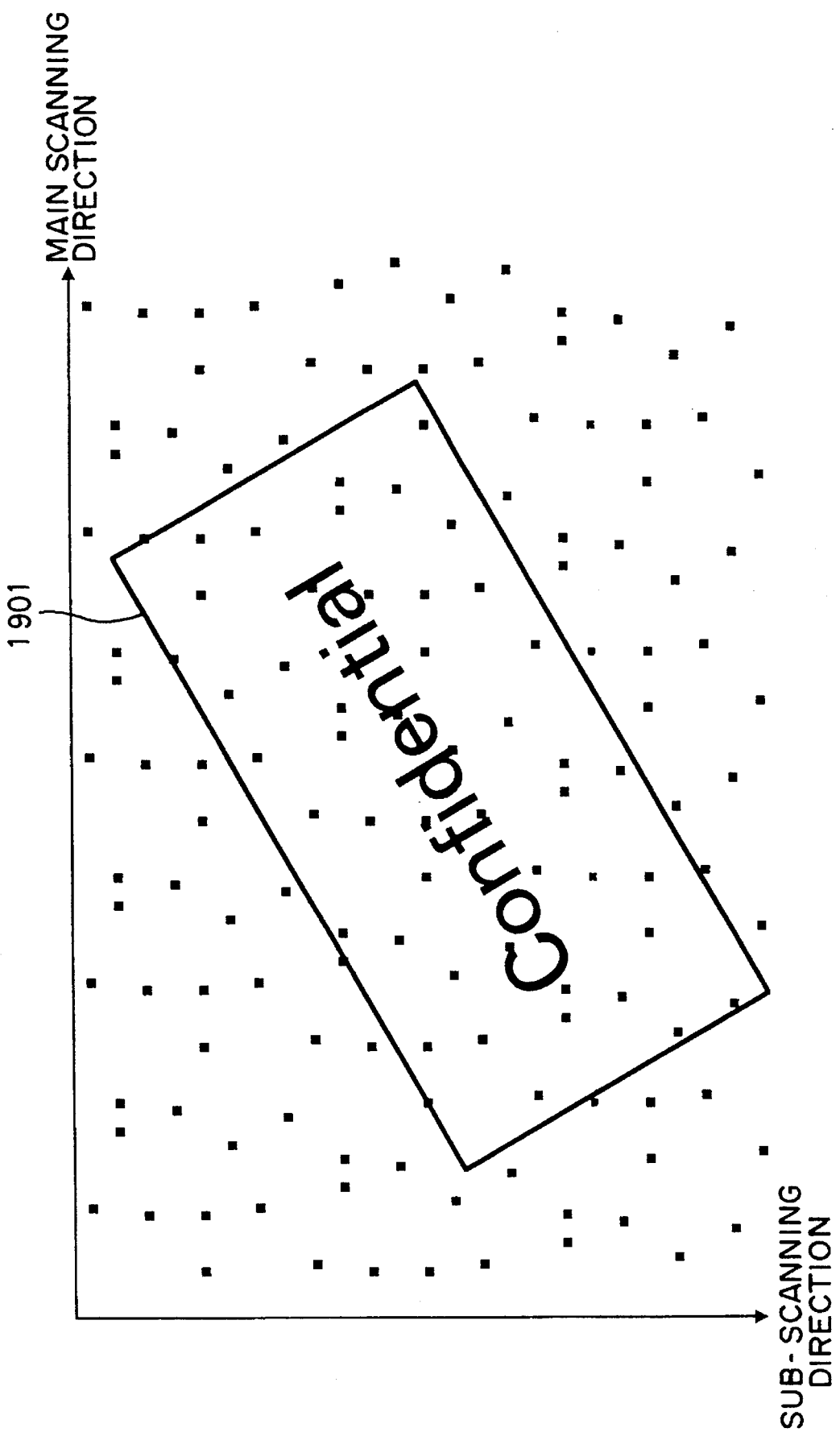
FIG. 48 is a diagram illustrating an example of the result of duplication.

The result of duplication where the pattern is added on the image is shown in FIG. 48. In FIG. 48, numeral 1901 is a specific original image. The unit dot of the add-on line is denoted by a black square. FIG. 48 shows the arrangement of the unit dots of the add-on line in particular.

According to the embodiment, since the serial number which is unique to the full-color copying machine or the encoded pattern of the serial number is expressed by a plurality of add-on patterns and the pattern is added on a duplication image periodically, when the full-color copying machine of the embodiment is used for forgery of bank notes or securities, the machine used for the forgery can be identified from the investigation of the duplication.

Figure 49:
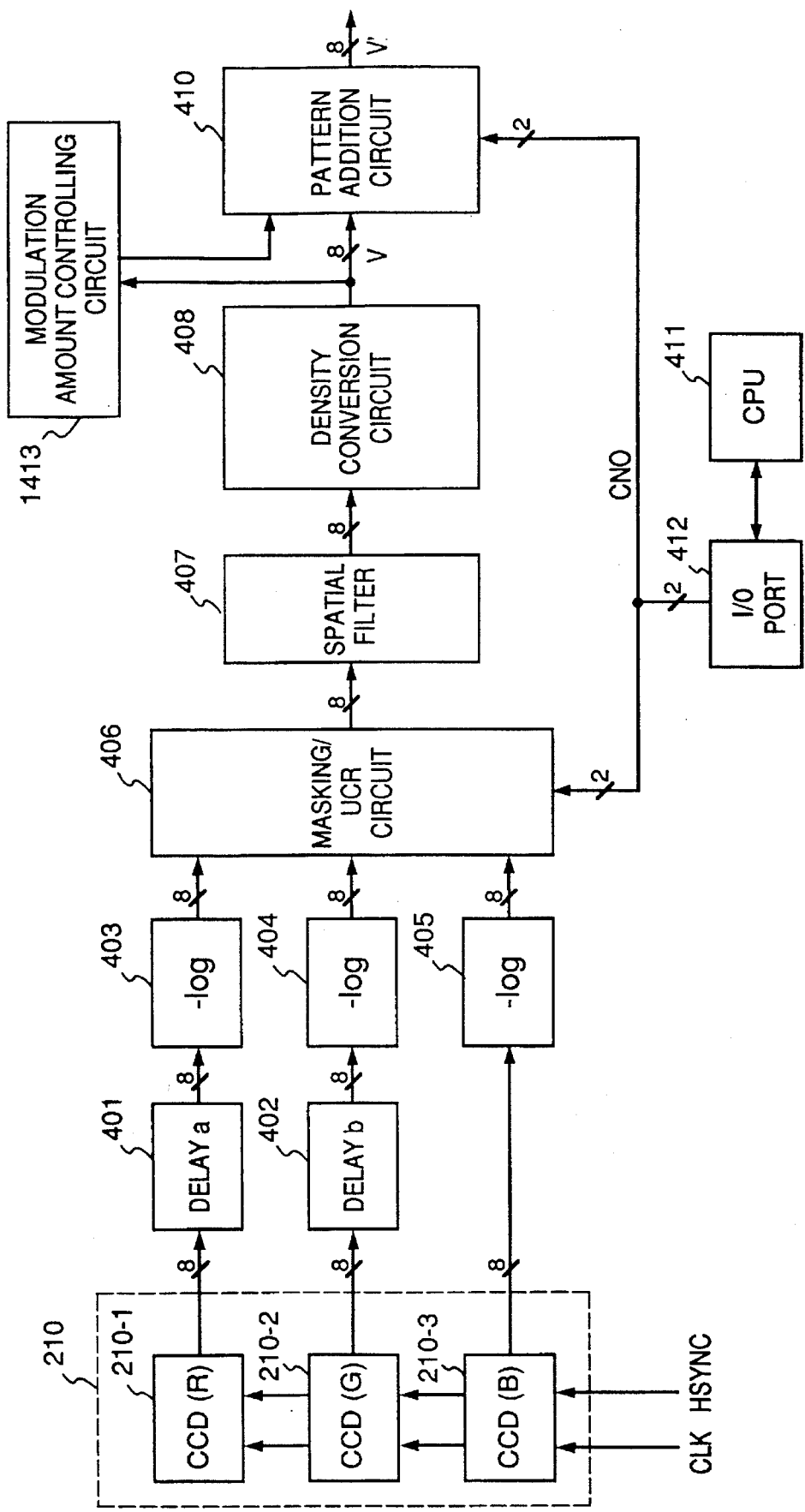
FIG. 49 is a block diagram illustrating the construction of a modified example of the image scanner 201 in accordance with the fourth embodiment.
Figure 50:
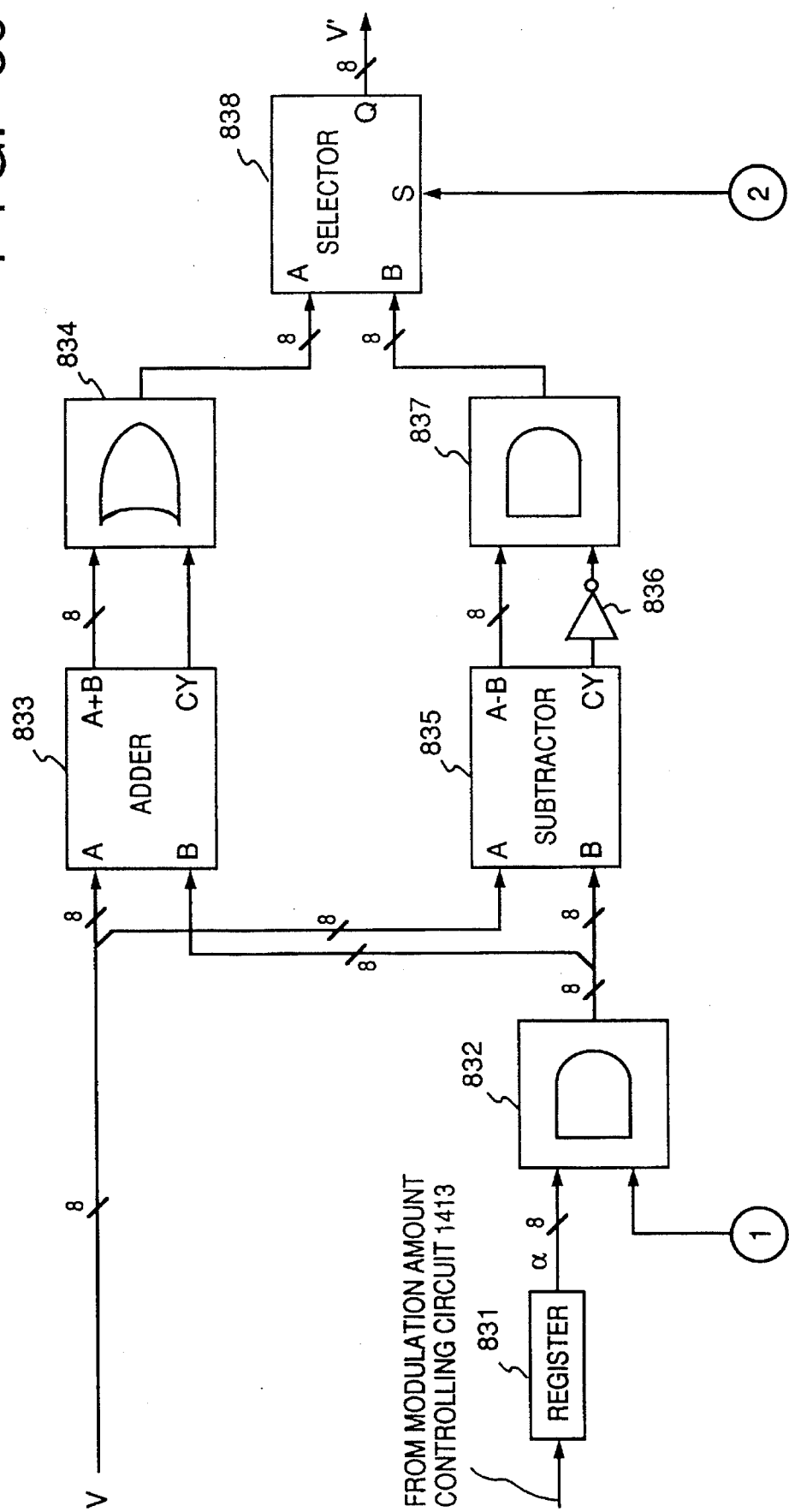
FIG. 50 is a block diagram illustrating another construction of the pattern addition circuit 410.

In the embodiment, when the pattern is added on an input image, the modulation amount of the add-on pattern is input from the register provided in the pattern addition circuit 410, however, this does not impose a limitation upon the invention. For example, as shown in FIG. 49, it can be arranged such that the modulation value controlling circuit 1413 detects a density value of the 8-bit image signal V input from the density conversion circuit 408, controls a modulation amount $\alpha$ of the add-on pattern in accordance with the detected density value, and sets the modulation amount in the register of the pattern addition circuit 410. In this case, the construction of the pattern addition circuit 410 is as shown in FIG. 50. In FIG. 50, the modulation amount $\alpha$ output from the modulation controlling circuit 1413 is set in the register 831.

According to the above-described arrangement, the pattern can be added in a manner such that the modulation amount α is increased for the image having a low density in accordance with the density value of the 8-bit image signal V input from the density conversion circuit 408.

When the pattern is added to an output image, deterioration of the image quality relative to the addition of the pattern can be suppressed in a manner such that complementary image signal modulations are combined in a small area in the vicinity of the position where the pattern is added and the overall density is preserved, thus eliminating the change of tones. Furthermore, the complementary image signal modulation is advantageous since when the output image is microscopically seen, the add-on pattern can be easily read and the additional information can be read accurately.

<Fifth Embodiment>

In this embodiment, the case where the serial-number pattern shown in FIG. 20 is added while changing the density of a duplication image by using the control circuit 2107 having the same construction as the full-color copying machine described in the second embodiment. The addition is performed only on the image signal of yellow, the color to which the human eye is least sensitive.

Figure 51:
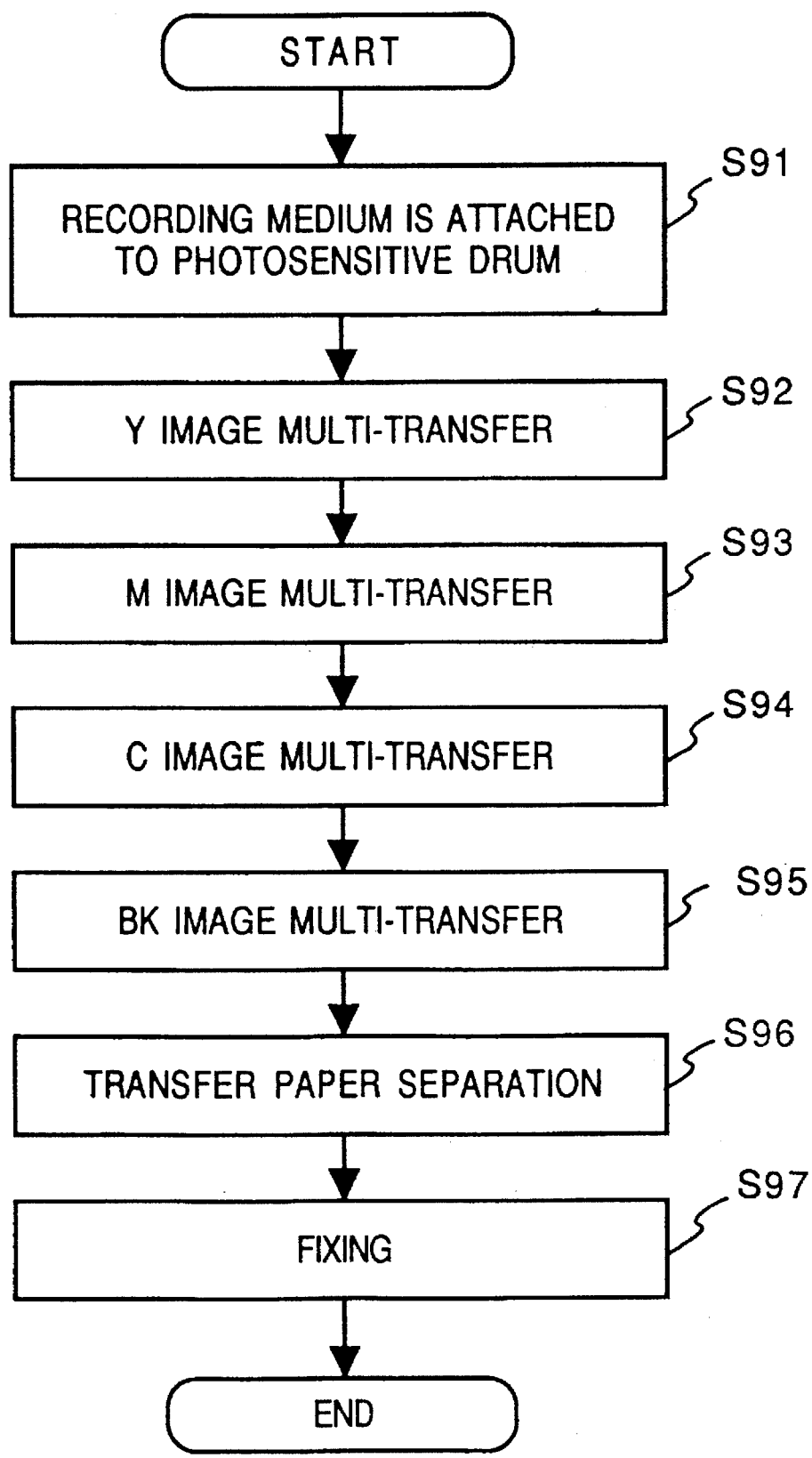
FIG. 51 is a flowchart illustrating the procedure for forming a color image in accordance with a fifth embodiment.

The color image formation procedure according to the embodiment is described with reference to the flowchart shown in FIG. 51.

The photosensitive drum 2004 where a latent image is formed by scanning of the laser beam radiated based on the image signal of the Y component is rotated to the arrow's direction of FIG. 17, and the yellow developing unit 2003Y performs a developing operation on the Y component. The photosensitive drum 2004 is further rotated and a recording paper 2006 is sucked and attached by the transfer drum 2111 (step S91), and then, a yellow toner image formed on the photosensitive drum 2004 by the transfer electrostatic charger 2112 is transferred (step S92).

Subsequently, a latent image formation and development are performed based on the image signal of the M component, an M toner image is multi-transferred on the Y toner image on the recording paper 2006 in register (step S93). Similarly, the image formation and multi-transfer are performed based on the image signals of C and BK components (steps S94 and S95).

Then, the recording paper 2006 on which the image transfer has been completed is separated from the transfer drum 2111 (step S96), and the recording paper 2006 is transferred to the fixing roller 2007 and the transferred image is fixed (step S97). Accordingly, the color image duplication is completed.

The adding processing of the output image and serial-number pattern in accordance with the embodiment is described with reference to FIGS. 52–54.

Figure 52A:
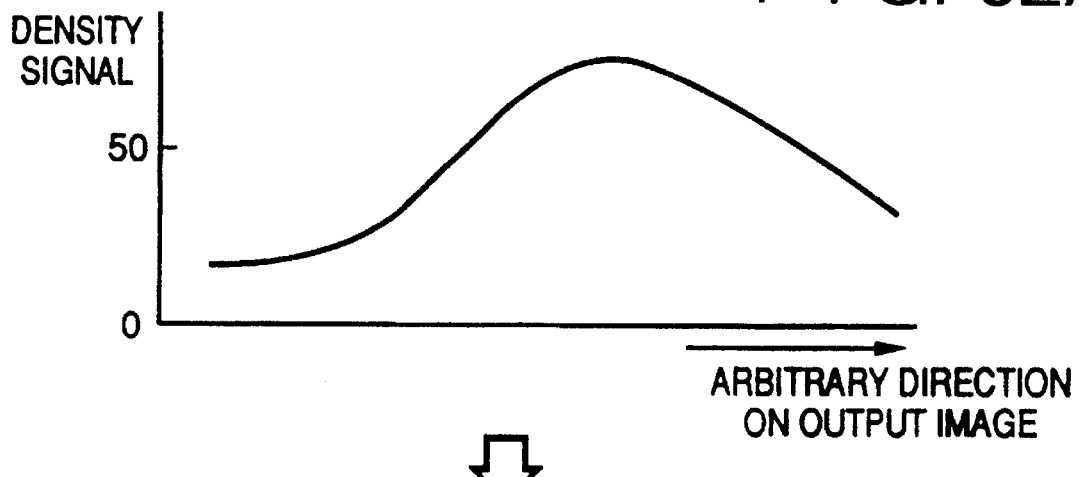
FIG. 52 is a diagram illustrating the relationship between the density value of a serial-number pattern and the density value of an output image.
Figure 52B:
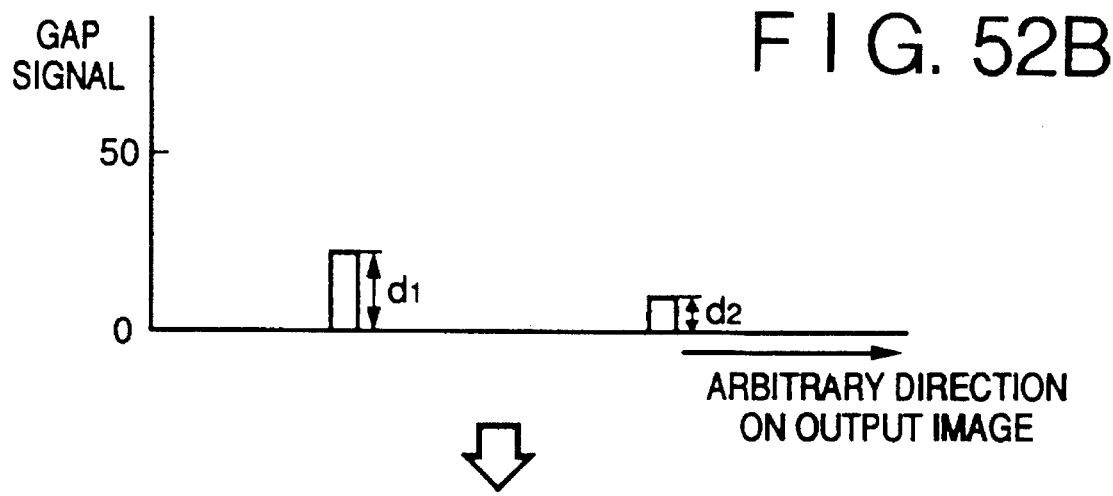
Figure 52C:
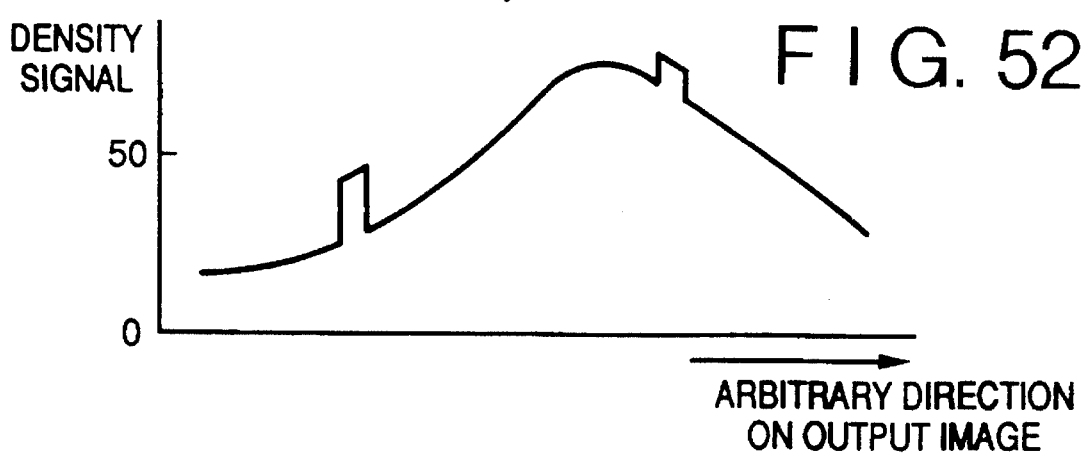

FIG. 52 is a diagram illustrating the relationship between the density distribution of the image with respect to an arbitrary direction on the duplicate image by the full-color copying machine and the density value of the serial-number pattern which is added on the image.

The serial-number pattern generation circuit 2015 (See FIG. 27) generates a serial-number pattern as shown in FIG. 20 to specify the copying machine. However, in the embodiment, the serial-number pattern generated in the serial-number pattern generation circuit 2015 is changed in accordance with the density value of the image, to which a gap signal representing the density of pattern is added by the modulation amount controlling circuit 2016. For example, in the case of FIG. 52, it is arranged so that the density signal ($d_1$) of a gap signal is large when the density value of the add-on image is small, while the density signal ($d_2$) is small when the density value of the add-on image is large. The relationship between the density value of an image and the density value representing a serial-number pattern to be added is specifically described later with reference to FIGS. 53, 54A, and 54B.

Similar to the second embodiment, the serial-number pattern modulated in this way is added to the input image signal by the comparator 2017.

Figure 53:
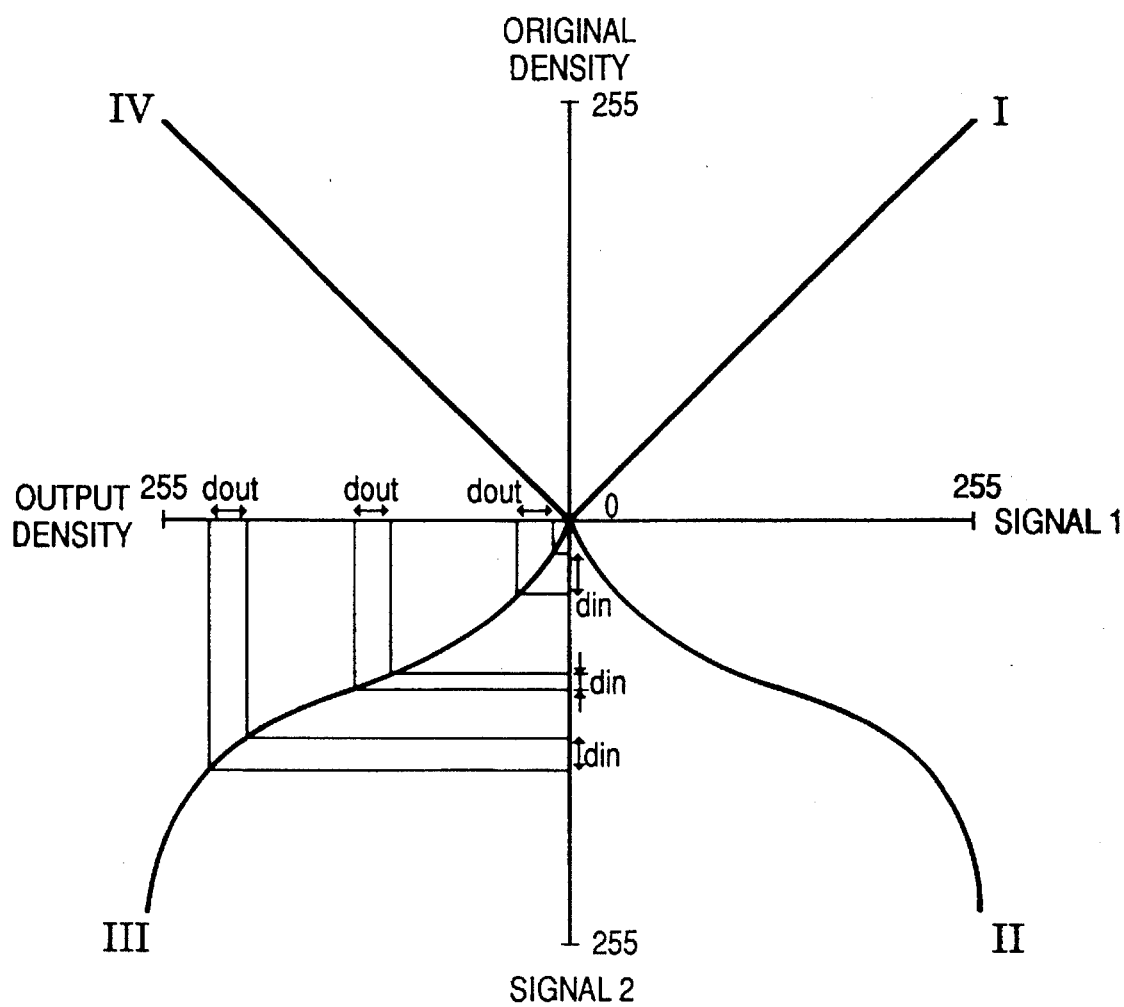
FIG. 53 is a four-quadrant chart showing the tone characteristics conversion.

FIG. 53 is a four-quadrant chart which is similar to FIG. 29. The meaning of each quadrant and input signals, and the number of tones of the output image signal in FIG. 53 are the same as those in FIG. 29.

It is well-known that the conversion characteristic of the laser output signal (Signal 2) and the density of an output image in the quadrant III can be in various forms due to the condition of a photoreceptor, laser spot diameter, and characteristic of development. In general, the characteristic is an S-shaped characteristic as shown in FIG. 53. On the other hand, in order to accurately reproduce a full-color image in accordance with the density of the input image, it is important that the relationship between the density of an input original image and that of the output image in the quadrant IV be linear. To do so, the conversion characteristic in the quadrant III needs to be S-shaped as shown in FIG. 53.

In the embodiment, the modulation signal of the serial-number pattern is added to the laser output signal (Signal 2) obtained from the density of the input image. This add-on amount (d) is represented by din on the axis of the laser output signal (Signal 2). In other words, the din is added to the laser output signal (Signal 2). As shown in FIG. 53, the value $d_{in}$ is changed so that the value ($d_{out}$) after the conversion becomes constant regardless of the density of the output image.

Figure 54A:
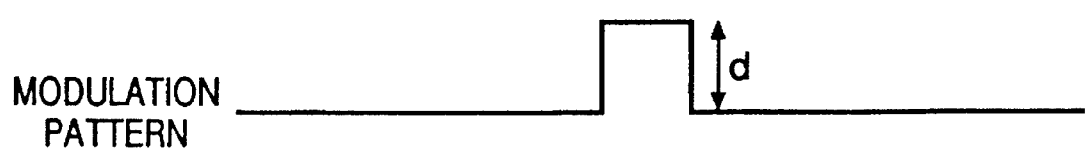
FIGS. 54A and 54B are diagrams illustrating the modulation pattern and modulation characteristic.
Figure 54B:
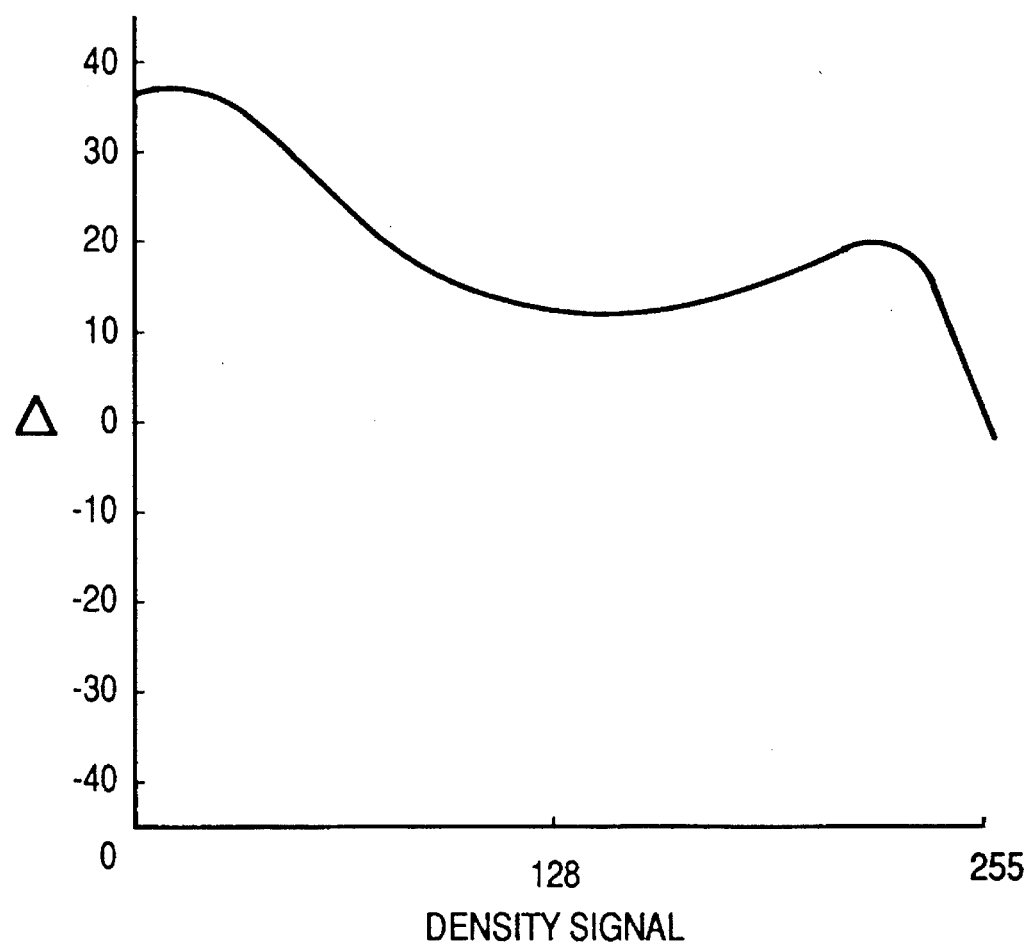

The above description is summarized in FIGS. 54A and 54B. The modulation pattern which is added to the laser output signal (Signal 2) shown in FIG. 54A has a modulation characteristic so as to be modulated as shown in FIG. 54B in accordance with the density value of the output image. The notation Δ on the vertical axis in FIG. 54B denotes a modulation amount. As shown in FIG. 54B, since there is no substantial meaning in the area which is close to the maximum density (255) on the modulation to the positive side, it is set so that the modulation amount (Δ) is "0" at the maximum density.

In this way, the reproducibility of the serial-number pattern is improved in the highlight portion (where the density value is small), while the pattern will not be distinctive in the intermediate range in a manner such that the modulation amount ($d_{out}$) representing the serial-number pattern in the output image is maintained to be constant.

According to the embodiment, a full-color image is formed by adding the images formed by using a plurality of toners. When the serial-number pattern which is unique information is added to the image in a particular color such as yellow, the modulation amount of the add-on pattern is changed in accordance with the density of the image density signal, and thus, the unique information can be properly output on the output image regardless of the density of the output image.

Figure 55A:
FIGS. 55A and 55B are diagrams illustrating another example of the modulation pattern and modulation characteristic.
Figure 55B:
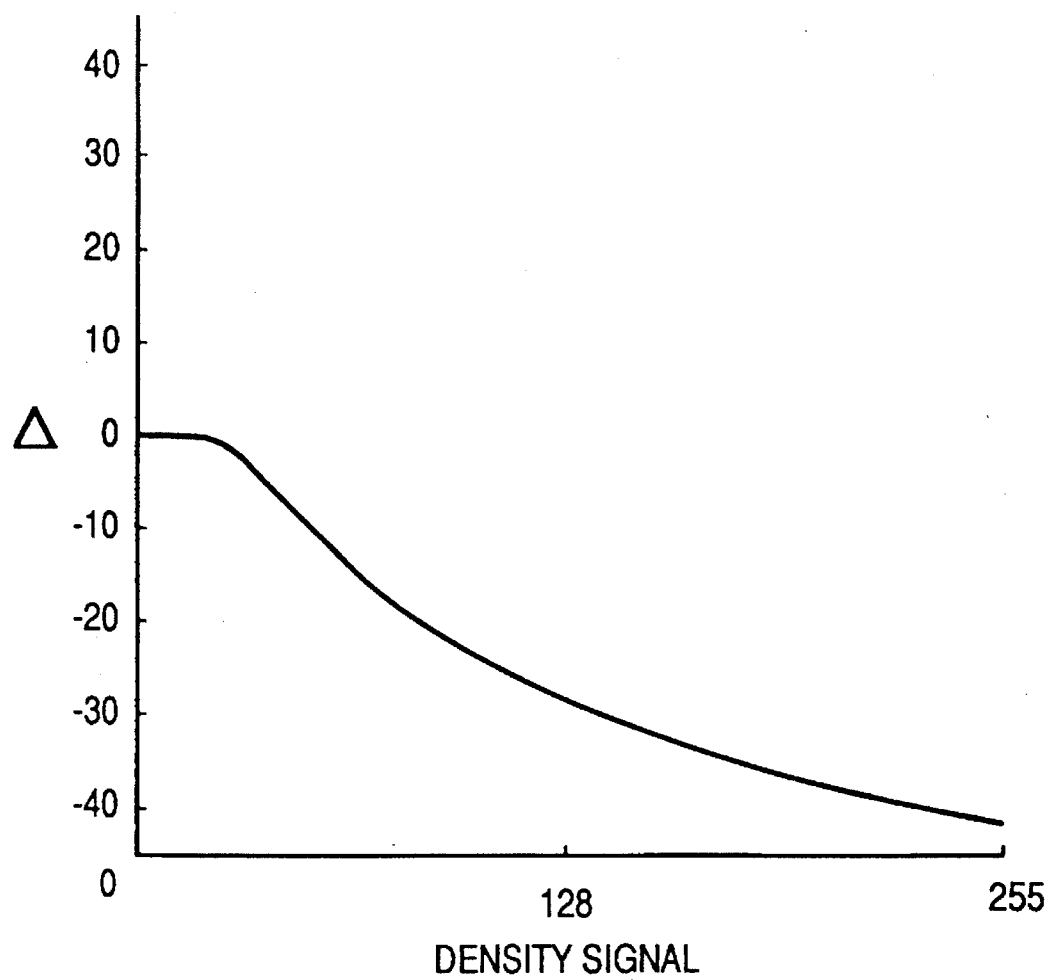

In the embodiment, it is arranged so that the serial-number pattern can be easily recognized in the highlight portion by modulating to the positive side. However, this does not impose a limitation upon the invention. For example, it can also be arranged so that the serial-number pattern can easily be recognized in the intermediate to the high density range by modulating to the negative side. In this case, the modulation pattern and the modulation characteristic are respectively shown in FIGS. 55A and 55B. Accordingly, the serial-number pattern in the intermediate density range to the high density range can easily be recognized.

Furthermore, the serial-number pattern can easily be recognized over all the density values by combining the above two modulations and performing the modulation at both the positive side and negative side.

Figure 56A:
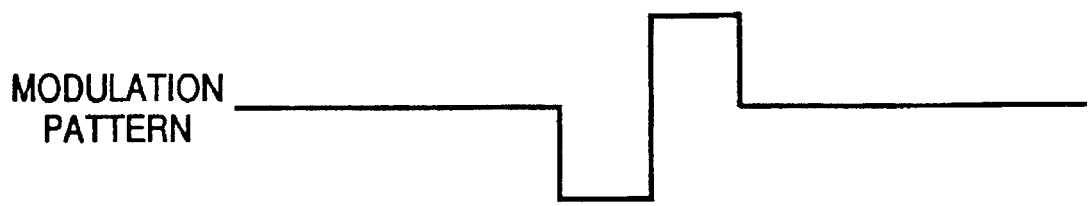
FIGS. 56A and 56B are diagrams illustrating another example of the modulation pattern and modulation characteristic.
Figure 56B:
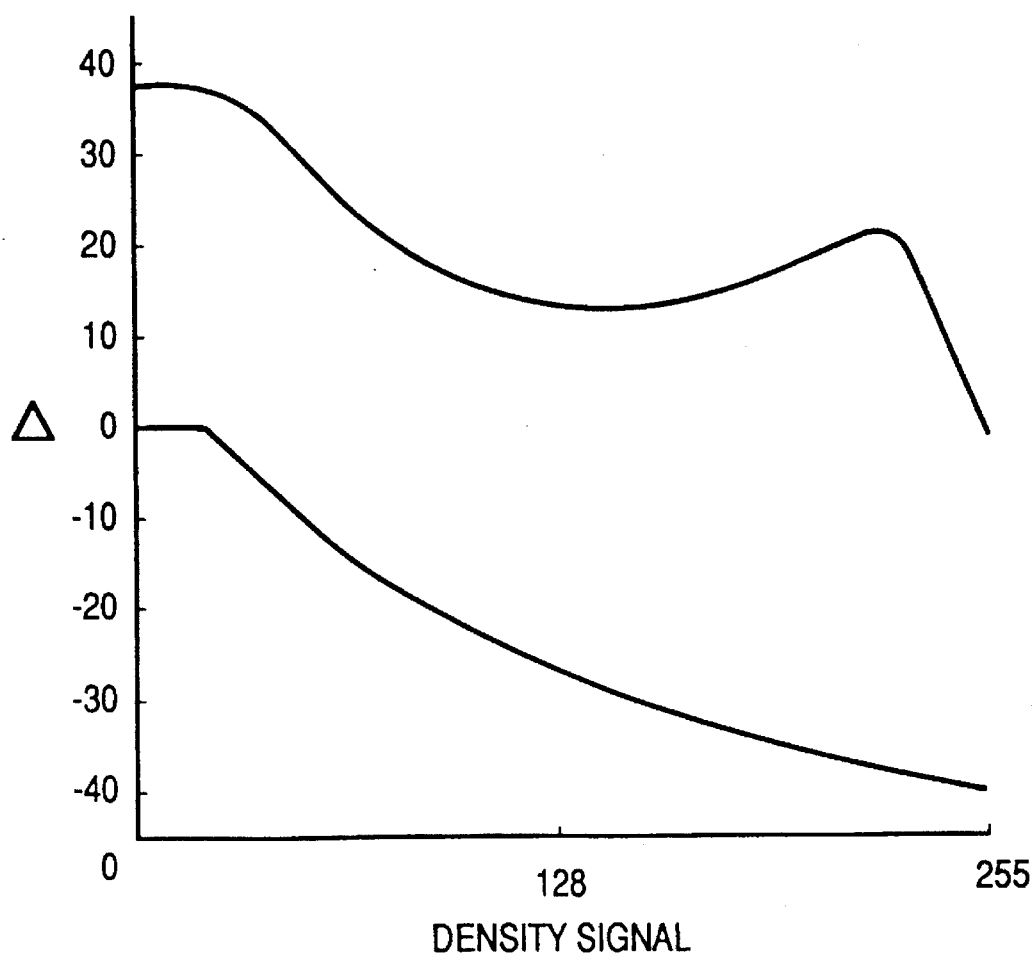

In this case, the modulation pattern and the modulation characteristic are respectively shown in FIGS. 56A and 56B. By virtue of the modulation, the serial-number pattern can easily be recognized over all the density values.

Still further, in the above embodiments, the full-color copying machine is described as an example, however, this does not impose a limitation upon the invention. The present invention can also be applied to printers and printer interfaces without departing from the spirit and scope thereof. It should be noted that the specific original includes not only bank notes and securities which are prohibited from being copied by law, but also confidential documents for a particular use.

The present invention can be applied to a system constituted by a plurality of devices, or to a machine comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

Also, it goes without saying that the apparatus can be arranged by combining the spirit and scope of each embodiment.

What is claimed is:

1. An image forming method of forming an image represented by an input image signal comprising:

an adding step of adding a predetermined pattern on the image represented by the input image signal; and an image forming step of forming the image on which the predetermined pattern is added, wherein the addition by said adding step is controlled in accordance with a position of the image on which the predetermined pattern is added.

2. The method according to claim 1, wherein the addition in said adding step is controlled in accordance with a distance from a boundary of an area on a recording medium where the image is formed.

3. The method according to claim 2, further comprising:

a transfer step of transferring the recording medium; and a detection step of detecting the boundary of the area with respect to a transferring direction of the recording medium.

4. The method according to claim 2, further comprising:

a transfer step of transferring the recording medium; and a detection step of detecting the boundary of the area with respect to a direction perpendicular to a transferring direction of the recording medium.

5. The method according to claim 2, further comprising:

a transfer step of transferring the recording medium; and a detection step of detecting the boundary of the area with respect to a transferring direction and a direction perpendicular to the transferring direction of the recording medium.

6. The method according to claim 2, further comprising a modulation step of modulating a predetermined image signal which represents the predetermined pattern, and wherein a modulation amount of the predetermined image signal in said modulation step is set to be larger as a distance from the boundary increases, and is set to be smaller as the distance decreases.

7. The method according to claim 1, further comprising a supply step of supplying the input image signal.

8. The method according to claim 7, wherein the input image signal is supplied from a CCD line sensor.

9. The method according to claim 1, wherein the predetermined pattern includes information for specifying an apparatus for forming the image.

10. The method according to claim 9, wherein the information includes the apparatus serial number.

11. An image forming apparatus for adding a predetermined image signal on an input signal comprising:

modulation means for modulating a predetermined image signal in accordance with a distance from a boundary of an area on a recording medium where the image is formed;

adding means for adding the modulated predetermined image signal on the input signal; and image formation means for forming an image based on the input signal on which the modulated predetermined image signal is added.

12. The apparatus according to claim 11, further comprising:

transfer means for transferring the recording medium; and detection means for detecting the boundary of the area with respect to a transferring direction of the recording medium.

13. The apparatus according to claim 11, further comprising:

transfer means for transferring the recording medium; and detection means for detecting the boundary of the area with respect to a direction perpendicular to a transferring direction of the recording medium.

14. The apparatus according to claim 11, further comprising:

transfer means for transferring the recording medium; and detection means for detecting the boundary of the area with respect to a transferring direction and a direction perpendicular to the transferring direction of the recording medium.

15. The apparatus according to claim 11, wherein a modulation amount of the predetermined image signal in said modulation means is set to be larger as a distance from the boundary increases, and is set to be smaller as the distance decreases.

* * * * *

UNITED STATES PATENT AND TRADEMARK OFFICE
CERTIFICATE OF CORRECTION

PATENT NO. : 5,557,416

DATED : September 17, 1996

INVENTORS : NOBUATSU SASANUMA ET AL.

It is certified that error appears in the above-identified patent and that said Letters Patent is hereby corrected as shown below:

COLUMN 1

Line 28,   "identified effectively be traced," should read --identified.--;
   Line 29,   "can." should read --can effectively be traced.--;
   Line 34,   "evident," should read --evident--;
   Line 35,   "an" should read --such that an--;
   Line 36,   "out" should read --out,--;
   Line 46,   "visable." should read --visible.--;
   Line 55,   "visable" should read --visible--;
   Line 66,   "apparatus-is" should read --apparatus is--.

COLUMN 2

Line 3,   "visable." should read --visible.--.

COLUMN 3

Line 61,   "FIG. 11" should read --¶ FIG. 11--;
   Line 63,   "FIG. 12" should read --¶ FIG. 12--;
   Line 64,   "FIG. 13" should read --¶ FIG. 13-- and "FIG." should read --¶ FIG.--;

UNITED STATES PATENT AND TRADEMARK OFFICE
CERTIFICATE OF CORRECTION

PATENT NO. : 5,557,416

DATED : September 17, 1996

INVENTORS : NOBUATSU SASANUMA ET AL.

It is certified that error appears in the above-identified patent and that said Letters Patent is hereby corrected as shown below:

COLUMN 3 continued

Figure 15:
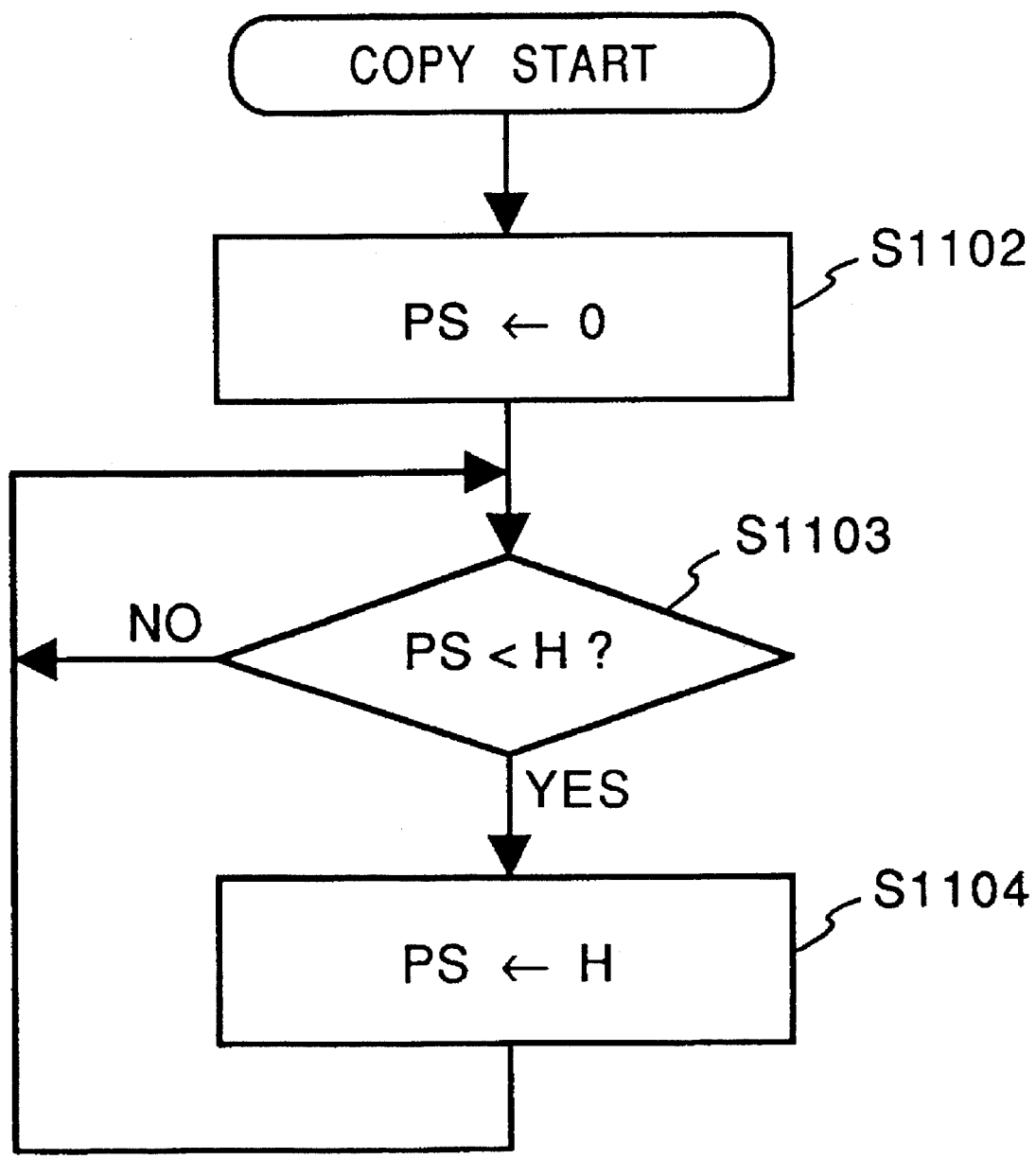
FIG. 15 is a flowchart for explaining the procedure for setting a pattern level selection signal PS.

Line 66,　"FIG. 15" should read --¶ FIG. 15--;
　Line 67,　"FIG. 16" should read --¶ FIG. 16--.

COLUMN 4

Line 2,　"FIG. 17" should read --¶ FIG. 17--;
　Line 4,　"FIG. 18" should read --¶ FIG. 18--;
　Line 7,　"FIG. 19" should read --¶ FIG. 19--;
　Line 9,　"FIG. 20" should read --¶ FIG. 20--;
　Line 10,　"FIG. 21" should read --¶ FIG. 21--;
　Line 34,　"a-third" should read --a third--;
　Line 61,　"iS" should read --is--.

COLUMN 9

Line 11,　"signal $Y_i$" should read --signal $y_i$--;
　Line 41,　"is" should read --is then--;
　Line 42,　"then" should be deleted.

UNITED STATES PATENT AND TRADEMARK OFFICE
CERTIFICATE OF CORRECTION

PATENT NO. : 5,557,416

DATED : September 17, 1996

INVENTORS : NOBUATSU SASANUMA ET AL.

It is certified that error appears in the above-identified patent and that said Letters Patent is hereby corrected as shown below:

COLUMN 10

Line 8,   "Carriage 226" should read --carriage 226--;
   Line 43,  "6 bit" should read --6 bits--.

COLUMN 11

Line 18,  "is such" should read --such--.

COLUMN 14

Line 66,  "Of" should read --of--.

COLUMN 17

Line 19,  "appears" should read --appear--;
   Line 48,  "an" should read --on an--.

UNITED STATES PATENT AND TRADEMARK OFFICE
CERTIFICATE OF CORRECTION

PATENT NO. : 5,557,416

DATED : September 17, 1996

INVENTORS : NOBUATSU SASANUMA ET AL.

It is certified that error appears in the above-identified patent and that said Letters Patent is hereby corrected as shown below:

COLUMN 19

Line 51,   "may" should read --may be--.

COLUMN 20

Line 27,   "pixels)" should read --pixels).--.

COLUMN 21

Line 67,   "into" should read --to--.

COLUMN 24

Line 30,   "din" should read --$d_{in}$--;
  Line 31,   "din" should read --$d_{in}$--.

UNITED STATES PATENT AND TRADEMARK OFFICE
CERTIFICATE OF CORRECTION

PATENT NO. : 5,557,416

DATED : September 17, 1996

INVENTORS : NOBUATSU SASANUMA ET AL.

It is certified that error appears in the above-identified patent and that said Letters Patent is hereby corrected as shown below:

COLUMN 26

Line 22, "apparatus" should read --apparatus'--.

Signed and Sealed this

Twelfth Day of December, 2000

*Attest:*

Q. TODD DICKINSON

*Attesting Officer*   Director of Patents and Trademarks